United States Patent [19]

Muramatsu

[11] Patent Number: 5,164,822
[45] Date of Patent: Nov. 17, 1992

[54] COLOR IMAGE FORMING APPARATUS

[75] Inventor: Hideo Muramatsu, Osaka, Japan

[73] Assignee: Minolta Camera Kabushiki Kaisha, Osaka, Japan

[21] Appl. No.: 865,671

[22] Filed: Apr. 8, 1992

Related U.S. Application Data

[63] Continuation of Ser. No. 474,354, Feb. 2, 1990, abandoned.

[30] Foreign Application Priority Data

Feb. 2, 1989 [JP] Japan .................................. 1-25440
Feb. 2, 1989 [JP] Japan .................................. 1-25441

[51] Int. Cl.5 .............................................. H04N 1/46
[52] U.S. Cl. .......................................... 358/75; 358/80
[58] Field of Search .................... 358/75, 80; 355/327, 355/209; 340/701

[56] References Cited

U.S. PATENT DOCUMENTS

| | | | |
|---|---|---|---|
| 4,668,978 | 5/1987 | Gokita | 358/75 |
| 4,843,574 | 6/1989 | Gerber | 358/80 |
| 4,922,335 | 5/1990 | Outa et al. | 358/75 |
| 4,943,834 | 7/1990 | Maeda et al. | 358/80 |
| 4,992,864 | 2/1991 | Akiyama | 358/80 |

Primary Examiner—Stephen Brinich
Attorney, Agent, or Firm—Burns, Doane, Swecker & Mathis

[57] ABSTRACT

A digital type color image forming apparatus comprising an image reader for reading a document, an engine portion for executing the image forming operation and a liquid-crystal display for displaying a document image read by the image reader, wherein desired colors can be registered in advance and used in the following image forming, density levels of the three primary color components of the registered colors are displayed on the liquid-crystal display and a pattern image colored in the registered colors is formed on paper.

10 Claims, 54 Drawing Sheets

Fig. 22

| STATE OF ATTACHED MAGNET 501 a b c d | PAPER SIZE ORIENTATION | WIDTH [mm] | LENGTH [mm] |
|---|---|---|---|
| 0000 | | | |
| 0001 | | | |
| 0010 | | | |
| 0011 | | | |
| 0100 | B5LENGTH | 182 | 257 |
| 0101 | A4LENGTH | 210 | 297 |
| 0110 | B4LENGTH | 257 | 364 |
| 0111 | A3LENGTH | 297 | 420 |
| 1000 | | | |
| 1001 | | | |
| 1010 | B5WIDTH | 257 | 182 |
| 1011 | A4WIDTH | 297 | 210 |
| 1100 | | | |
| 1101 | | | |
| 1110 | | | |
| 1111 | | | |

0 : MAGNET ABSENCE
1 : MAGNET PRESENCE

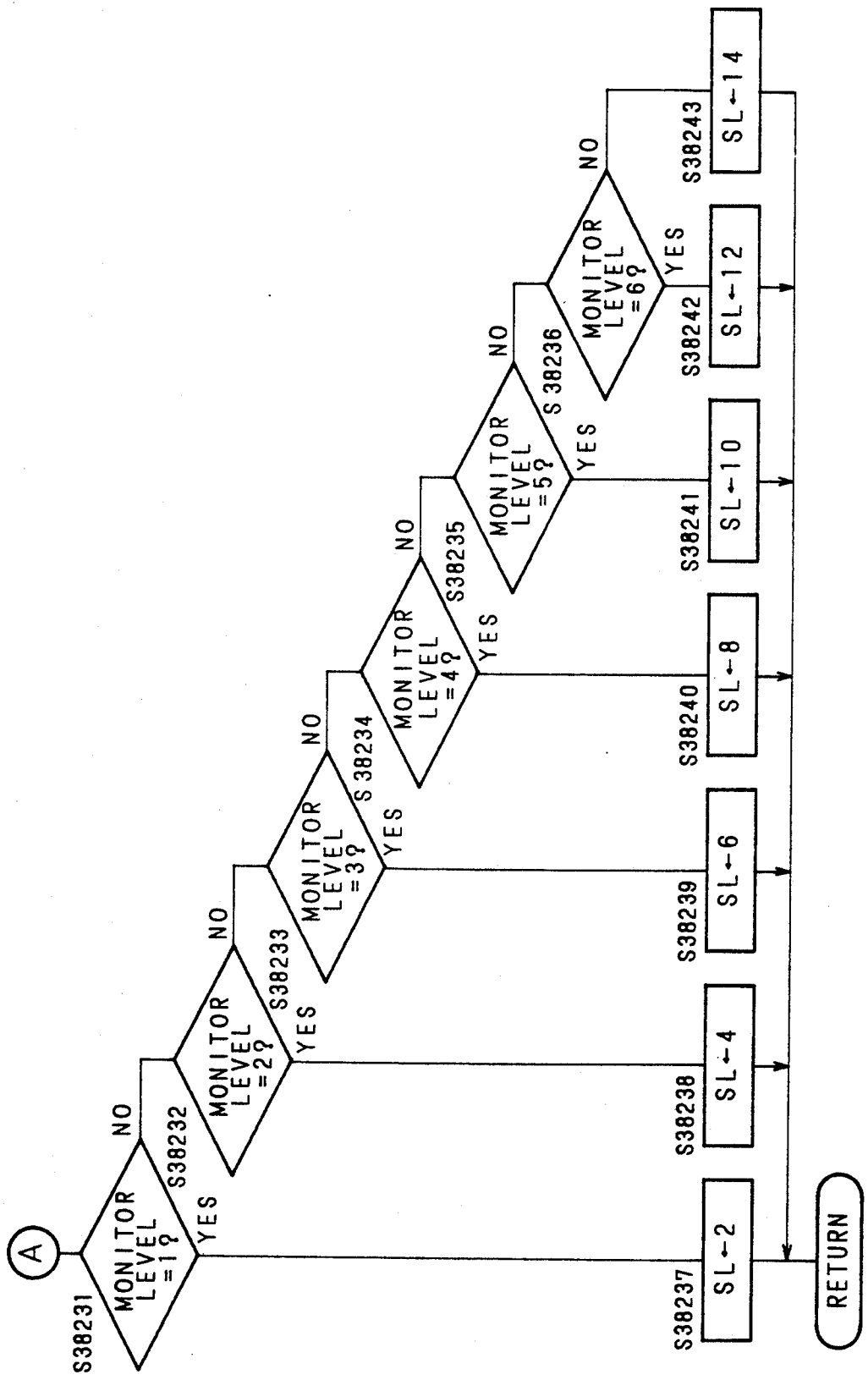

Fig. 36

| "θ"[°] | "Vc" | TIMER VALUE TM (x,y)(msec) | |
|---|---|---|---|
| | | MENU CURSOR | POINTING CURSOR |
| 55~60 | 5 | 200 | 10 |
| 40~55 | $0.007619 \cdot \theta^2 - 0.4571 \cdot \theta + 7.091$ | 200 ≀ 1000 | 10 ≀ 50 |
| 35~40 | 1 | 1000 | 50 |
| 25~35 | 0 | ∞ | ∞ |
| 20~25 | 1 | 1000 | 50 |
| 5~20 | $0.007619 \cdot \theta^2 - 0.4571 \cdot \theta + 7.091$ | 1000 ≀ 200 | 50 ≀ 10 |
| 0~5 | 5 | 200 | 10 |

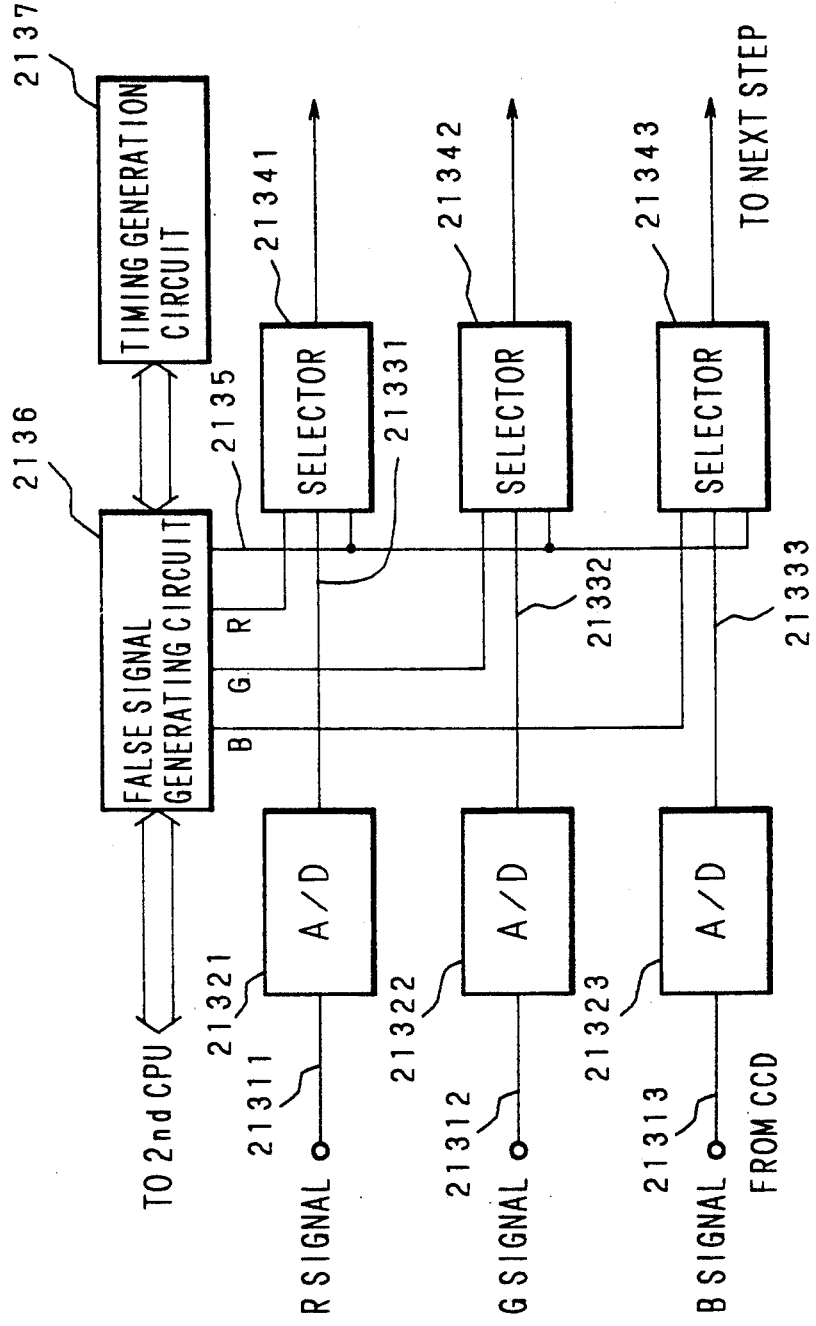

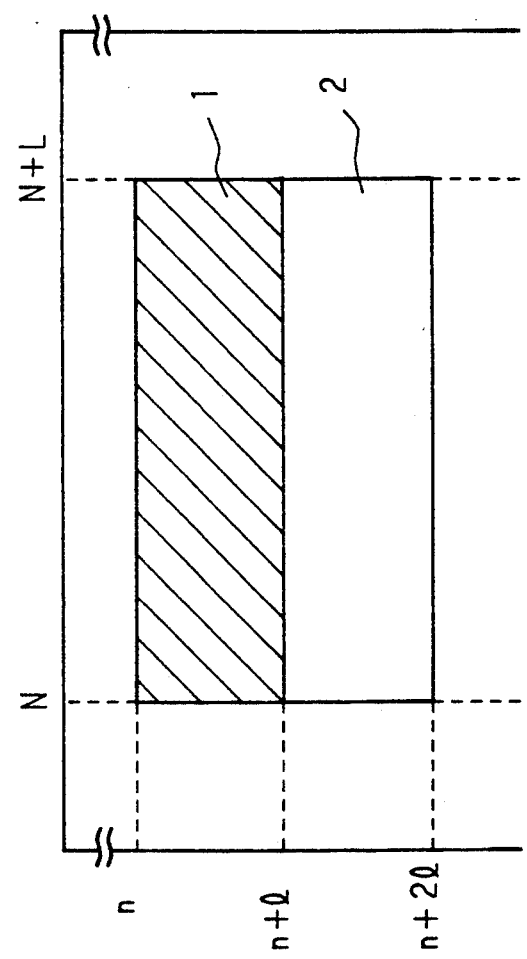

COLOR IMAGE FORMING APPARATUS

This application is a continuation of application Ser. No. 07/474,354, filed Feb. 2, 1990.

BACKGROUND OF THE INVENTION

1. Field of the Invention

The present invention relates to a color image forming apparatus capable of forming a multicolor image, more particularly, it relates to a color image forming apparatus capable of registering desired colors in advance.

2. Description of Related Art

In European Patent Publication No. 0 292 212 A2, there is disclosed a color image forming apparatus which reads a monocolor or multicolor image and outputs it as a desired color image. According to the apparatus, an operator can register desired colors in advance and use them later in image forming. Whereby, the monocolor or multicolor document image can be converted into the registered color image desired by the operator. It is also possible to designate a desired area in the document image and convert the image therein intot he registered color image.

In the apparatus disclosed, however, since no one knows what colors have been registered but the operator who has registered the desired colors, trial copying is necessary, and thus the features of the apparatus can not be fully utilized. Since a plurality of colors are registered, the trial copying must be repeated, which results in a gross waste. Moreover, even the operator who has registered the colors may forget the registered colors as the time elapses, which results in same inconvenience.

SUMMARY OF THE INVENTION

The present invention has been devised in view of such circumstances, therefore, it is a primary object thereof to provide a color image forming apparatus capable of registering desired colors and forming a pattern image of the registered colors on paper so that the operator can easily confirm the registered colors.

It is another object of the present invention to provide a color image forming apparatus capable of registering desired colors and displaying the registered colors on display means.

The above and further objects and features of the invention will more fully be apparent from the following detailed description with accompanying drawings.

BRIEF DESCRIPTION OF THE DRAWINGS

FIG. 22 is a table showing the relationship between a paper size and position and a magnet mounting position, FIG. 36 is a table showing the relationship between the rotation angle of the joy ball and the processing speed and reference timer values, FIG. 50 is a block diagram showing the circuit configuration generating a false signal, and FIG. 51 is a schematic view illustrating a generation timing of the false signal.

DESCRIPTION OF THE PREFERRED EMBODIMENTS

In the following, the present invention will be described specifically with reference to the drawings showing its embodiments.

Figure 1:
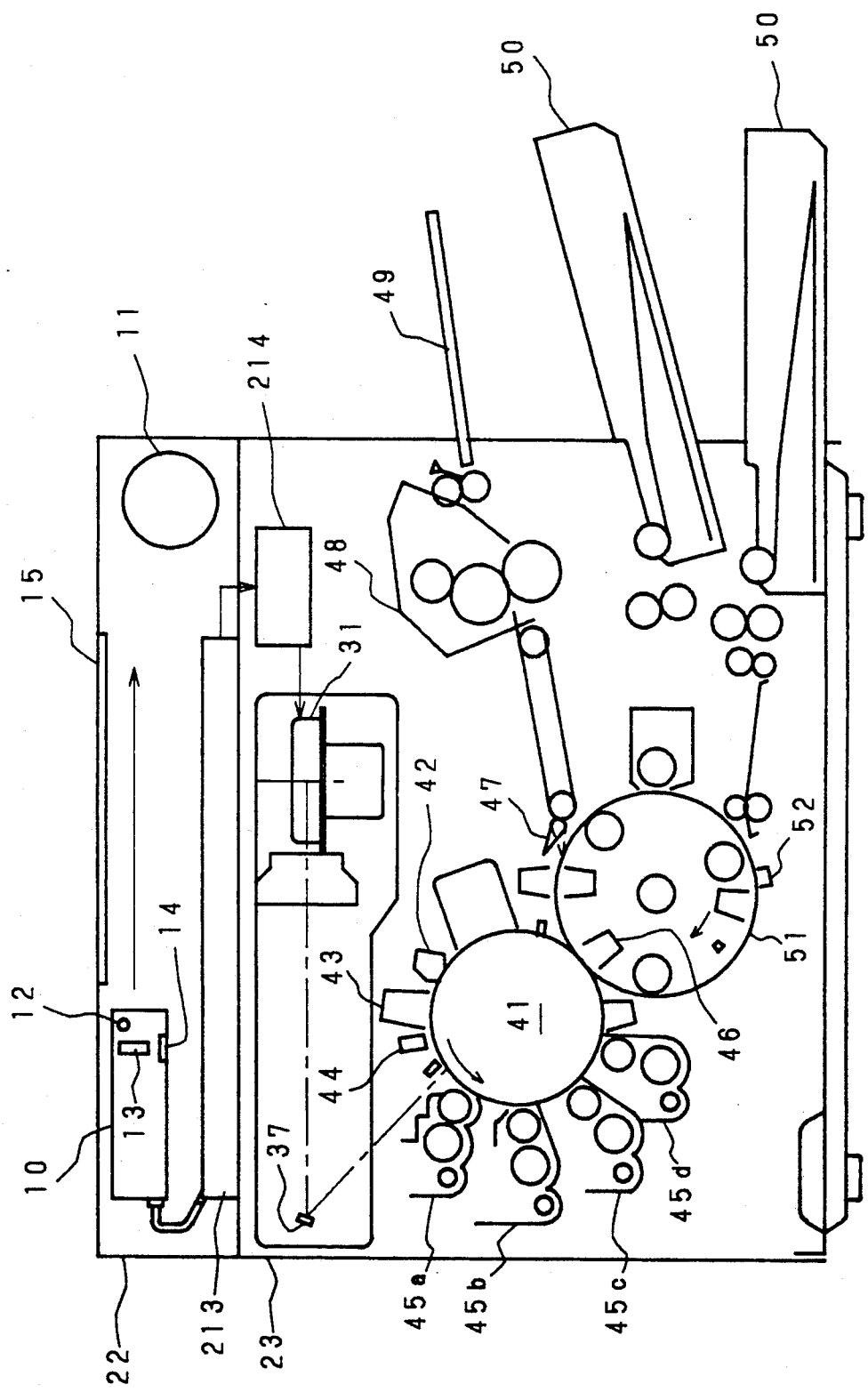
FIG. 1 is a longitudinal sectional construction view of a copying apparatus as a color image forming apparatus according to the present invention.

In FIG. 1, numeral 22 indicates an image reader for reading a document image, and 23 denotes an engine portion which actually executes the copying operation on the basis of image information.

The image reader 22 comprises a scanner 10 which reads an image of the document set on an original glass plate 15, a scanning motor 11 which moves the scanner 10 horizontally and an image signal processing circuit 213 for processing image signals from the scanner 10, etc. The scanner 10 comprises a light source 12 which illuminates the document, a focusing rod lens array 13 which projects light reflected from the surface of the document to a color-CCD linear image sensor 14 which generates image signals based on the image. Image data of the document is converted into an electrical signal by the color-CCD linear image sensor 14, thereafter signal-processed in the image signal processing circuit 213 and sent to a laser-diode drive circuit 214. The circuit 214 provides an ON-OFF signal to a laser diodes so as to emit a laser beam modulated according to image data. The laser beam is projected onto a photosensitive drum 41 for exposure via a polygon mirror 31 and a plane mirror 37.

The photosensitive drum 41 is designed to rotate counterclockwise in the direction shown by the arrow, and an electrification charger 43 is provided above the rotating zone on the periphery thereof. The photosensitive drum 41 is subjected to the exposure after being charged by the electrification charger 43. On the downstream side of the electrification charger 43 around the photosensitive drum 41, a LED array 44 for preventing an excessive toner from adhering is provided, and on the downstream side of the LED array 44, developing devices 45a, 45b, 45c and 45d respectively for yellow, cyan, magenta and black are disposed in this order. Underneath the photosensitive drum 41, there is provided a transfer charger 46 which transfers a toner image onto copy paper. On the upstream side of the electrification charger 43, an eraser lamp 42 which removes a residual charge on the photosensitive drum 41 is installed.

The engine portion 23 includes, in addition to the photosensitive drum 41, a transfer drum 51, a fixing unit 48, a paper discharge tray 49 and two paper feed trays 50, etc. The transfer drum 51 is installed in parallel and adjacent to the photosensitive drum 41, and includes, on the peripheral surface thereof, a chucking claw 52 for holding the copy paper onto which the image is to be transferred. The transfer drum 51 is driven to rotate in the direction of the arrow. The copy paper drawn out from the paper feed tray 50 is fixed to the peripheral surface of the transfer drum 51 at its front edge by the chucking claw 52. When the front edge of the copy paper reaches the transfer charger 46 in synchronism with the toner image on the photosensitive drum 41 facing the transfer charger 46, the toner image is transferred successively onto the copy paper. On the first rotation of the photosensitive drum 41 and the transfer drum 51, a transferring process for the yellow toner is conducted, on the second rotation for the magenta toner, on the third rotation for the cyan toner and on the fourth rotation for the black toner. After four transferring processes for one copy paper are finished, the chucking claw 52 is loosened and the copy paper is separated from the peripheral surface of the transfer drum 51 by a separation claw 47. Then, the copy paper is discharged on the paper discharge tray 49 after the fixing operation by the fixing unit 48.

Figure 2:
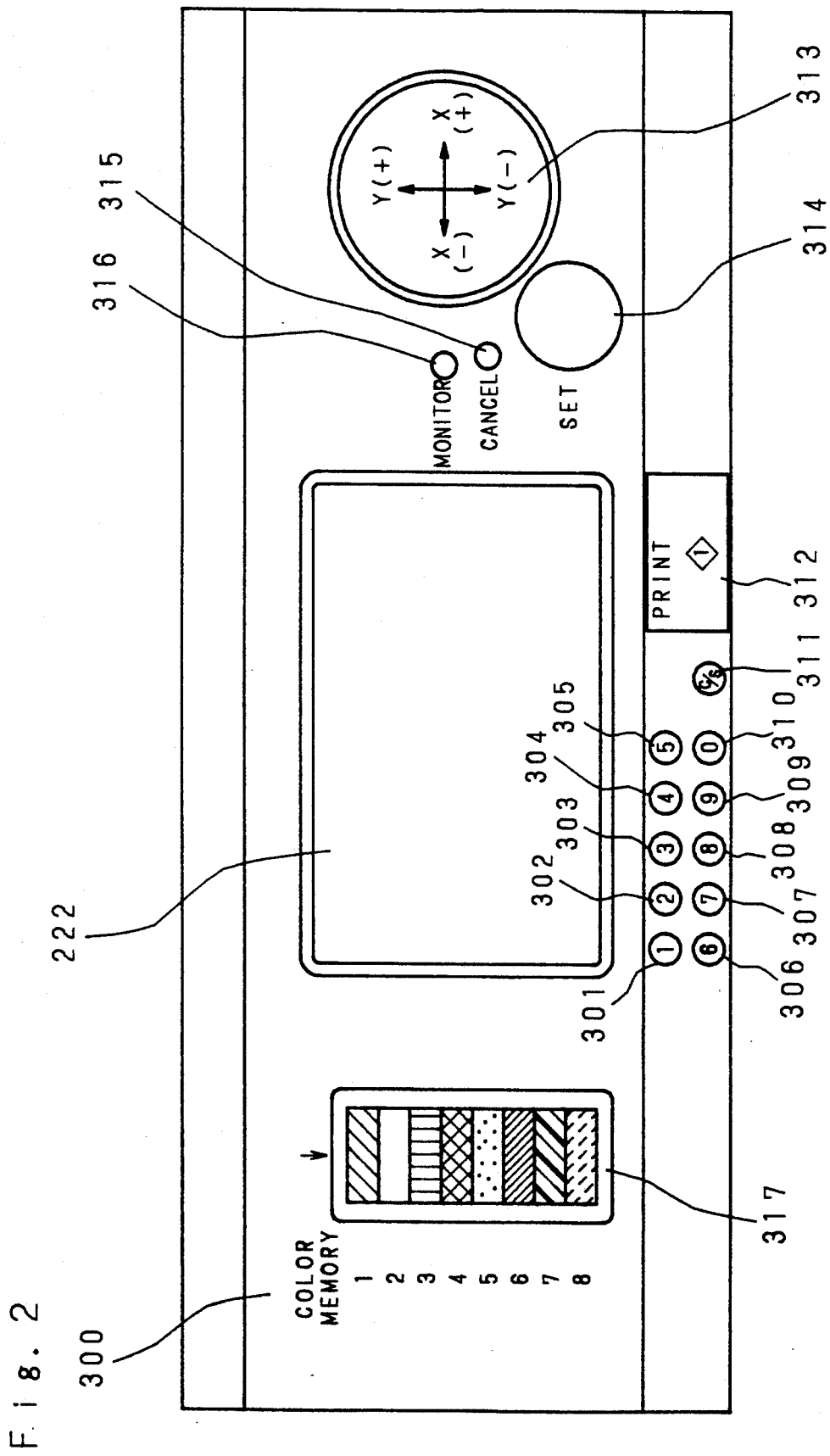
FIG. 2 is a schematic plan view of a control panel.

FIG. 2 is a schematic plan view of a control panel 300 of a copying apparatus having an image forming function. On the front side of the control panel 300, ten-keys 301~310 for registering the number of copy paper, etc., a clear/stop key 311 for instructing the release of register and the interruption of multicopying and a print key 312 for commanding the copy starting are disposed. On the right side face of the control panel 300, a joy ball 313 for selecting a copying mode menu, etc., a set key 314 for fixing the copying mode menu, etc. selected by the joy ball 313, a cancel key 315 for releasing the contents fixed by the set key 314 and a monitor key 316 for displaying the document image on a liquid-crystal display are provided adjacent to each other so as to be pressed while operating the joy ball 313. Furthermore, in the center of the control panel 300, a dot-matrix-type (640×400 dots) liquid-crystal display panel 222 for displaying every content related to the operation on the left side face of the control panel 300, a registration color setting portion 317 for setting the registered color print content to display to an operator, are installed respectively.

Figure 3:
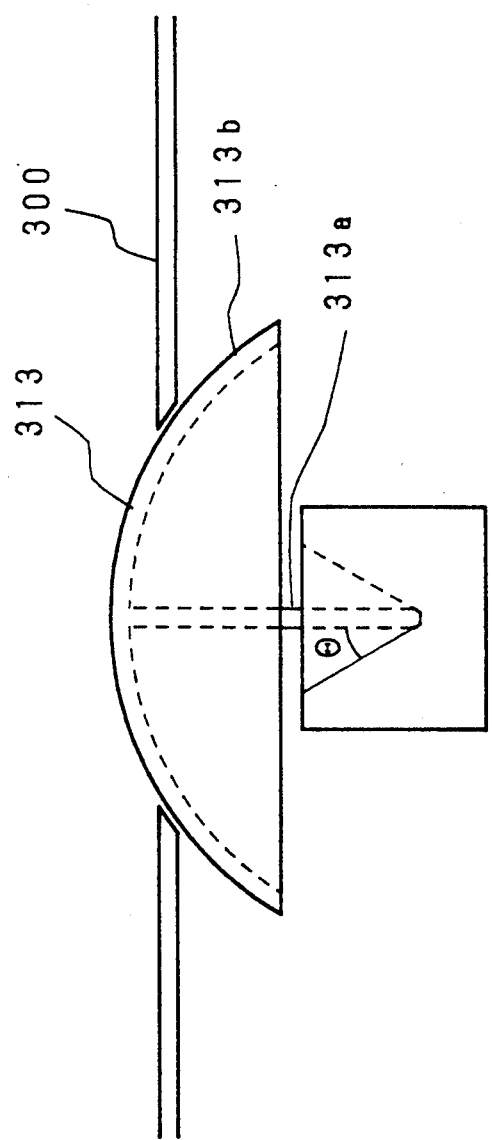
FIG. 3 is a schematic side view of a joy ball.
Figure 4:
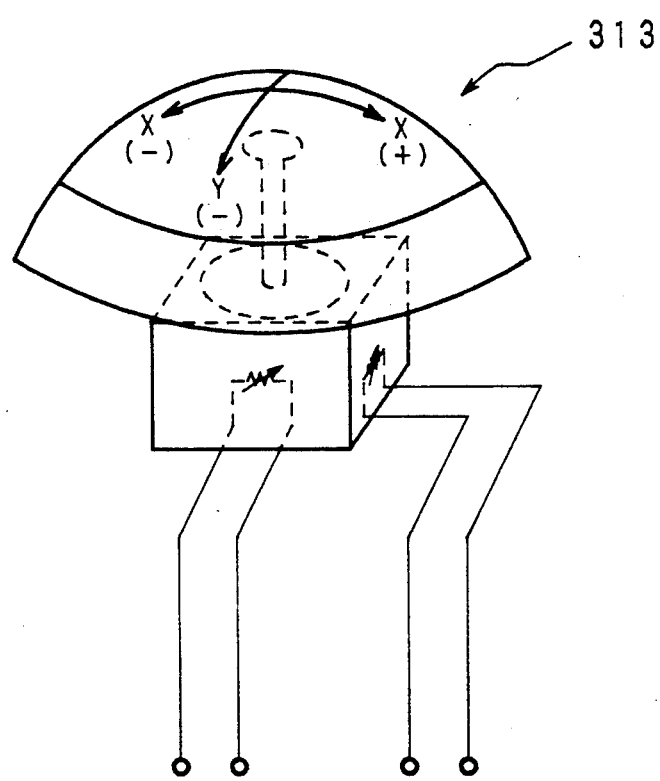
FIG. 4 is a perspective view of the joy ball.

FIG. 3 is a schematic side view of a vicinity of the joy ball 313, and FIG. 4 is a perspective view of the joy ball 313. The joy ball 313 comprises a stick 313a which can slant at a certain angle $\theta$ in all directions through angle 360°, and a ball 313b which constitutes a portion of a ball mounted on the upper portion of the stick 313a. A portion of the ball 313b is exposed from an exterior of the control panel 300, and when the joy ball 313 is rotated, the rest of the portion covered by the exterior of the control panel 300 is exposed. The stick 313a is designed to return and erect ($\theta=0$) automatically by means of a spring not shown. Rotation angles of the stick 313a in the directions X and Y are respectively detected by two variable resistors (refer to FIG. 4), converted into digital data by an A/D conversion I/O 218 to be described later and judged by a third CPU 203 to be described later for various controls.

Figure 5:
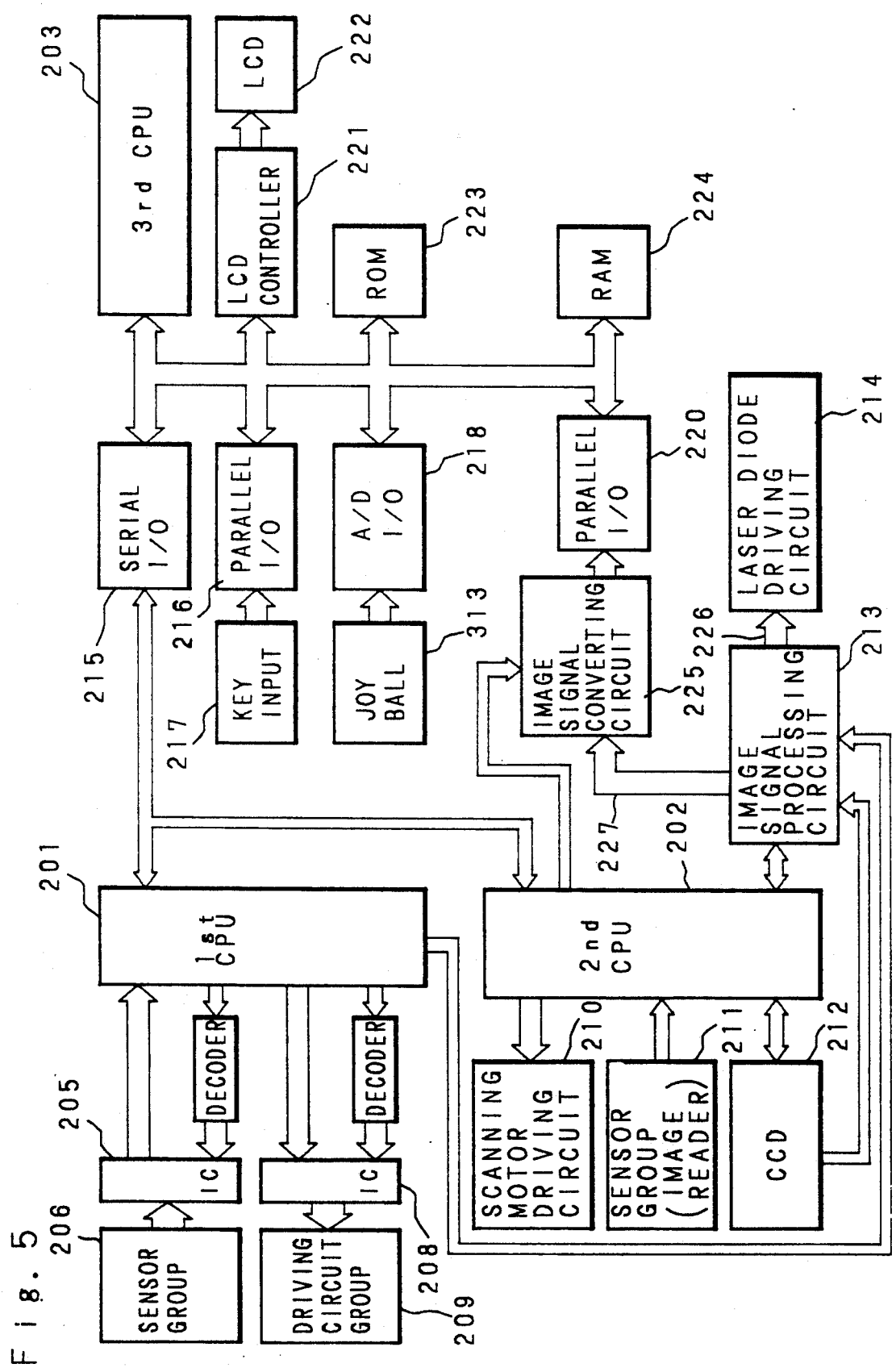
FIG. 5 is an entire control systematic diagram.

FIG. 5 is a systematic diagram of a control circuit of the present embodiment, in which a first CPU 201 for controlling the engine 23, a second CPU 202 for controlling the image reader 22 and a third CPU 203 for controlling the control panel 300 are the core thereof.

To the first CPU 201, signals from a group of sensors 206 disposed in several places of the engine 23 of detecting the operating conditions are inputted via an IC 205. Conversely, it outputs via an IC 208 control signals to a group of driving circuits 209 which drive various motors, solenoids and so on of the engine 23. Moreover, the first CPU 201 also outputs a control signal to an image signal processing circuit 213.

To the second CPU 202, signals from a group of sensors 211 for detecting various conditions of the image reader 22 are inputted. The second CPU 202 controls a driving circuit 210 of the scanning motor 11, a peripheral circuit 212 of the CCD linear image sensor 14 and the image signal processing circuit 213. Image data from the CCD linear image sensor 14 is given to the image signal processing circuit 213, from which the image signal processed therein is given to a laser diode driving circuit 214 via a data bus 226.

To the third CPU 203, key inputs 217 of various keys of the control panel 300, except the joy ball 313, are given via a parallel I/O 216, while the condition of the joy ball 313 (information on the slanting direction and angle of the stick 313a) is inputted to the third CPU 203 via an A/D conversion I/O 218. The liquid-crystal display panel 222 is connected to the third CPU 203 via an LCD controller 221, and various displays are indicated on the liquid-crystal display panel 222 by selecting either of a binary of ON-OFF by each dot. The image signal processed by the image signal processing circuit 213 is inputted to an image signal converting circuit 225 via a data bus 227, and converted into a signal for the liquid-crystal display in the image signal converting circuit 225, the converted signal being controlled by the third CPU 203 via a parallel I/O 220 and stored temporaily in a RAM 224. The converter signal is read out from the RAM 224 as required by controlling the third CPU 203, and displayed on the liquid-crystal display panel 222. The RAM 224 is also used for the working of control programs, and in a ROM 223, the control programs of the control panel 300 and the liquid-crystal display data are stored. The third CPU 203 is serially communicated with the first and second CPUs 201, 202 via a serial I/O 215.

Contents displayed on the liquid-crystal display panel 222 will be described.

Figure 6:
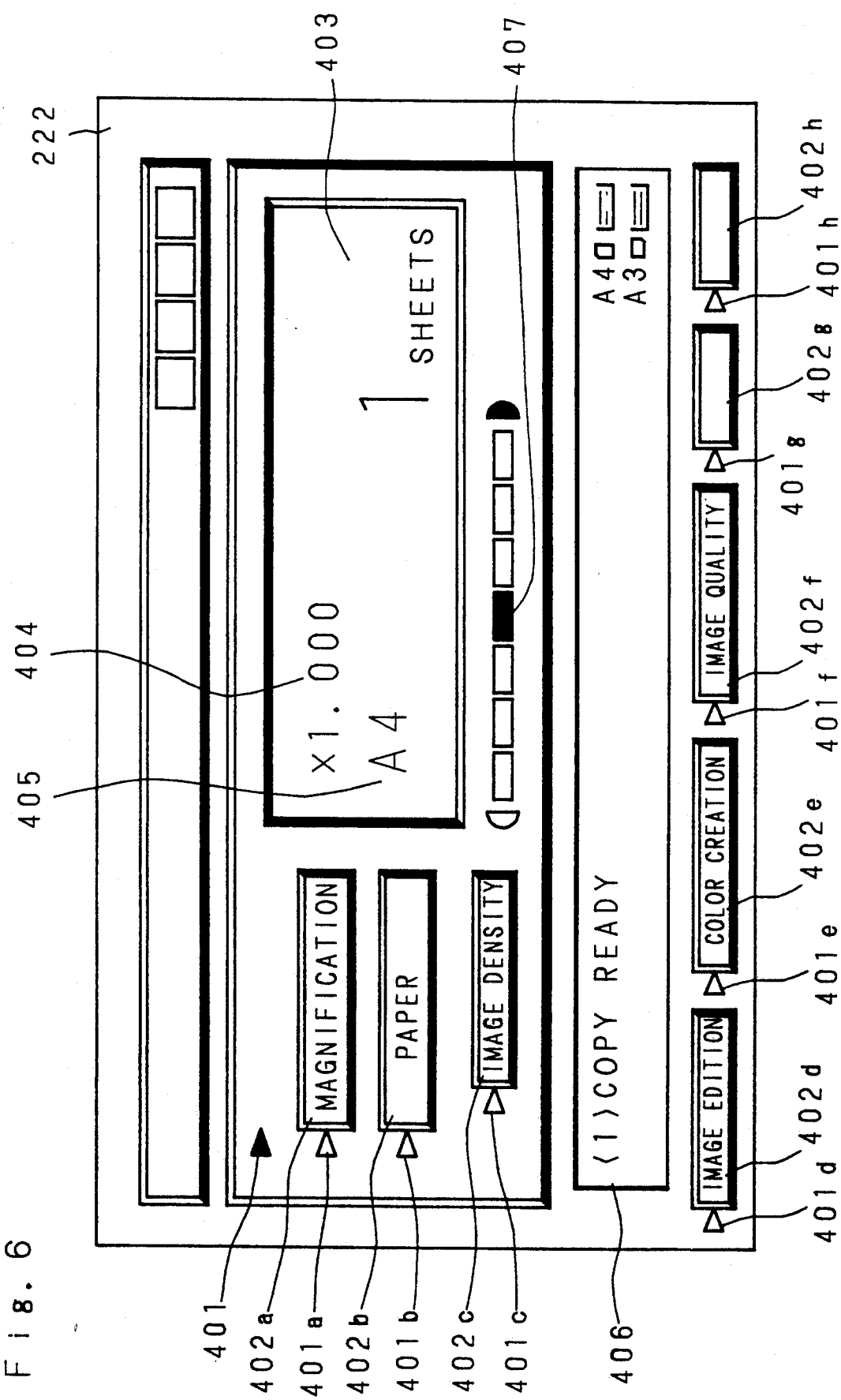
FIGS. 6~11 are schematic views showing the contents displayed on a liquid-crystal display panel.

FIG. 6 is a schematic view showing the displayed contents (hereinafter referred to as display $D_1$) of the liquid-crystal crystal display panel 222 when a power supply is switched on. In the figure, numeral 401 indicates a home position of a menu cursor and 402a~402h indicate respective menus. At the left end of each menu, lighting positions 401a~401h of the menu cursor are provided, and when an arbitrasry menu is selected by the operation of the joy ball 313, one of the lighting positions 401a~401h corresponding the selected menu is inverted in black. In FIG. 6, the menu cursor is shown at the home position. Numeral 403 in the figure denotes a copy quantity display which displays a copy quantity set by the ten-keys 301~310 such as the FIGS. 1~99. Numeral 404 indicates a copy magnification display which displays the magnification set by the function of the "magnification" menu 402a, and 405 is a copy paper size display which displays the paper size in the paper feed tray 50 selected by the function of the "paper" menu 402b. Also, 406 denotes an information display which displays the current condition of the copying apparatus or treatments to be conducted thereto by characters, picture words and the like, and 407 is a copy density level display which displays the copy density selected and set by the function of a "image density" menu 402c, the density level being classified into seven stages.

Figure 7:
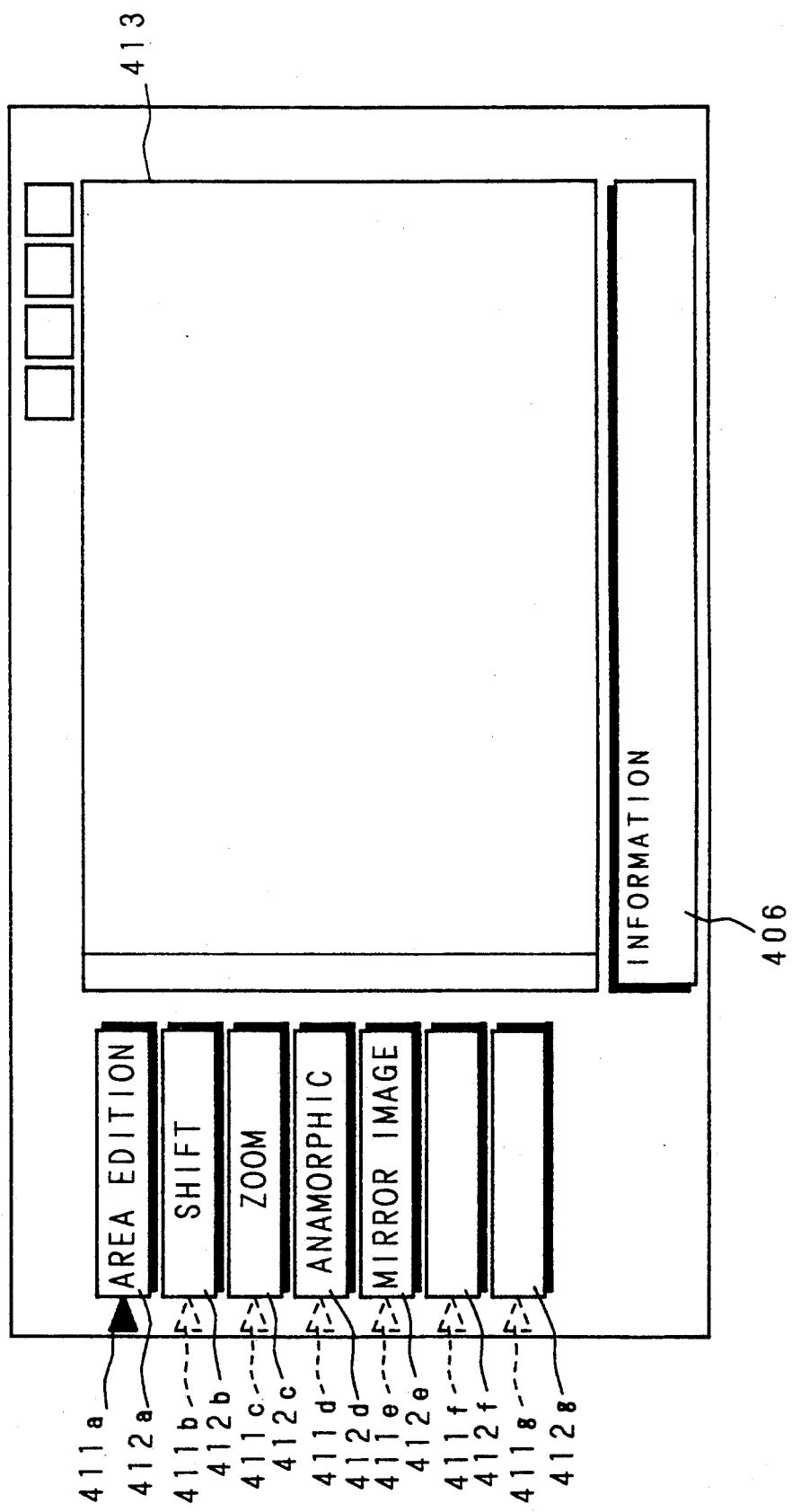

FIG. 7 is a schematic view showing the liquid-crystal display contents (hereinafter referred to as display $D_2$) when an image edition menu 402d is selected in the state shown in FIG. 6. Though the menu cursor is first located at the home position 401 in FIG. 6, when the joy ball 313 is rotated in the direction Y(−) (toward the front in FIG. 2), the menu cursor is moved in order of 401a→401b→401c→401d, and when the joy ball 313 is rotated in the direction Y(+), the menu cursor is moved in order of 401d→401c→401b→401a. When the joy ball 313 is rotated in the direction X(+) while the menu cursor is at 401d, it is moved in order of 401d→401e→401f→401g→401h, then if the joy ball 313 is rotated in the direction X(−), the menu cursor is moved in order of 401h→401g→401f→401e→401d.

If the set key 314 is turned on when the menu cursor is at 401a, it is instructed to set the magnification. At this time, the copy magnification is set by pressing on the set key 314 after setting it by the ten-keys 301~310. The joy ball 313 may also be used to set the magnifications. That is, when the joy ball 313 is rotated in the direction Y, a magnification set value increases or decreases at every 0.001 unit, so that the magnification is set by pressing on the set key 314 at a time point showing the desired magnification. A scanning speed of the scanner 10 is 1/M when the equimagnification is 1 and the magnification is set at M, therefore, as to a scanning direction of the scanner 10, the magnification is changed optically. Meanwhile, with respect to a direction perpendicular to the scanning direction (a direction parallel to each respective element of the CCD linear image sensor 14), the image read by the image signal processing circuit 213 is processed for scale-down and scale-up.

If the set key 314 is turned on when the menu cursor is at 401b, it is instructed to select either the upper or lower paper feed tray 50. At this time, the paper sizes in the upper and lower paper feed trays 50 are also displayed by a paper size detecting device to be described later, and the paper feed tray 50 is selected by rotating the joy ball 313, the paper size setting being completed by turning on the set key 314. Meanwhile, a screen shown in FIG. 7 is obtained if the set key 314 is turned on when the menu cursor reaches the position 401d. In the screen, besides respective menus 412a~412g, lighting positions 411a~411g corresponding to respective menus and the information display 406, an image monitor area 413 whereon the document image read by the image reader 22 is displayed roughly can be observed.

Figure 8:
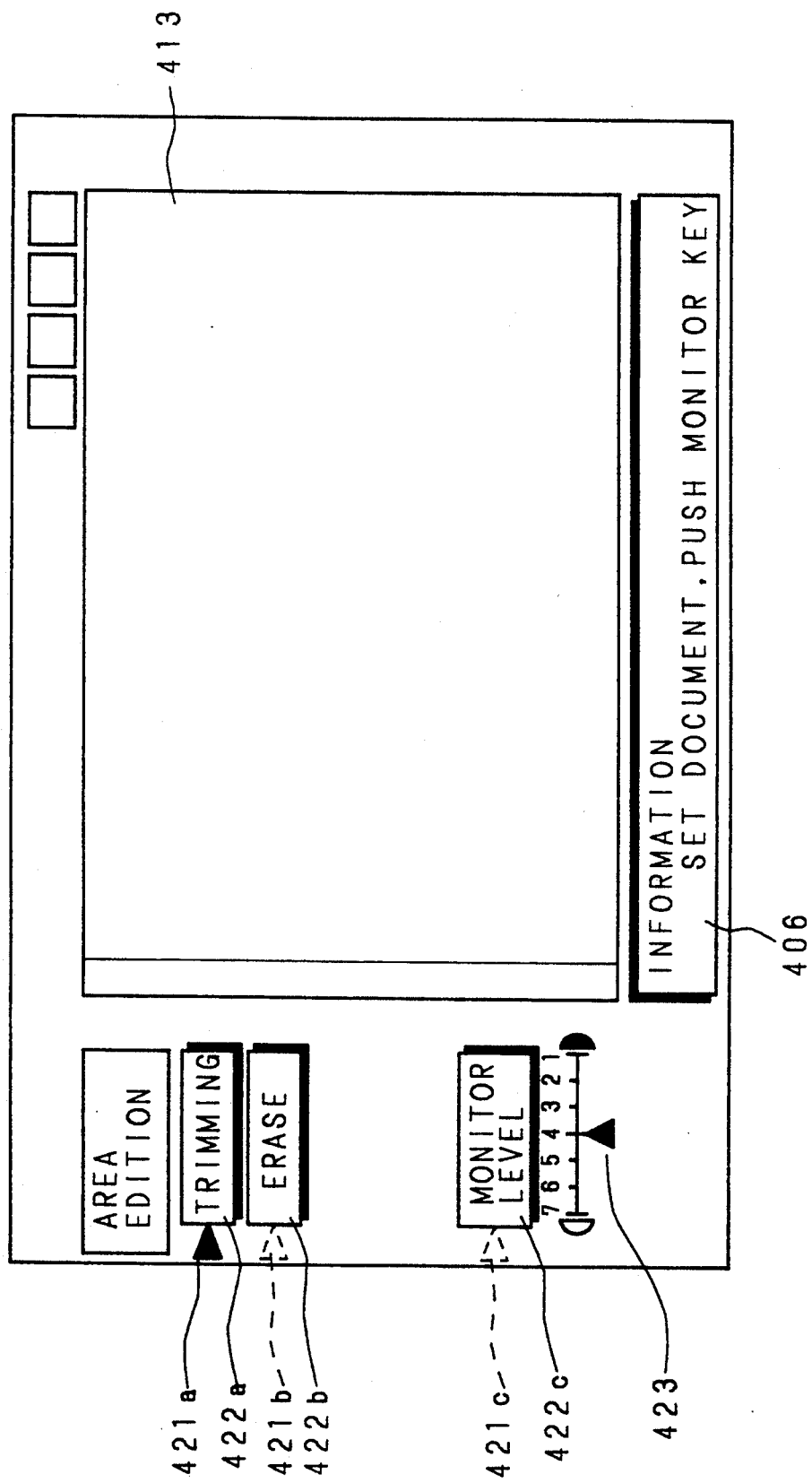

FIG. 8 is a schematic view showing the displayed contents (hereinafter referred to as display $D_3$) when the area edition menu 412a is selected in the state shown in FIG. 7, in which when the joy ball 313 is rotated to move the menu cursor to 411a and the set key 314 is turned on, a screen shown in FIG. 8 appears. In the screen, three kinds of menus 422a~422c are shown. Hence, the menu 422c of the "monitor level" is for changing comparison data which is a threshold when converting to display data from the document image data in the image monitor display. A density rate of the comparison data is shown in seven stages in the monitor level display 423.

Figure 9:
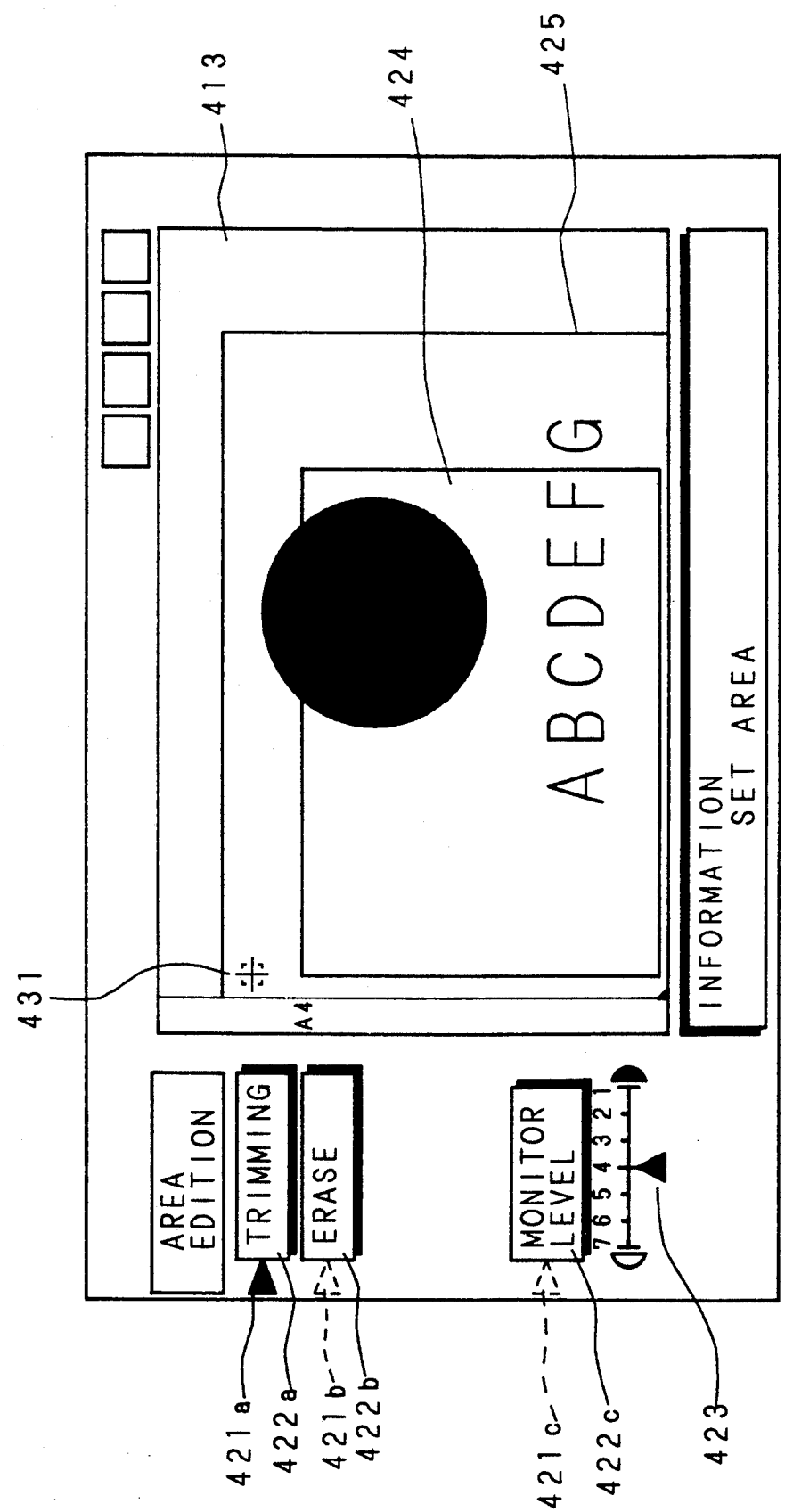

FIG. 9 is a schematic view showing the displayed contents (hereinafter referred to as $D_4$) when the image monitor display is finished in accordance with the information display in the state shown in FIG. 8. In the figure, when the document is set on the original glass plate 15 and the monitor key 316 is turned on responsive to the information display, the document is scanned by the scanner 10 and the document image is displayed in the image monitor area 413 when the scanning is completed. When the trimming menu 422a is selected while the document image is displayed, a position appoint cursor 431 appears in the image monitor area 413. At this time, in the image monitor area 413, an effective image area frame 424 indicating an area to be copied actually corresponding to the paper size selected, and a document frame 425 indicating the document edges are displayed together with the document image.

Figure 10:
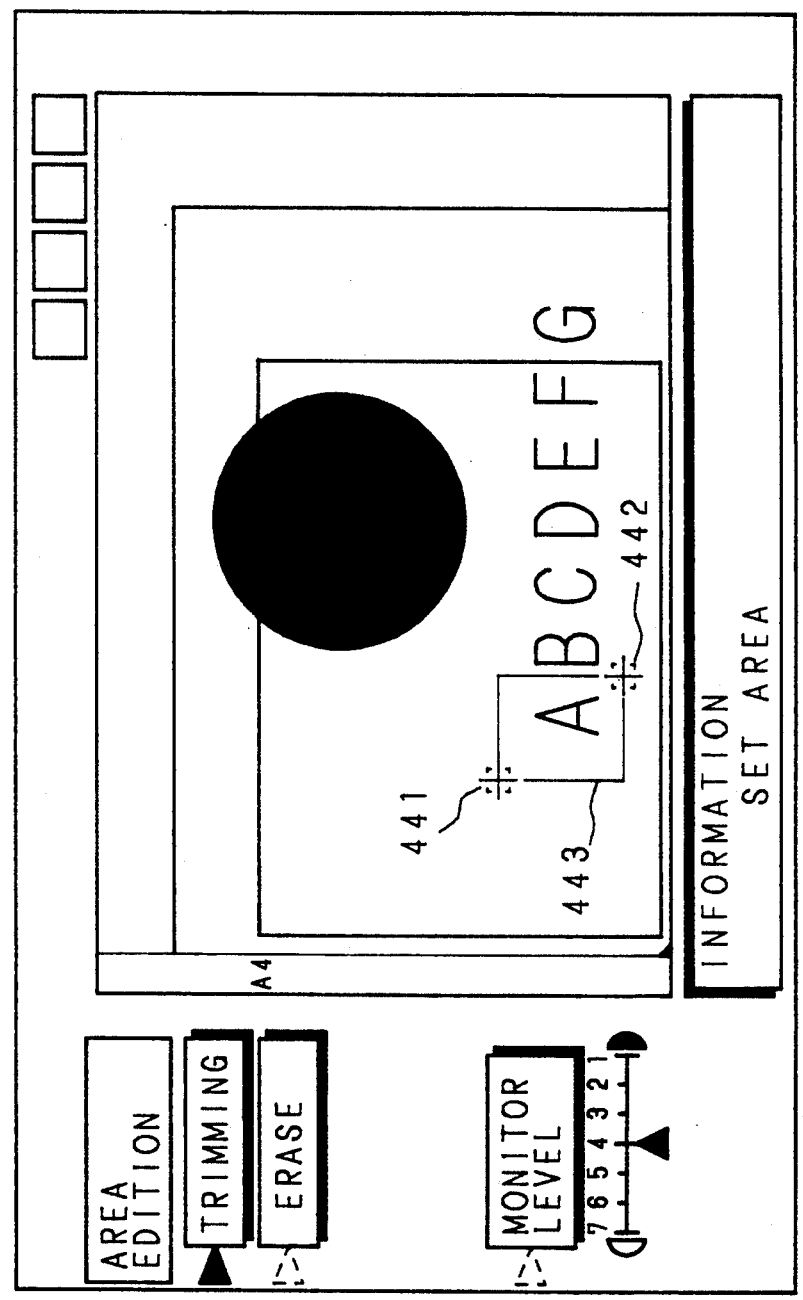

FIG. 10 is a schematic view showing the displayed contents (hereinafter referred to as display $D_5$) in the case where area setting of the trimming mode is actually conducted in the state shown in FIG. 9. When the joy ball 313 is rotated to move the position appoint cursor 431 from a position shown in FIG. 9 to a setting position 441 shown in FIG. 10 and the set key 314 is turned on, the position appoint cursor 431 is fixed and displayed at the positon 441. When the joy bal 313 is further rotated to move the position appoint cursor 431 from the position 441 to a position 442 and the set key 314 is turned on, the position appoint cursor 431 is fixed and displayed at the position 442. A quadrangle 443 having two points fixed and displayed in such a way as opposite ends of a diagonal thereof is designated as a trimming set area.

Figure 11:
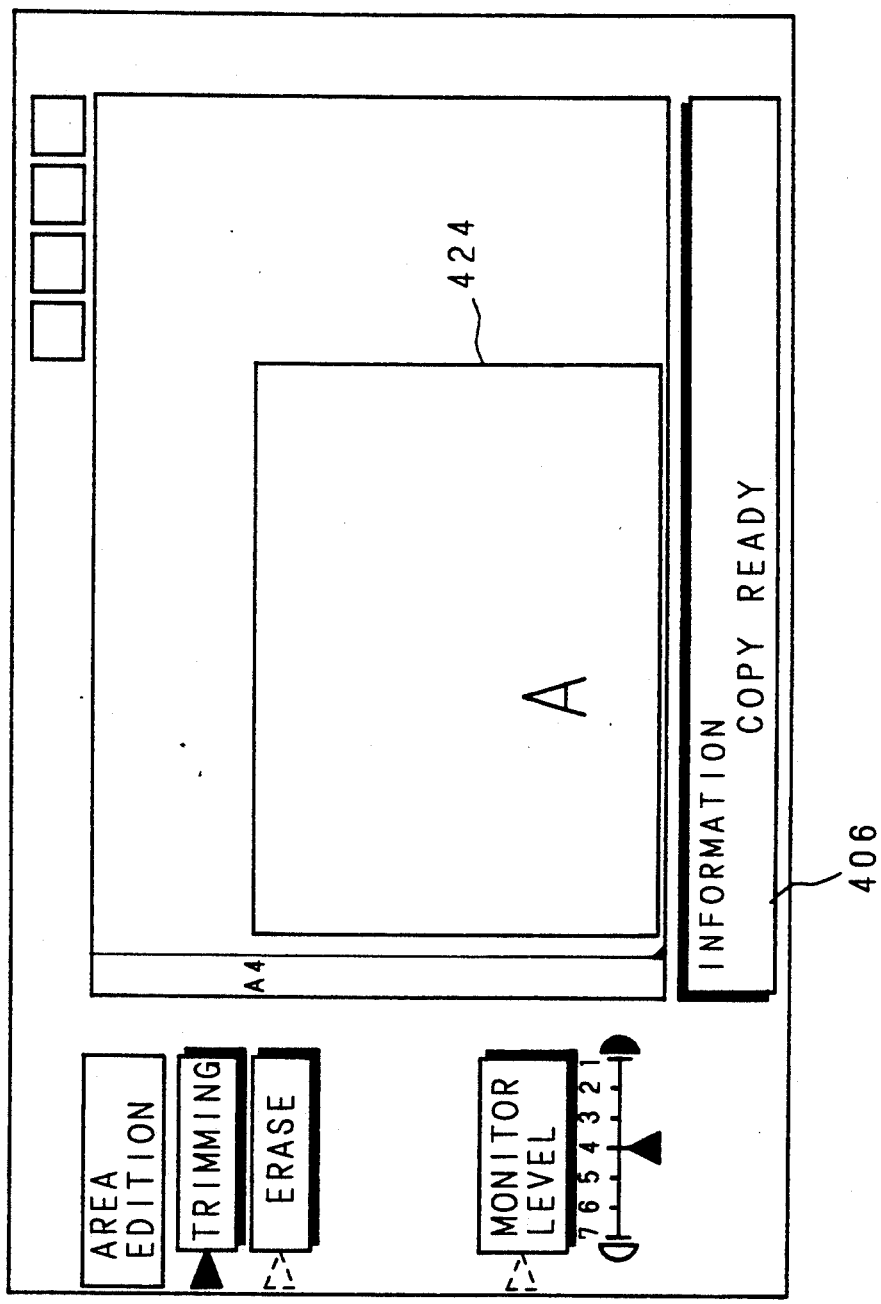

FIG. 11 is a schematic view showing the displayed contents (hereinafter referred to as display $D_6$) when the set key 314 is turned on after the positon of the second point is set in the state shown in FIG. 10. When the set key 314 is turned on after setting the trimming area, the image (A) in the set area is remained and the rest is erased. At this time, the effective image area frame 424 is remained displayed so that whether the remained image can be copied is judged easily. Now the area setting in the trimming mode is completed, so that "COPY READY" is displayed on the information display 406.

Procedures for setting the other area by the trimming mode after setting one area thereby will be described together with the displayed contents on the liquid-crystal display panel 222 on the occasion.

After setting one area (display $D_6$ shown in FIG. 11), first the set key 314 is turned on to display the document original image in the image monitor area 413 again as shown in FIG. 9 (display $D_4$). Then, at this time, the position appoint cursor 431 appears at the second position 442 in the previous area setting (refer to FIG. 10), and the quadrangle 443 indicating the previous set area appears, "SET AREA" being displayed on the information display 406. Then, exactly in the same way as the previous first area setting, the joy ball 313 is rotated to move the position appoint cursor 431 to a desired position, and the set key 314 is turned on to appoint the first point of a new set area. Next, the second point of the new set area is appointed in in the same way. Then, in the image monitor area 413, while the document image in the previous and new set areas being remained, the rest of the image is erased, and "COPY READY" is displayed on the information display 406.

By repeating such operations, the third, fourth . . . area can be set.

Procedures for setting an erase area in the set area in the trimming mode will be described together with the displayed contents on the liquid-crystal display pannel 222 on the occasion.

First, the joy ball 313 is rotated in the direction Y(−) to move the menu cursor 421a so as to light 421b, then the set key 314 is turned on to change to the erase mode from the trimming mode. Next, exactly in the same way as the area setting of the trimming mode, an erase mode area is set.

Figure 12:
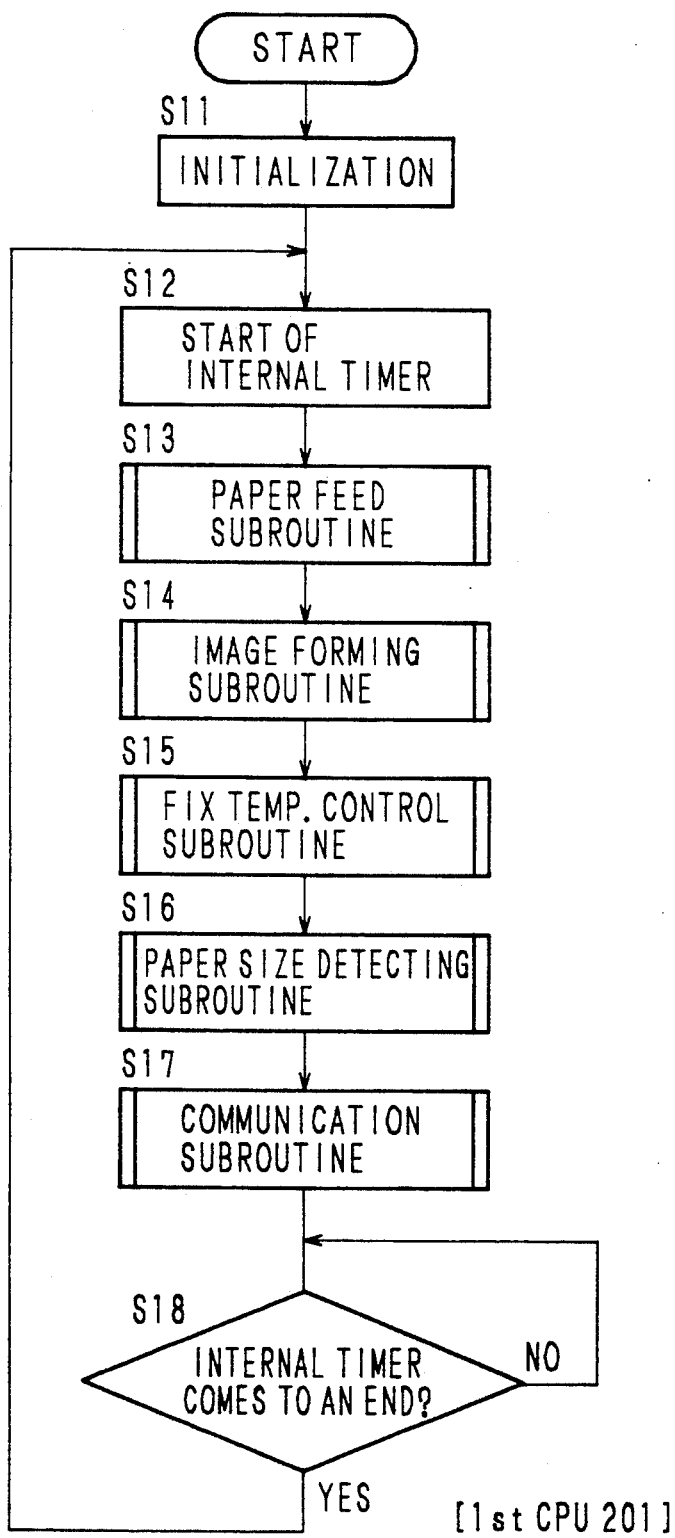
FIG. 12 is a flow chart showing a main routine of a first CPU 201.

FIG. 12 is a flow chart showing a main routine of the first CPU 201 which controls the engine portion 23. First, when a power is switched on, in Step S11, various timers, flags, counters and so on which are to be used in the subsequent subroutines are initialized, thereafter an internal timer value which serves as a reference time of the following processings is set to start (Step S12).

Then, the processings continue as follows, transportation of the copy paper is controlled (Step S13), charging, developing in the vicinity of the photosensitive drum 41 are controlled (Step S14), temperature of the fixing unit 48 is controlled (Step S15), a paper size in the paper feed tray 50 is detected (Step S16), serial communications with the second and third CPUs 202, 203 are conducted (Step S17), and the procedure is returned to Step S12 after the end of the internal timer to restart it (Step S18).

Figure 13:
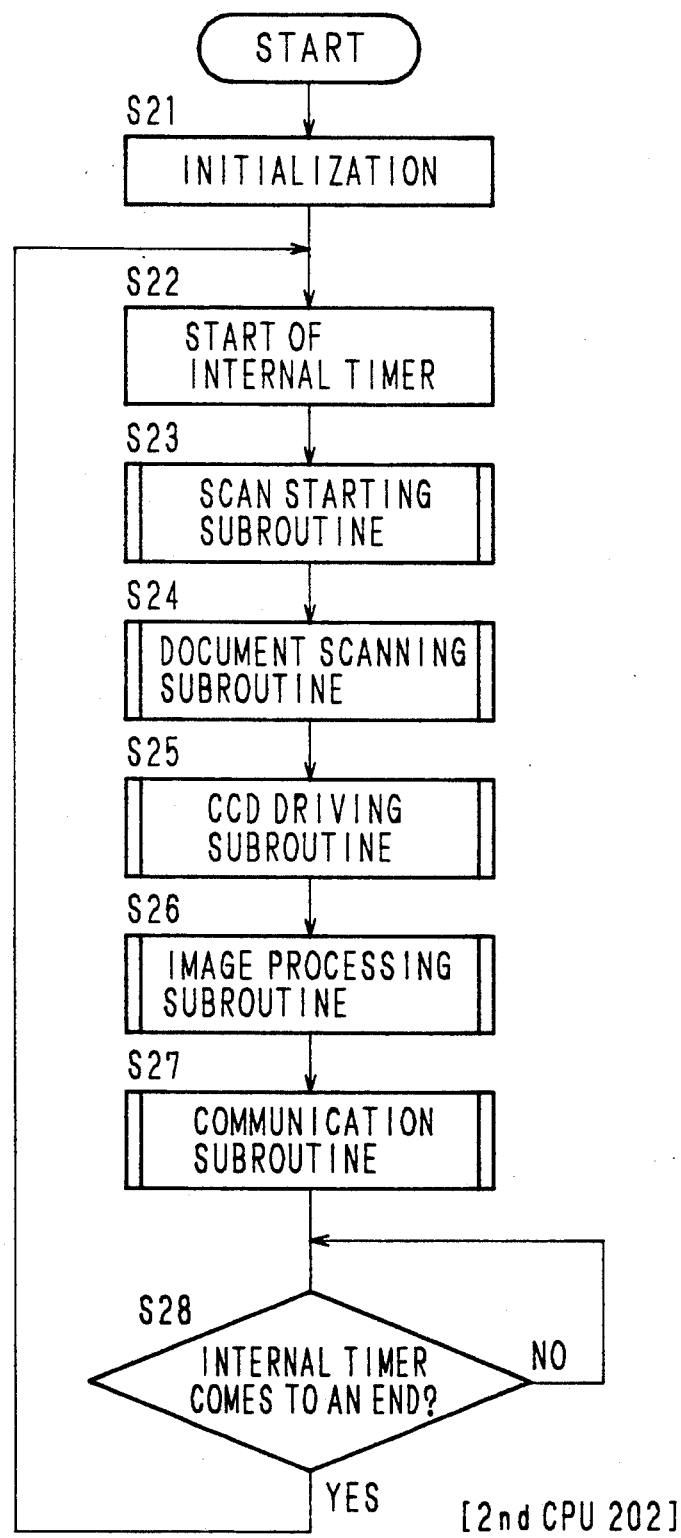
FIG. 13 is a flow chart showing a main routine of a second CPU 202.

FIG. 13 is a flow chart showing a main routine of the second CPU 202 which controls the image reader 22. First, when a power is switched on, after initializing various timers, flags, counters and so on which are to be used in the subsequent subroutines in Step S21, an internal timer value which serves as a reference time of the following processings is set to start (Step S22). Then, start of scanning is controlled in response to the instruction from the third CPU 203 (Step S23), and a speed and position of the scanning motor 11 are controlled so as to scan a document in agreement with timing signals from the other CPUs (Step S24). In synchronism with the scanning operation, the CCD peripheral circuit 212 is controlled and the color CCD linear image sensor 14 is driven to obtain an image signal (Step S25). Various processings such as changing magnifications are conducted on the image signal thus obtained (Step S26), a serial communication with the first CPU 201 is executed (Step S27), and the procedure is returned to Step S22 after the end of the internal timer to restart it (Step S28).

Figure 14:
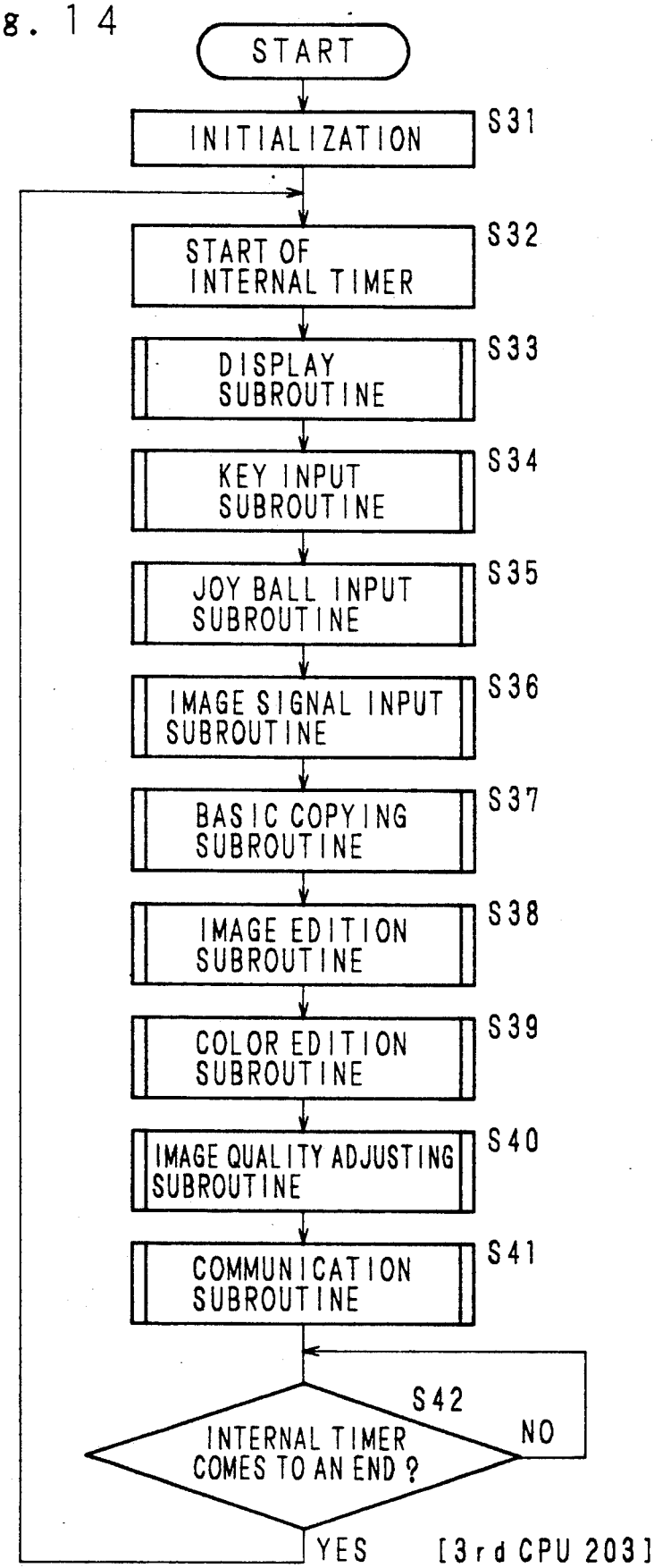
FIG. 14 is a flow chart showing a main routine of a third CPU 203.

FIG. 14 is a flow chart showing a main routine of the third CPU 203 which controls the control panel 300. First, when a power is switched on, after initializing various timers, flags, counters and so on which are to be used in the subsequent subroutines in Step S31, an internal timer value which serves as a reference time of the following processings is set to start (Step S32). Then, by providing display image data and commands to the LCD controller 221, the liquid-crystal display panel 222 is displayed (Step S33). Then, ON/OFF states of various keys 301∼312, 314∼316 on the control panel 300 are judged and the contents of the judgment are stored in the RAM 224 via the parallel I/O 216 (Step S34). Moreover, the rotating state of the joy ball 313 is judged and the content thereof is stored in the RAM 224 via the A/D conversion I/O 218 and a flag to be described later is produced (Step S35). The image signal converted in the image signal conversion circuit 225 is stored in the RAM 224 via the parallel I/O 220 (Step S36). Thereafter, the processings continue as follows, various processings in a basic copying mode are conducted in response to input processings in Steps S34, S35 (Step S37), various processings in an image edition copying mode and a color edition copying mode are executed in response to input processings in Steps S34, S35, S36 (Steps S38 and S39), various processings in an image quality adjusting state are performed in response to input processings in Steps S34, S35 (Step S40), serial communications with the first and second CPUs 201, 202 are conducted (Step S41), and the procedure is returned to Step S32 after the end of the internal timer to restart it (Step S42).

Figure 15:
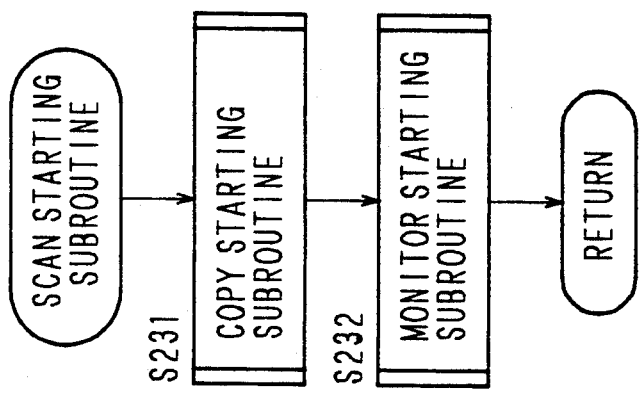
FIGS. 15, 16, 23, 25, 26, 29~34, and 38a–38b are flow charts showing subroutines of the main routines.

FIG. 15 is a flow chart showing the contents of a scan starting routine in Step S23 of FIG. 13. The processings are divided into the scanning start for the actual copying operation (Step S231) and the scanning start for the document image monitor (Step S232). In Step S231, it is so arranged that the actual copying operation is canceled at monitor request.

Figure 16:
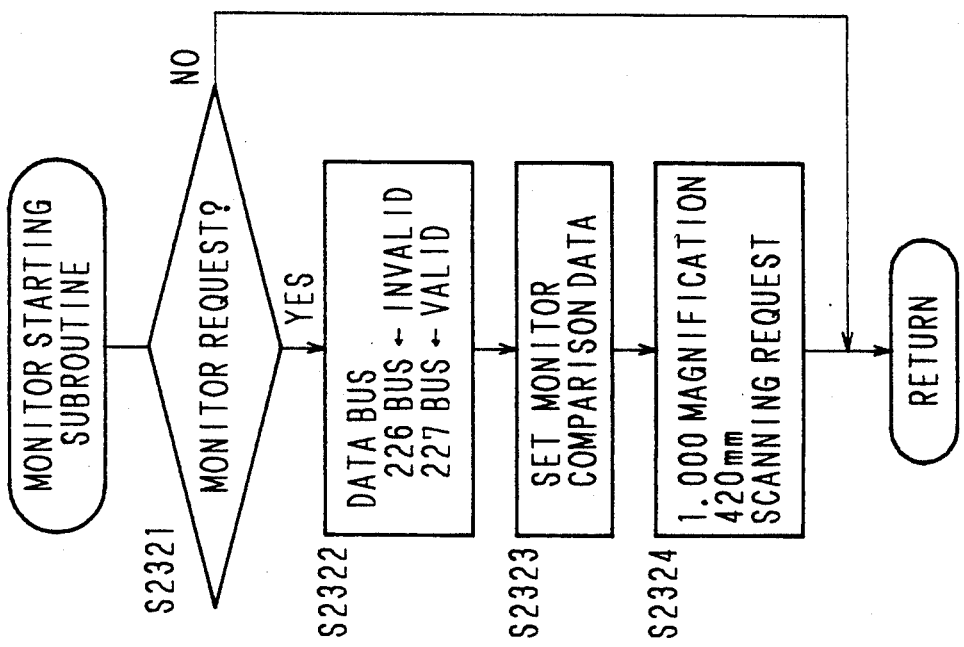

FIG. 16 is a flow chart showing the contents of a monitor starting routine in Step S232 of FIG. 15. The monitor request from the third CPU 203 is transmitted to the second CPU 202 by a serial communication, and after receiving the request (Step S2321 YES), a data bus 226 is made invalid and a data bus 227 is made valid (Step S2322). That is, at this time, the image signal obtained by the color CCD image sensor 14 when the document is scanned, is sent to the image signal conversion circuit 225 after processed in the image signal processing circuit 213. Then, after setting monitor comparison data to be described later (Step S2323), the scanning request of the document at 1.000 magnification and 420 mm (A3 length) scanning length is made (Step S2324).

Subsequently, in Step S24 (refer to FIG. 13), the scanning motor 11 is driven is response to the magnification and scanning length for document scanning, and the image signal is stored in the RAM 224 via the parallel I/O 220 after being converted in the image signal conversion circuit 225. The document size (position) is detected on the basis of the image signal, obtained by the scanning.

Figure 17A:
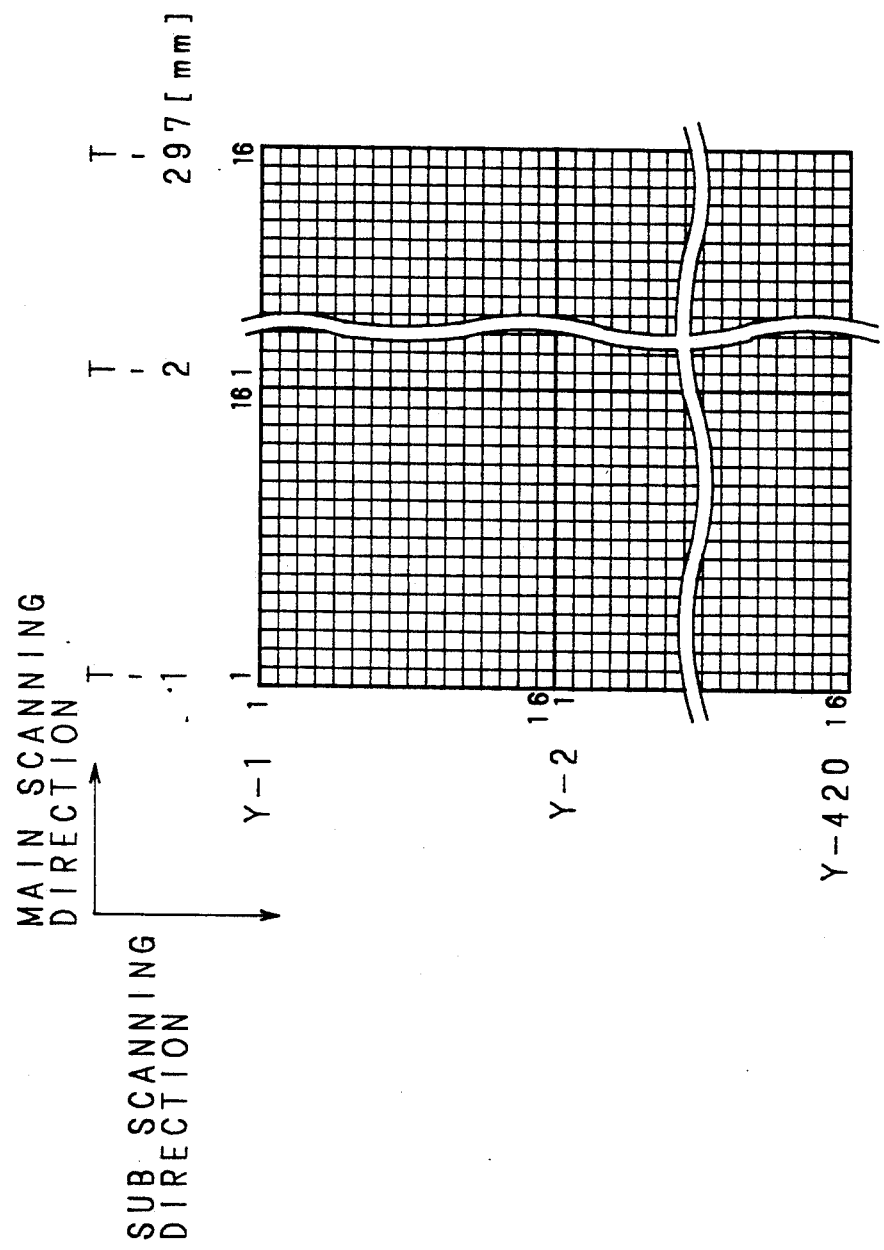
FIGS. 17a–18 are schematic views for illustrating the operating contents of an image signal conversion circuit.
Figure 17B:
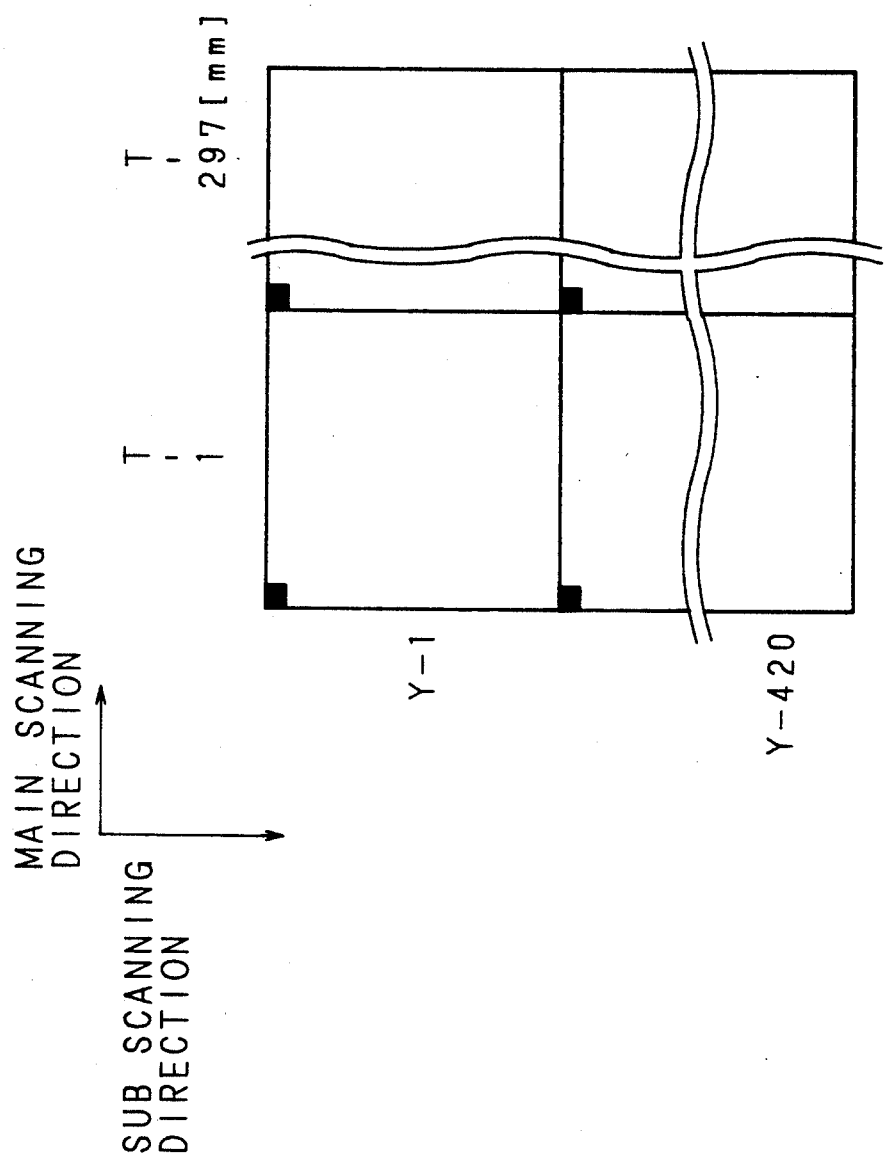
Figure 18:
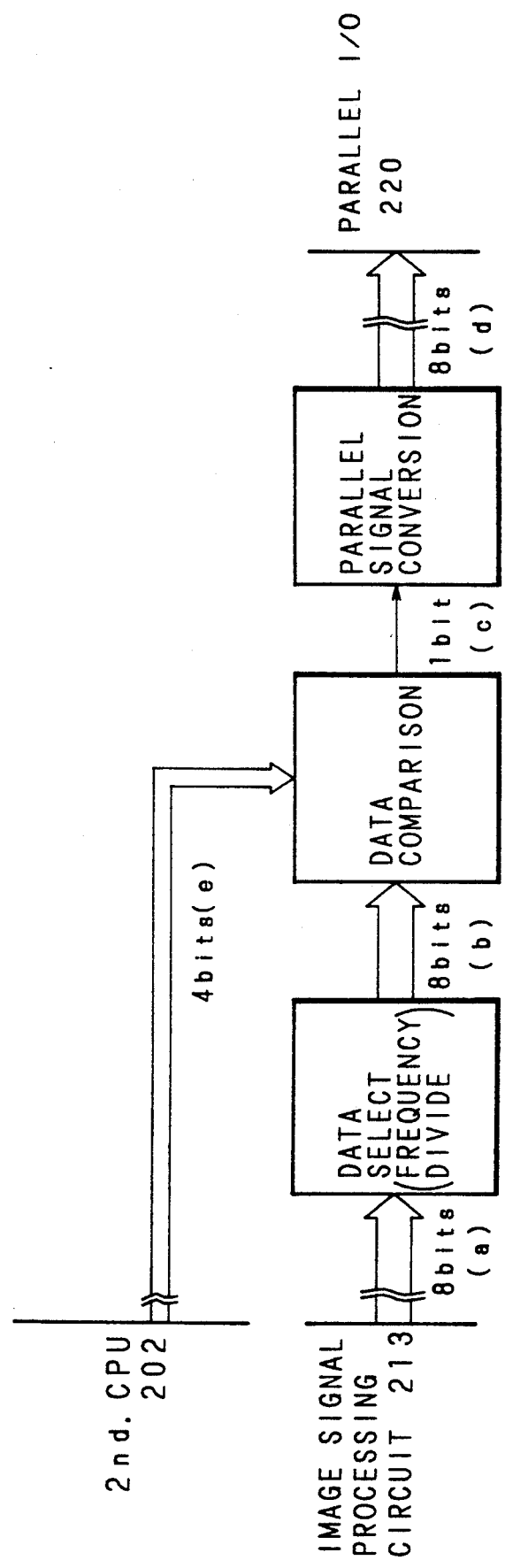

FIGS. 17 and 18 are schematic views for explaining the operating contents of the image signal conversion circuit 225. Relative to the reading of the CCD linear image sensor 14 made in 8 bits (gradation) per dot at a resolution of 16 dots/mm, in the display on the liquid-crystal display panel 222, 1 mm of a document is corresponded to 1 dot liquid crystal so as to be displayed by a binary of ON-OFF at a resolution of 1 dot/mm, therefore the image signal is converted in the image signal conversion circuit 225. FIG. 17(a) shows an image reading signal and FIG. 17(b) shows an image displaying signal. Though the image signal of 8 bits in every 1/16 mm square is obtained at reading, a signal used for display is the signal of only one time (8 bits) in every 1 mm square.

In FIG. 18, first, in the image signal conversion circuit 225, an image signal (b) of 8 bits required is selectively extracted by a hexadecimal frequency division of an image signal (a) of 8 bits from the image signal processing circuit 213. The high-ranking 4 bits of the image signal (b) of 8 bits and a monitor comparison data (e) of 4 bits instructed from the second CPU 202 are compared and the result is outputted in 1 bit date (c). The 1 bit data (c) is outputted as "1" when the high-ranking 4 bits of the image signal (b) is larger than the monitor comparison data (e), and as "0" when the former is same as or smaller than the latter. When "1" is outputted, a liquid crystal comes on, and when "0" is outputted, it goes off. For example, if (a)=10010011 in the image signal (a) by a binary notation, when SL (comparison data)=8=1000 (binary notation), "1" is outputted and the liquid crystal will come on, but when SL=10=1010 (binary notation), "0" is outputted and the liquid crystal will go off.

Meanwhile, the 1 bit data (c) is recorded in order in 8 bits parallel data (d), which is outputted to and stored in the RAM 224 via the parallel I/O 220. For example, in the case of A3 length of 297 mm×420 mm, the sequence of output is in order of (T-1, Y-1)→(T-2, Y-1)→ ... →(T-297, Y-1) →(T-1, Y-2)→ ... →(T-297, Y-420), and the image data of 297×420=124.74 (k bits) are stored in the RAM 224. The monitor comparison data (e) of 4 bits instructed from the second CPU 202 is the data indicating a threshold level of a display density, and since this data is variable by the joy ball input on the control panel 300 as to be described later, the monitor image can be adjusted to any density desired.

Figure 19:
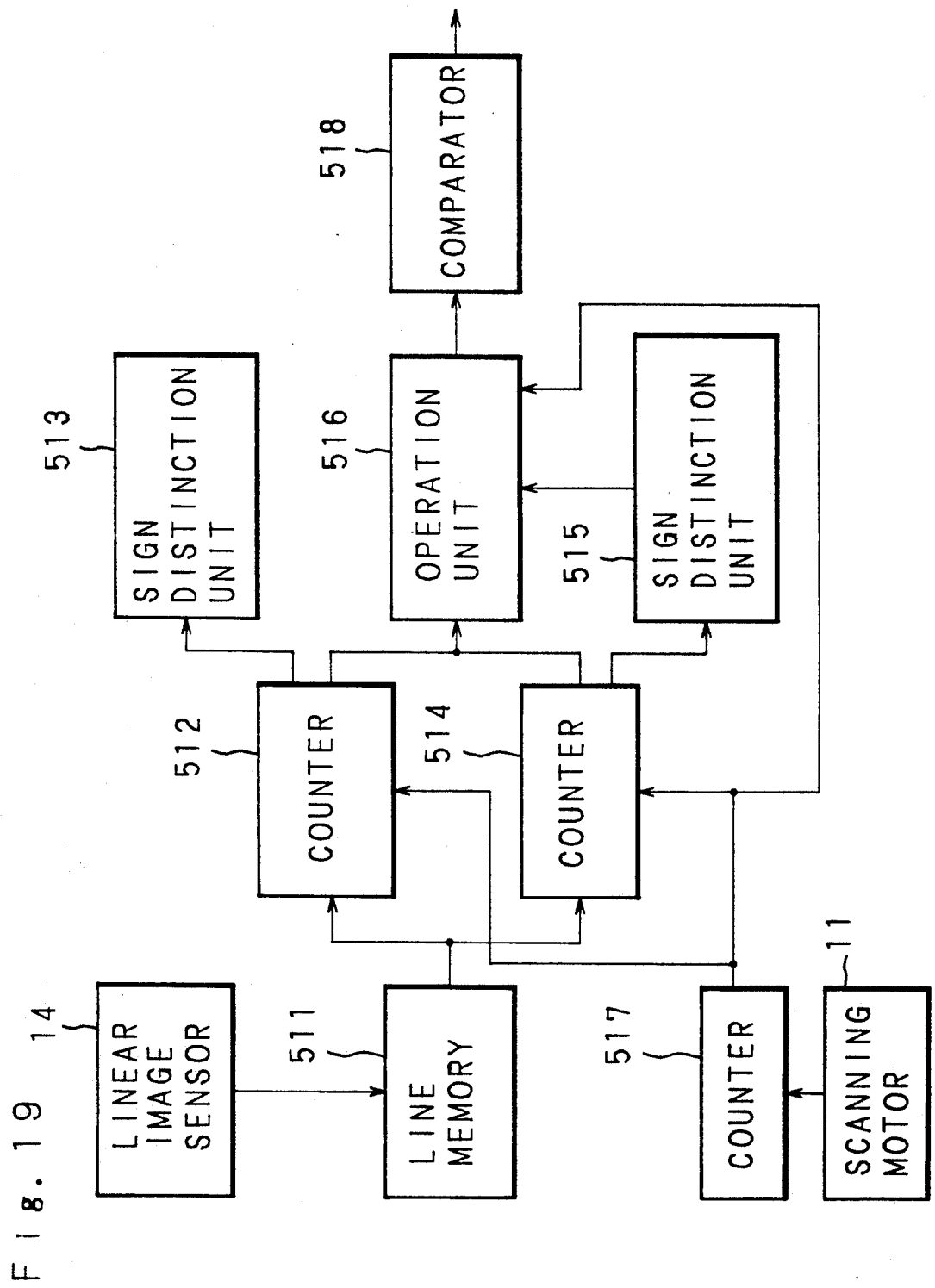
FIG. 19 is a block diagram showing the configuration for detecting a document size.
Figure 20:
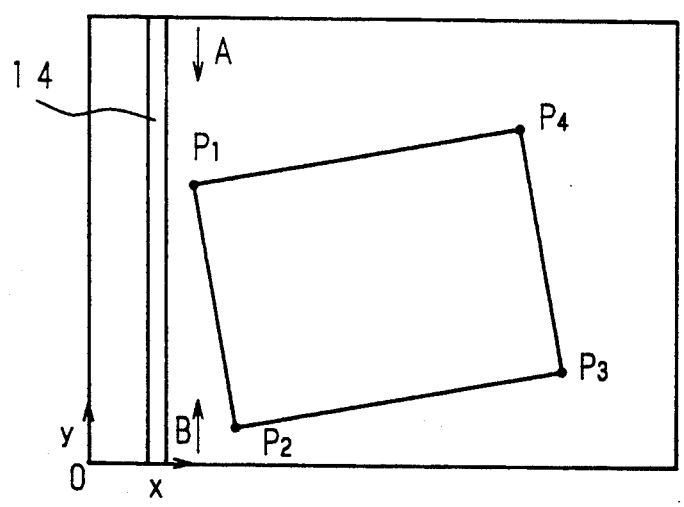
FIG. 20 is a schematic view for explaining the principle of detecting a document size.

Next, detection of a document size (position) will be described. FIG. 19 is a block diagram showing a systematic configuration for detecting the document size, and FIG. 20 is a schematic view for explaining the principle thereof. In FIG. 19, numeral 14 indicates a CCD linear image sensor, and in FIG. 20, a horizontal direction (direction x) is a scanning direction of the scanner 10 (CCD linear image sensor 14), and a vertical direction (direction y) is a direction parallel to each receptive element disposed in the CCD linear image sensor 14.

Depending upon whether a document read by the CCD linear image sensor 14 is placed, the white/black result of each picture element which is binary-coded by a predetermined threshold value is stored in a predetermined address of a line memory 511. For the data for one line stored in the line memory 511, a counter 512 counts the number of black picture elements in order from the high-ranking address (direction A in FIG. 20) till the presence of white picture elements, and stops counting when the white picture elements are found. Similarly, for the data for one line, a counter 514 counts the black picture elements in order from the low-ranking address (direction B in FIG. 20) till the presence of white picture elements, and stops counting when the white picture elements are found. The counters 512, 514 can count till a predetermined value (all picture elements for one line), and when detecting by the signal from the scanning motor 11 the timing whereat the scanning of the CCD linear image sensor 14 has advanced one step in the direction x, outputs respective count values to the corresponding sign distinction units 513, 515 and an operation unit 516.

The sign distinction units 513, 515 distinguish a sign of a count value difference of the adjoining lines (count value of a new line-count value of a previous line), and output the distinction result to the operation unit 516, which is also inputted the count values from the counters 512, 514. Numeral 517 denotes a counter which counts a position address in the direction x of the CCD linear image sensor 14 by the signal from the scanning motor 11. The counter 517 outputs the count value to the operation unit 516. In agreement with the increment of the counter 517, the counters 512, 514 are reset and start counting for the next line.

The operation unit 516 obtains positions (coordinates) of four vertexes of the document on the basis of said distinction result and count values from the counters 512, 514, 517, then calculates the length of four sides thereof and outputs the calculation result to a comparator 518. In the comparator 518, there is stored a regular copy paper size which is compared with the calculation result to detect the document size (position).

Next, the operation of detecting the document size (position) will be specifically described on the basis of an example wherein a document (four vertexes $P_1$, $P_2$, $P_3$, $P_4$) is placed as shown in FIG. 20. As shown in the figure, x, y coordinate system is set and the coordinates of respective vertexes are plotted at $P_1$ ($x_1$, $y_1$), $P_2$ ($x_2$, $y_2$), $P_3$ ($x_3$, $y_3$) and $P_4$ ($x_4$, $y_4$). While scanning the CCD linear image sensor 14 one line at a time in order rightward from the position x=0, picture elements (black) outside the document are counted from both the directions A and B at every line scanning until white picture elements are reached. If the count values of the counters 512, 514 are $A(x_i)$ and $B(x_i)$ respectively when the x-coordinate of the CCD linear image sensor 14 is $x_i$, from the values $x_i$, $A(x_i)$ and $B(x_i)$, the coordinates of the four vertexes $P_1$, $P_2$, $P_3$, $P_4$ are detected.

In the beginning of the scanning (until $P_1$ is reached), since there is no document placed in the area, the count values of the counters 512, 514 are the number of all picture elements for one line, but when $P_1$ is reached, the count values of the counters 512, 514 become less than the predetermined value (all picture elements for one line) for the first time. The sign distinction units 513, 515 respectively watch the values $A(x_i+1)-A(x_i)$, $B(x_i+1)-B(x_i)$, so that it can be judged that $P_1$ is reached because the value of $A(x_i+1)-A(x_i)$ takes the value other than 0. And the position of $P_1$ is known by the count value (x-coordinate) from the counter 517 and the count value (y-coordinate) from the counter 514 at this time. For $P_2$, it can be obtained by checking a sign of $B(x_i+1)-B(x_i)$. The difference is minus until $P_2$ is reached, but it becomes plus when $P_2$ is passed. Accordingly, by the count values of the counters 514, 517 at a time point when the difference turns into plus from minus, the position of $P_2$ is detected.

Next, by the count values of the counters 514, 517 at a time point when a sign of $A(x_i+1)-A(x_i)$ change to plus from minus, the position of $P_4$ can be detected. Finally, by the count values of the counters 514, 517 at a time point when they returned to the predetermined values, the position of $P_3$ can be detected.

The lengths of four sides of the document are detected by the operation unit 516 using the coordinates of the four vertexes obtained in such a manner. First, $P_1P_2$ is calculated according to the following formula (1), and the lengths of the other three sides are calculated by the same calculating equation as the formula (1).

$$\overline{P_1P_2} = \sqrt{(x_2-x_1)^2 + (y_2-y_1)^2} \quad (1)$$

Lastly, the lengths of the four sides thus calculated and a regular copy paper size are compared by the comparator 518 to detect the document size.

Figure 21:
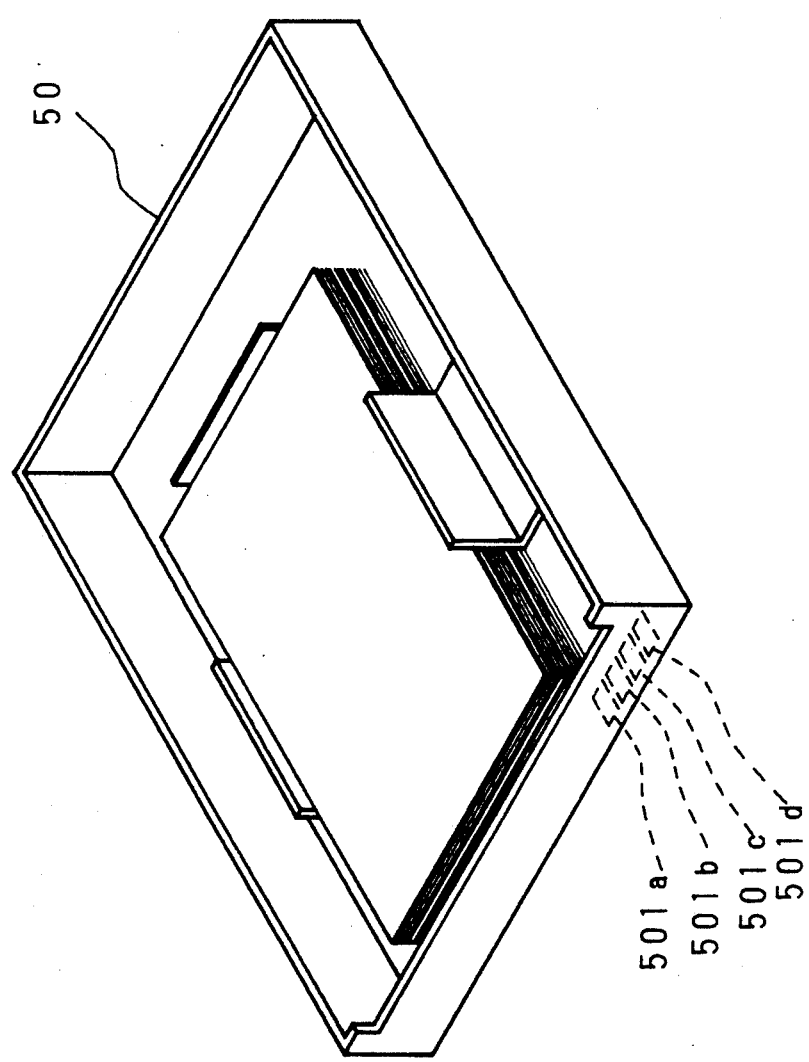
FIG. 21 is a perspective view of a paper feed tray.
Figure 23:
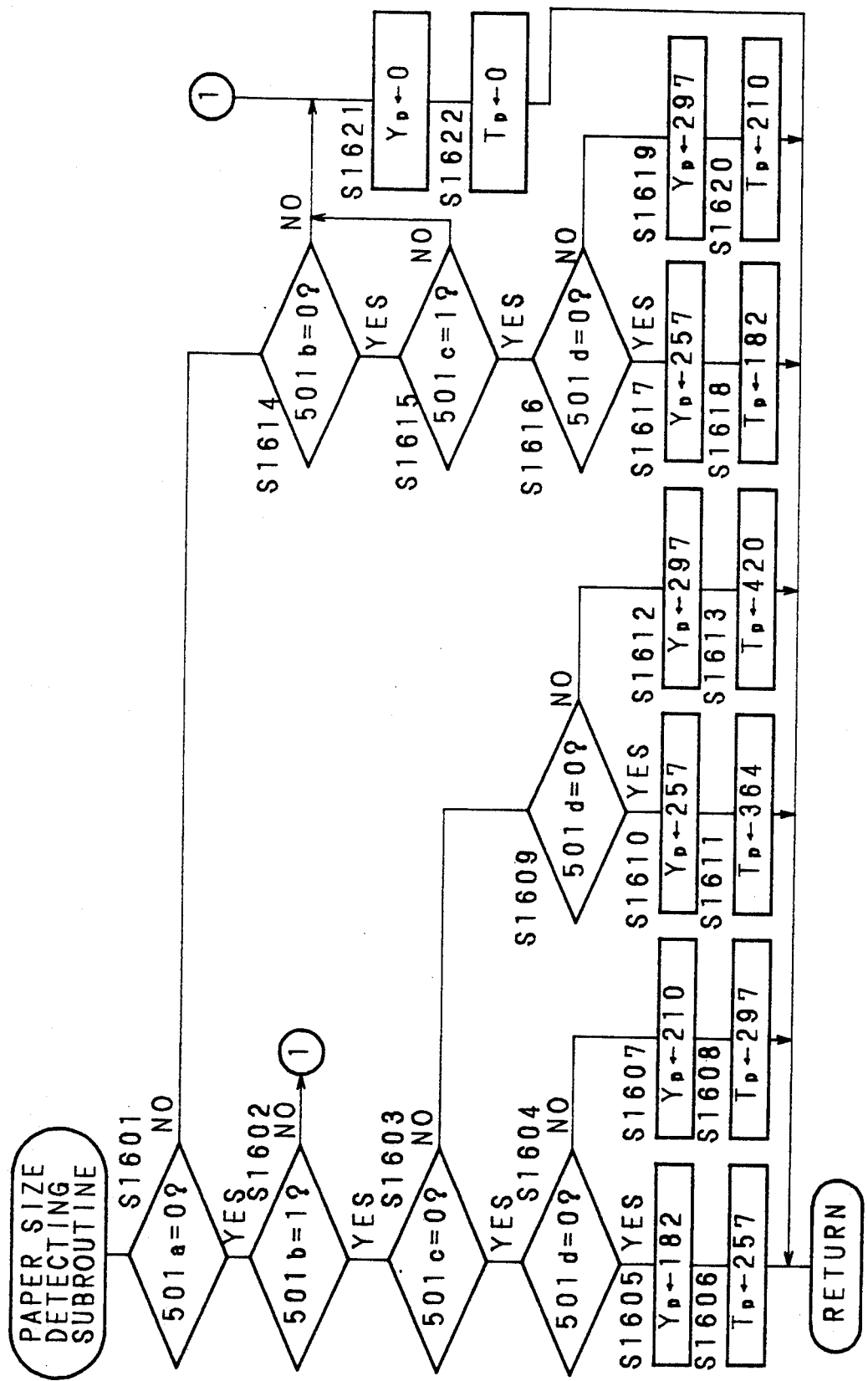

FIG. 21 is a perspective view of the paper feed tray 50, FIG. 22 is a table showing the relationship between the paper size and position and the magnet attached position, and FIG. 23 is a flow chart showing the contents of a paper size detecting routine shown in Step 16 of FIG. 12. As shown in FIG. 21, the paper feed tray 50 is provided with four magnets 501a~501d on its bottom, and when it is installed on a copying apparatus, attached states of the magnets are detected by a lead switch (not shown). The size and position of the paper contained in the paper feed tray 50 are detected by the relationship shown in FIG. 22 responsive to the detected result. The lead switch is a sensor included in a group of sensors 206 (refer to FIG. 5).

The attached state of the four magnets 501a~501d is judged (Steps S1601, S1602, S1603, S1604, S1609, S1614, S1615, S1616), and responsive to the results, the lateral paper lengths are set to $Y_p$ in mm, and the longitudinal paper lengths are set to $T_p$ in mm respectively (Steps S1605, S1606, S1607, S1608, S1610, S1611, S1612, S1613, S1617, S1618, S1619, S1620, S1621, S1622). By such processings conducted on the upper and lower paper feed trays 50 installed in two steps, $T_{p1}$, $Y_{p1}$ data in the upper tray and $T_{p2}$, $Y_{p2}$ data in the lower tray can be obtained. The results thus obtained are used for paper transfer, image forming and the other routines in the first CPU 201 itself, and sent to the second and third CPUs 202, 203 through a serial communication so as to be used as a judging factor for determining the scanning length in the former and as various displaying conditions in the latter.

In the following, the image monitor display and displays of the effective image area frame 424 and the document frame 425 will be described.

Figure 24:
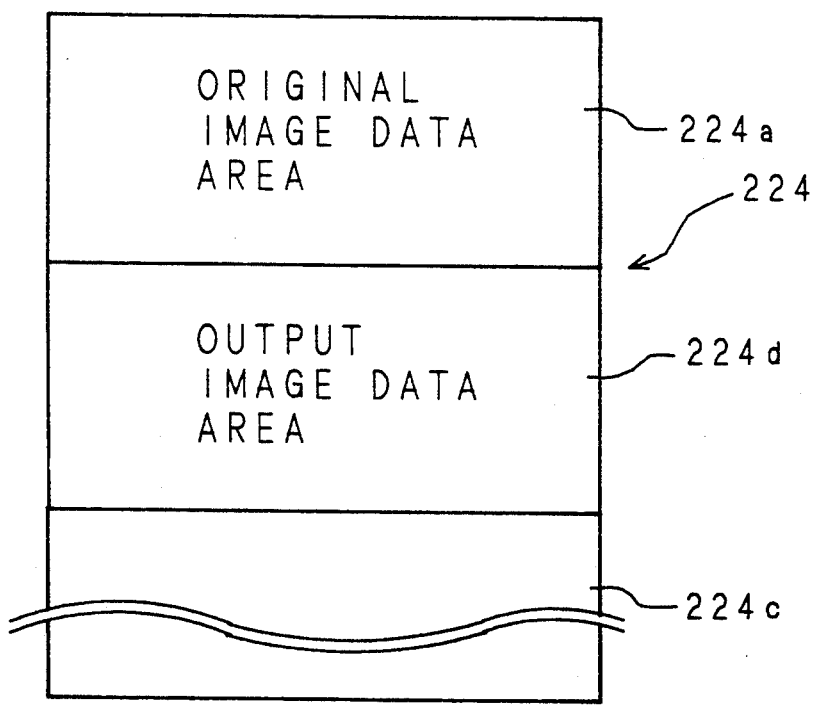
FIGS. 24 and 27 are schematic views showing a memory area of a RAM.

FIG. 24 is a schematic view showing a memory area of the RAM 224, which includes an original image data area 224a storing the original image data of the document read out and converted just into rough data for monitor display, an output image data area 224b storing the image data after the editing and change-magnification processings and an area 224c storing information such as various key inputs, joy ball input, etc. of the control panel 300. The image data areas 224a and 224b have a same capacity, for example, if A3 (297×420 mm) is a reference, 297×420×1=124740 bits ≈16k bytes are required. When the document is read, image data having the same contents as the original image data area 224a are stored in the output image data area 224b, and thereafter the contents are corrected as the editing operation proceeds in response thereto.

Figure 25:
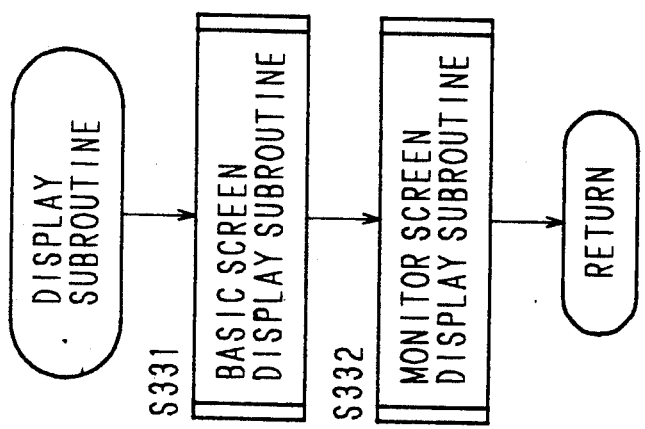

FIG. 25 shows the contents of a display routine in Step S33 of FIG. 14. The display processing is divided into a basic screen display (Step S331) and a monitor screen display (Step S332).

Figure 26:
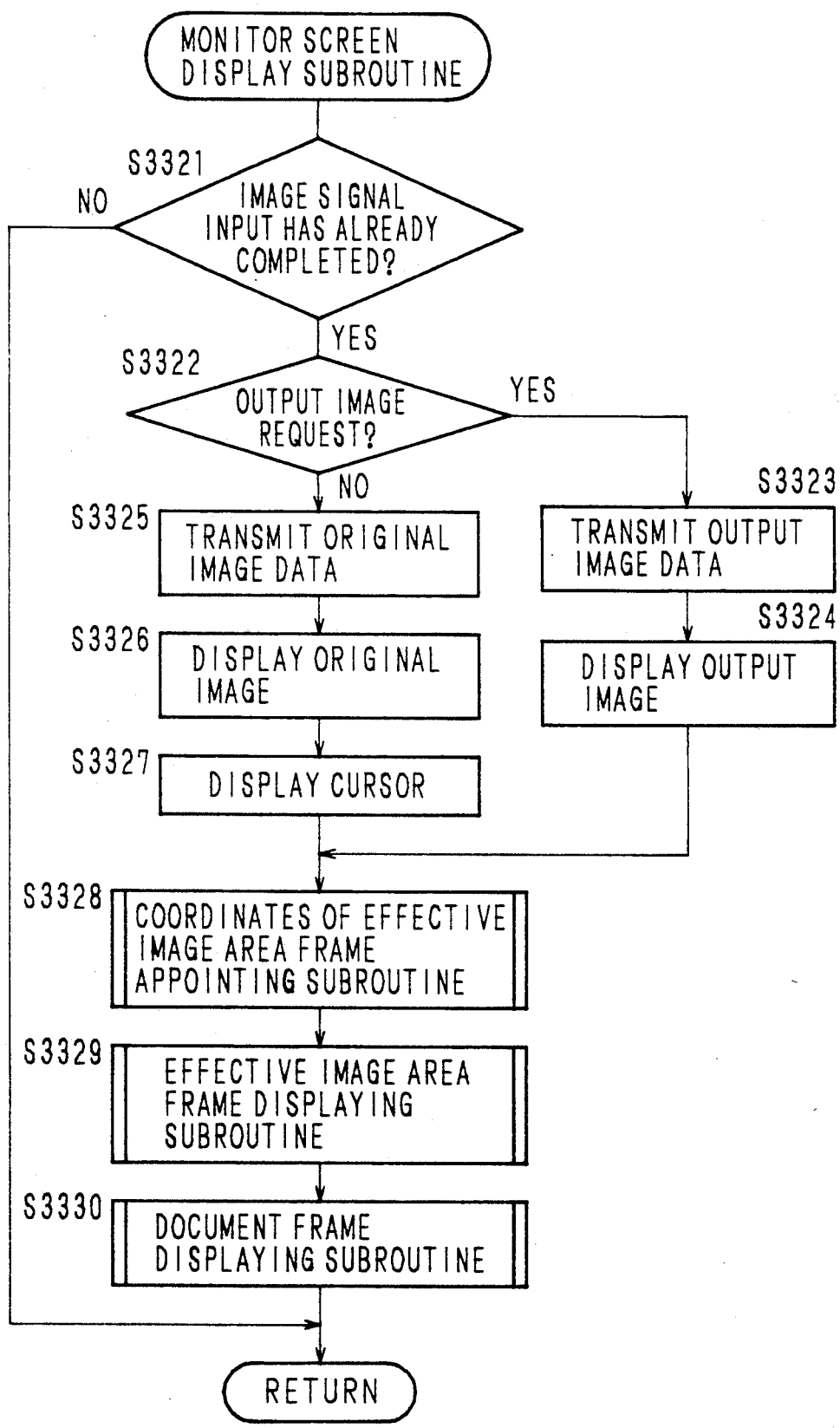

FIG. 26 is a flow chart showing the contents of a monitor screen display routine in Step S332 of FIG. 25, and showing the display control operation in the image monitor area 413 of FIGS. 8 (display D3) and 9 (display D4). When the monitor key 316 is turned on, the document is scanned by the control of the second CPU 202 (refer to FIGS. 13, 15, 16, 33), and when all of the image data are inputted to the RAM 224 of the third CPU 203 by the image signal input routine in Step S36 of FIG. 14 (Step S3321 YES), if the output image display based upon the results of changing magnification, editing, etc. is requested (Step S3322 YES), the output image data is transmitted to the VRAM in the LCD controller 221 (Step S3323) and displayed as shown in FIG. 11 (display D6) (Step S3324), and if not requested (Step S3322 NO), the original image data taken in is transmitted to the VRAM in the LCD controller 221 (Step S3325) and displayed as the document original image (Step S3326), and at the same time, the position appoint cursor 431 is displayed (Step S3327). The displayed contents in the image monitor area 413 are changed in such a manner.

Next, after appointing the coordinates of the effective image area frame (Step S3328), the area frame is composed and displayed in the image display (Step S3329). Then, the coordinates of the document frame are appointed on the basis of the document position data obtained in Step S24 (FIG. 13), and the area frame is composed and displayed in the image display (Step S3330). When it takes long time for displaying respective frames in Steps S3328, S3329, S3330, whether the frame display is completed is judged immediately before Step S3328, and if it is completed, the Steps S3328, S3329, S3330 may be skipped.

Figure 27:
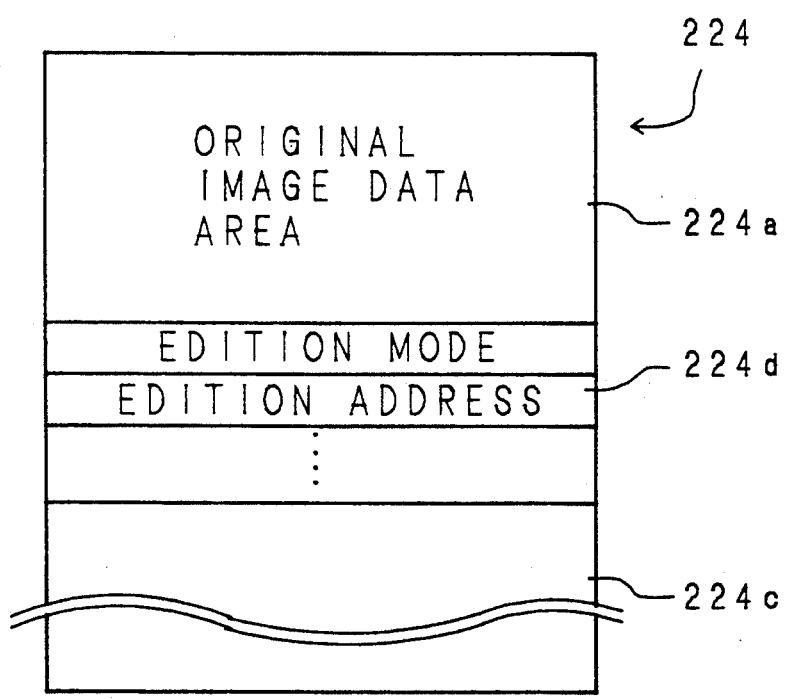

FIG. 27 is a schematic view showing a memory area of the RAM 224 of another embodiment. The RAM 224 includes an original image data area 224a as same as FIG. 24 for storing an original image data of the document read out and converted just into rough data for monitor display, a data area 224d for storing, whenever the editing, change-magnification and other operations proceed, information of the mode of these operations and addresses at each mode, etc., and an area 224c as same as FIG. 24 for storing information such as various key inputs, joy ball input, etc. For example, when the trimming mode is selected, in the data area 224d, information in which the editing mode is the trimming and address information of the vertexes of the trimming area are stored.

When the trimming mode is selected, outside the set area linking each vertex indicating the address contained, data which turns off the liquid crystal is transferred to the VRAM in the LCD controller 221, and inside the set area, the original image data is transferred thereto.

In the embodiment, though there is an advantage that the capacity of the RAM 224 may be smaller as compared with the embodiment aforementioned, it takes longer by the processing time for changing over the data than the aforesaid embodiment in which data stored can be outputted as it is, since the calculation by the third CPU 203 is required when transferring the data to the VRAM.

Figure 28:
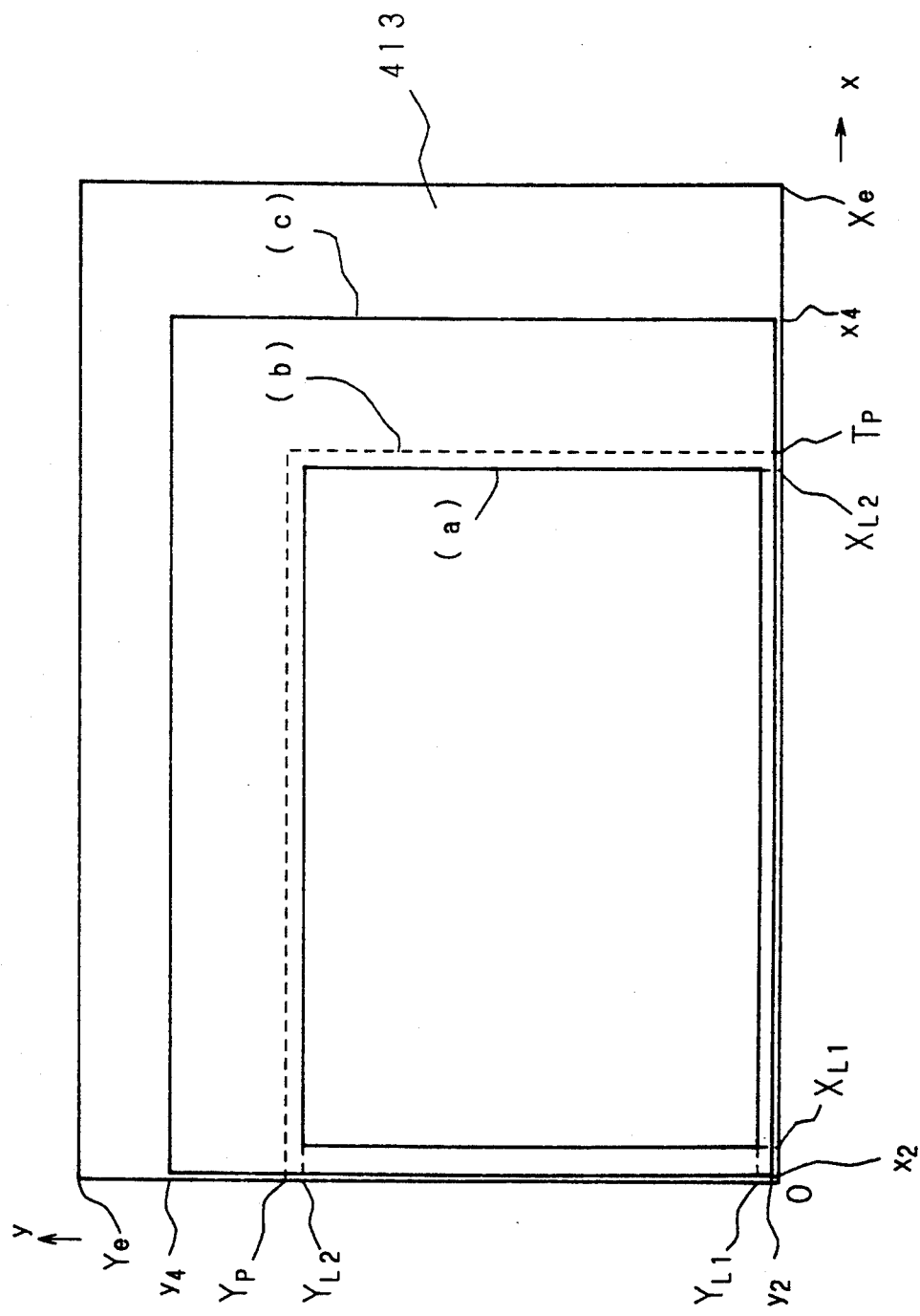
FIG. 28 is a schematic view showing the relationship between an effective image area frame, a paper frame and a document frame.

FIG. 28 is a schematic view showing the relationship between the image monitor area 413 corresponding to an entire area possible to read the document image, and the effective image area frame, paper frame and document frame. In the figure, a solid line (a) indicates the effective image area frame, a broken line (b) indicates the paper frame and a solid line (c) indicates the document frame respectively.

Figure 29:
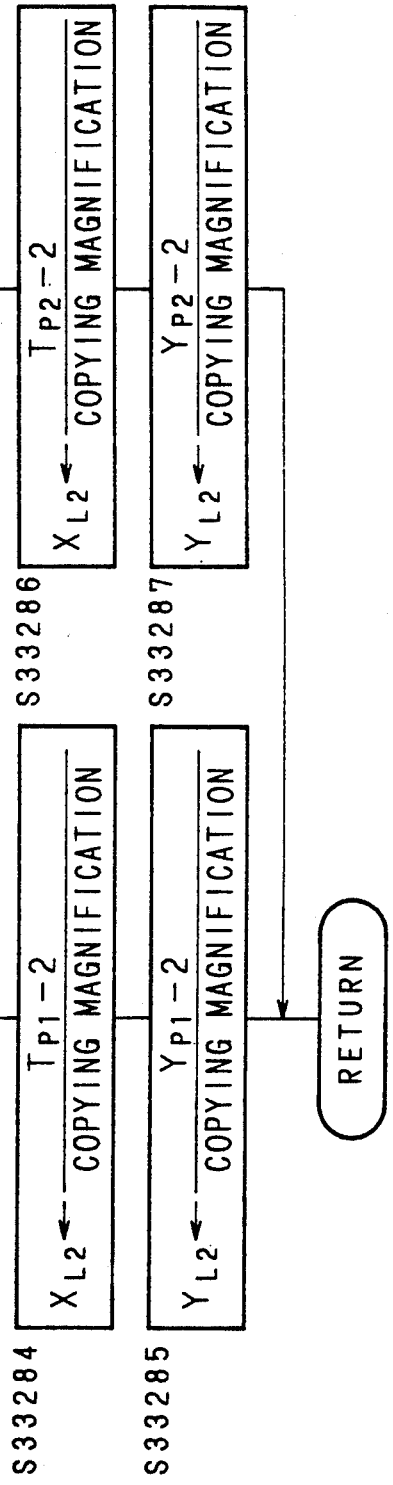

FIG. 29 is a flow chart showing the contents of an appointing routine of the effective image area frame coordinates in Step S3328 of FIG. 26, in which first the coordinates $X_{L1}$, $Y_{L1}$ shown in FIG. 28 are appointed (Steps S33281, S33282). Since image loss areas are insured on paper for 6 (mm) on the front edge and for 2 (mm) each on the side and rear edges, in its indication, $X_{L1}$(mm)=6/magnification and $Y_{L1}$(mm)=2/magnification are appointed respectively as the coordinates $X_{L1}$, $Y_{L1}$. When the upper paper feed tray 50 is selected (Step S33283 YES), the results calculated by using paper length data $T_{p1}$ and paper width data $Y_{p1}$ of the upper paper feed tray 50 obtained by the paper size detecting routine in Step S16 (FIG. 12) are set to $X_{L2}$ and $Y_{L2}$ (Steps S33284, S33285). Meanwhile, when the lower paper feed tray 50 is selected (Step S33283 NO), the results calculated by using paper length data $T_{p2}$ and paper width data $Y_{p2}$ of the lower paper feed tray 50 obtained by the paper size detecting routine in Step S16 (FIG. 12) are set to $X_{L2}$ and $Y_{L2}$ (Steps S33286, S33287).

Figure 30:
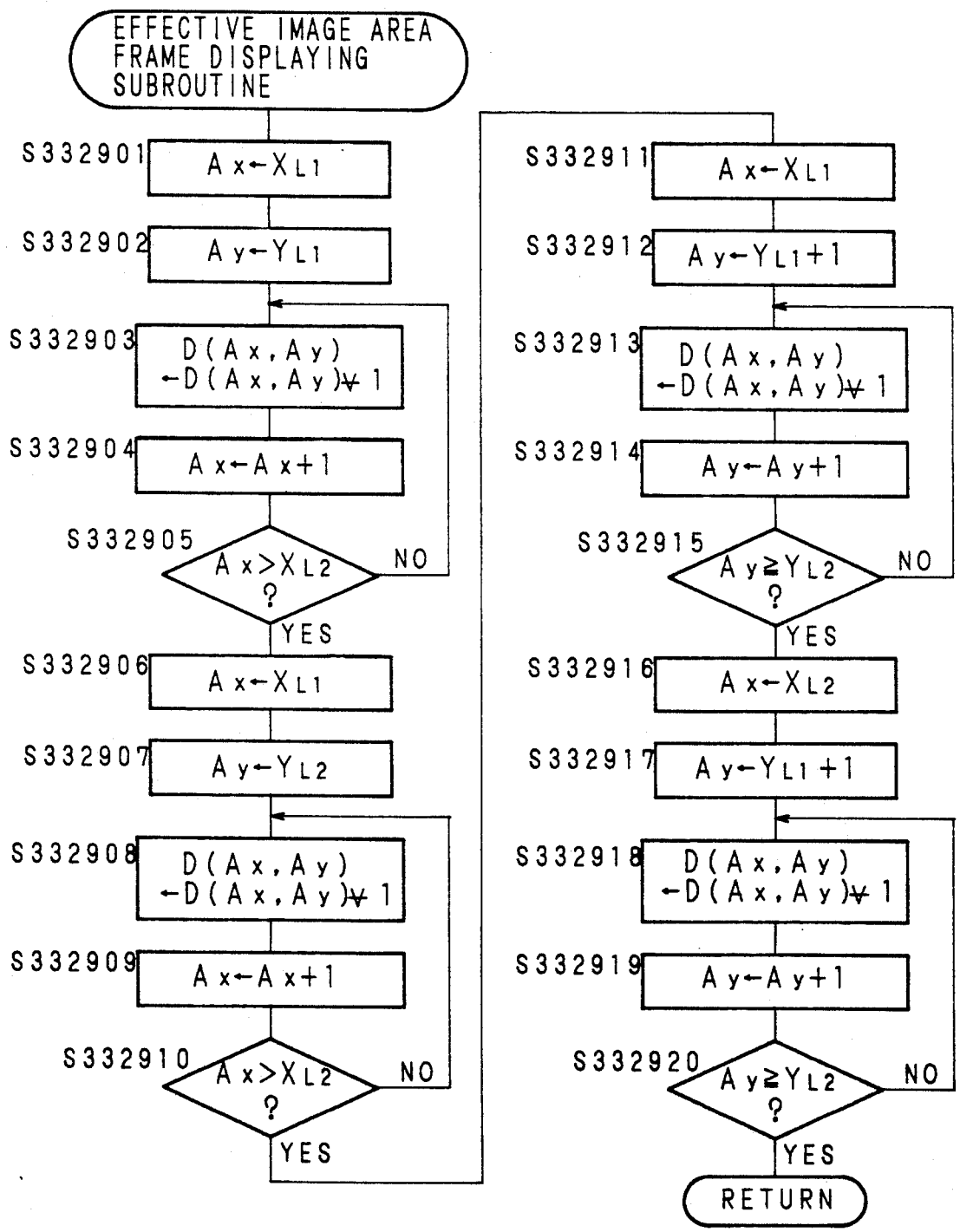

FIG. 30 is a flow chart showing the contents of an effective image area frame displaying routine in Step S3329 of FIG. 26, in which $X_{L1}$ is set to x-component address data Ax (Step S332901), and $Y_{L1}$ is set to y-component address data Ay (Step S332902). Next, display data D (Ax, Ay) of the image monitor area in the address are inverted by taking Exclusive OR of the data till then and "1" (Step S332903), and Ax is added one by one (Step S332904). The processing is continued until Ax becomes larger than $X_{L2}$ (Step S332905 NO), and a horizontal line is drawn from a position of the coordinates ($X_{L1}$, $Y_{L1}$) to a position of the coordinates ($X_{L2}$, $Y_{L1}$) of FIG. 28 by inverting OFF/ON of the liquid crystal contrary to the image data. When Ax surpasses $X_{L2}$ (Step S332905 YES), after resetting Ax and Ay to $X_{L1}$ and $Y_{L2}$ respectively (Steps S332906, S332907), the processing exactly as same as the previous processing is conducted (Steps S332908, S332909, S332910), and a horizontal line is drawn from the position of the coordinates ($X_{L1}$, $Y_{L2}$) to the position of the coordinates ($X_{L2}$, $Y_{L2}$) of FIG. 28.

Next, Ax and Ay are reset to $X_{L1}$ and $Y_{L1}+1$ (Steps S332911, S332912). Then, displaying data D(Ax, Ay) is inverted by taking Exclusive OR of the data till then and "1" (Step S332913) and added one by one to Ay (Step S332914). The processing is continued until Ay becomes or larger than $Y_{L2}$ (Step S332915 NO), and a vertical line is drawn from a position of the coordinates ($X_{L1}$, $Y_{L1}$) to a position of the coordinates ($X_{L1}$, $Y_{L2}$) of FIG. 28. When Ay becomes or larger than $Y_{L2}$ (Step S332915 YES), Ax and Ay are reset to $X_{L2}$ and $Y_{L1}+1$ (Steps S332916, S332917), and the processing exactly as same as the previous processing is conducted (Steps S332918, S332919, S332920), then a vertical line is drawn from a position of the coordinates ($X_{L2}$, $Y_{L1}$) to a position of the coordinates ($X_{L2}$, $Y_{L2}$) of FIG. 28. In such a manner, a frame 424 indicating the effective image area based upon the paper size contained in the paper feed tray 50 selected is composed and displayed on the crystal-liquid display panel 222 together with the original image.

Since the effective image area frame varies responsive to the copying magnification, a range in the document being copied can be easily confirmed even at a different magnification.

The purpose of providing the image loss area on the paper front edge is that the image can not be formed in the portion held by the chucking claw 52, and the reason for providing the image loss areas on the paper side and rear edges is to prevent a toner from adhering onto the transfer drum 51. In other words, the image loss areas are set to prevent the toner transfer outside the paper on the transfer drum 51 by taking into account of variations of the paper chucking positions. By displaying the effective image area frame, as compared with the paper size display, it can be known more correctly that which area of the document is to be copied.

Figure 31:
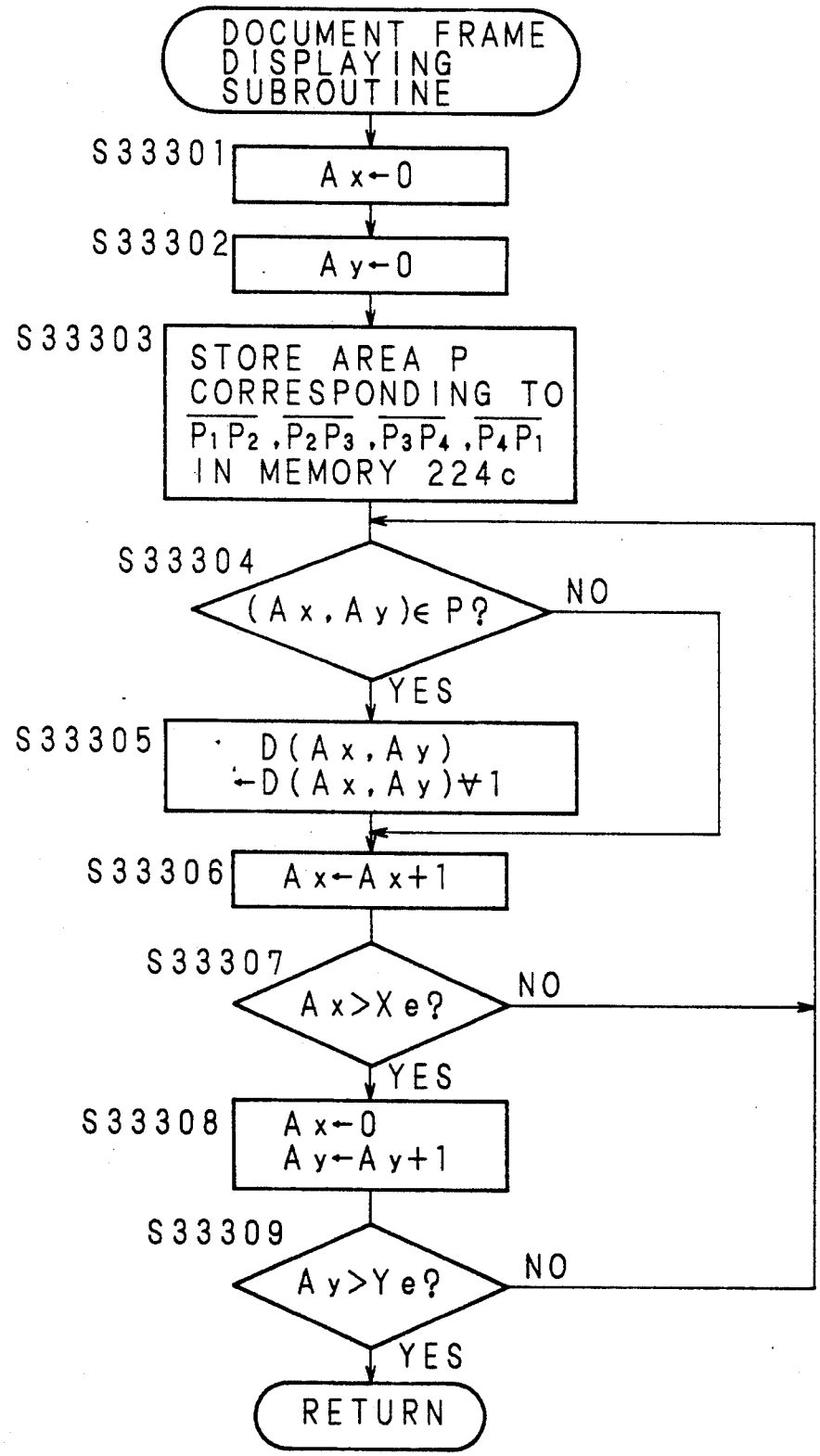

FIG. 31 is a flow chart showing the contents of a document frame display routine in Step S3330 of FIG. 26, in which on the basis of $P_1$, $P_2$, $P_3$, $P_4$ detected by the circuit shown in FIG. 19, $\overline{P_1P_2}$, $\overline{P_2P_3}$, $\overline{P_3P_4}$, $\overline{P_4P_1}$ are drawn on the liquid-crystal display panel 222.

First, address data Ax, Ay of x- and y-components are set to 0 (Steps S33301, S33302). Next, a document frame display area P of $\overline{P_1P_2}$, $\overline{P_2P_3}$, $\overline{P_3P_4}$, $\overline{P_4P_1}$ to be displayed on the image monitor area 413 on the basis of $P_1$, $P_2$, $P_3$, $P_4$ (refer to FIG. 20) detected by the circuit shown in FIG. 19 is stored in the memory 224c (Step S33303). Then, whether address data (Ax, Ay) are included in the document frame display area P is judged (Step S33304). If included (Step S33304 YES), the display data D (Ax, Ay) of the image monitor are inverted (Step S33305), and if not included (Step S33304 NO), the procedure is moved to Step S33306 as it is and add Ax one by one. Processings in Steps S33304~S33306 are continued till Ax becomes larger than Xe (Step S33307 NO), when Ax becomes larger than Xe (Step S33307 YES), Ax is set to 0 (Step S33308) and Ay is added one by one. Processings in Steps S33304~S33308 are continued till Ay becomes larger than Ye. When Ay becomes larger than Ye (Step S33309 YES) or the processing of the document frame display is completed, the routine is finished.

Since both the document frame and the effective image area frame wherein an image is actually copied are displayed in such a way, the relative position between the two can be grasped instantaneously.

Figure 32:
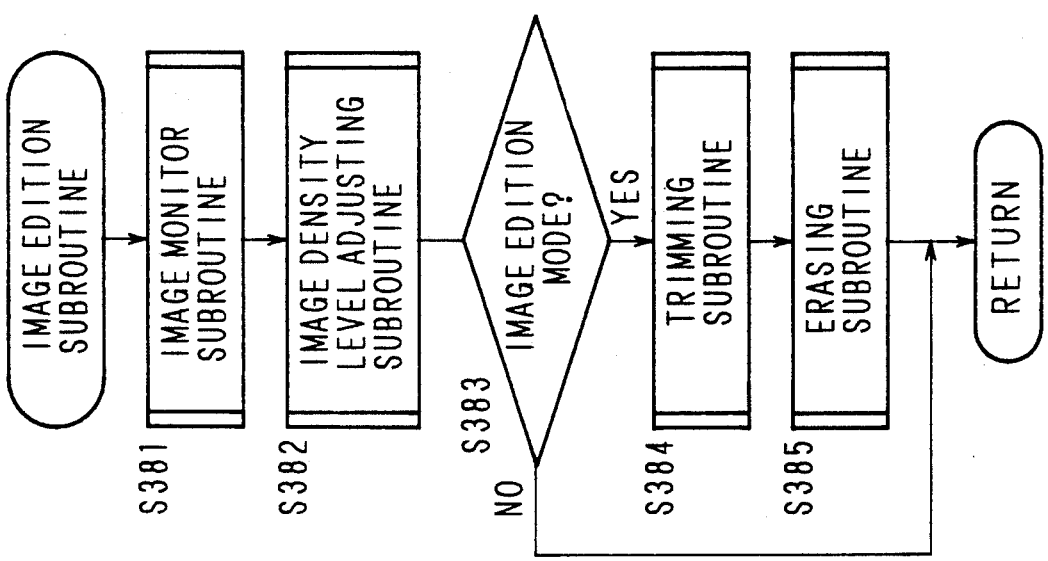

FIG. 32 is a flow chart showing the contents of an image edition routine in Step S38 shown in FIG. 14. First, the image monitor is motivated (Step S381), a display density level of the image monitor is adjusted (Step S382), and when the image edition mode is set (Step S383 YES), processings related to a trimming mode (Step S384) and an erasing mode (Step S385) are conducted.

Figure 33:
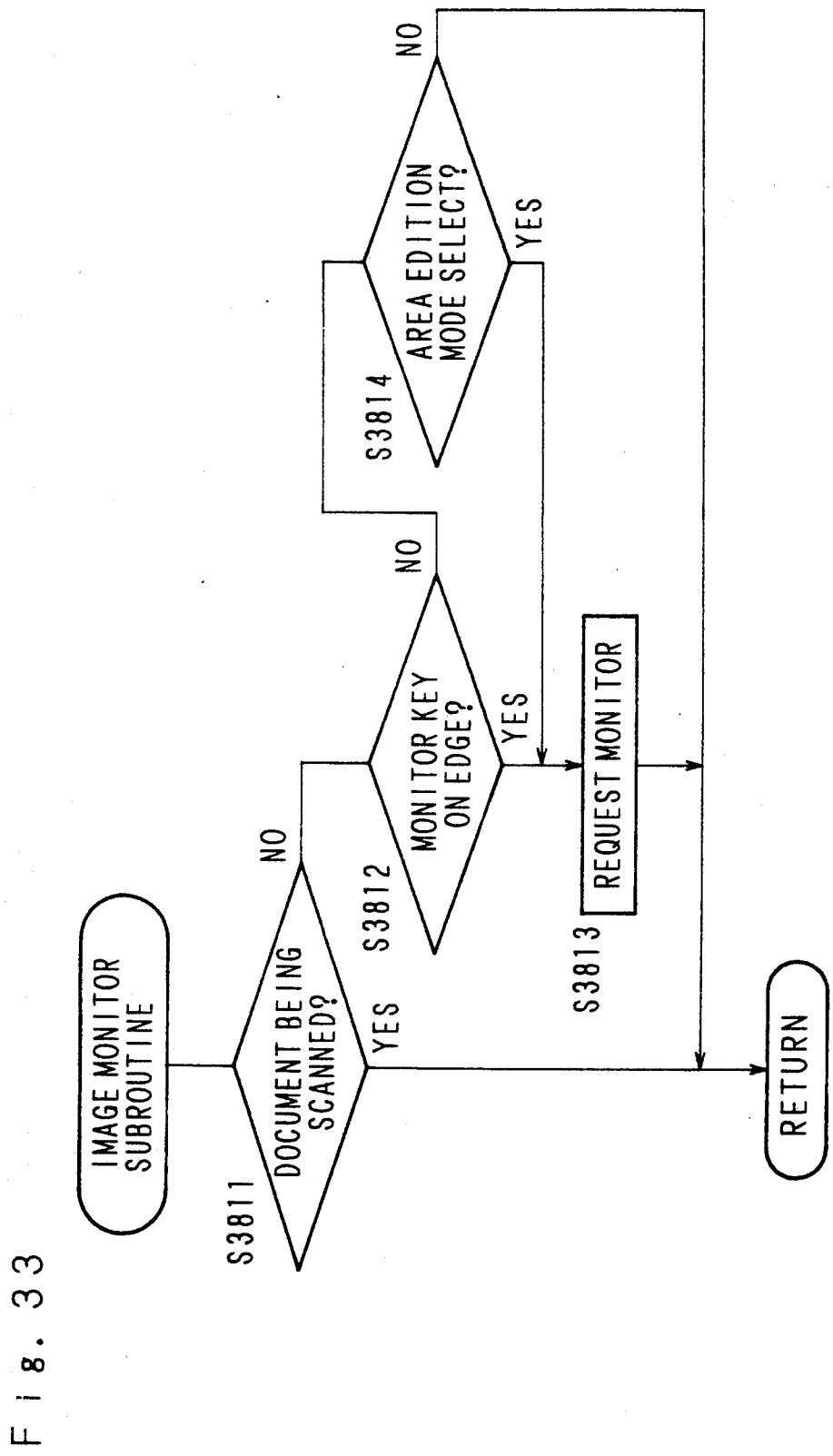

FIG. 33 is a flow chart showing the contents of an image monitor routine in Step S381 shown in FIG. 15. If the document is not scanned by the scanner 10 to obtain an image signal (Step S3811 NO), when the monitor key 316 has changed from OFF to ON (Step S3812 YES) or the area edition mode has been selected (Step S3814 YES) even if the monitor key 316 is not ON-EDGE (a time when a key changes from OFF to ON is called ON-EDGE), the monitor image is requested to be displayed (Step S3813).

Figure 34A:
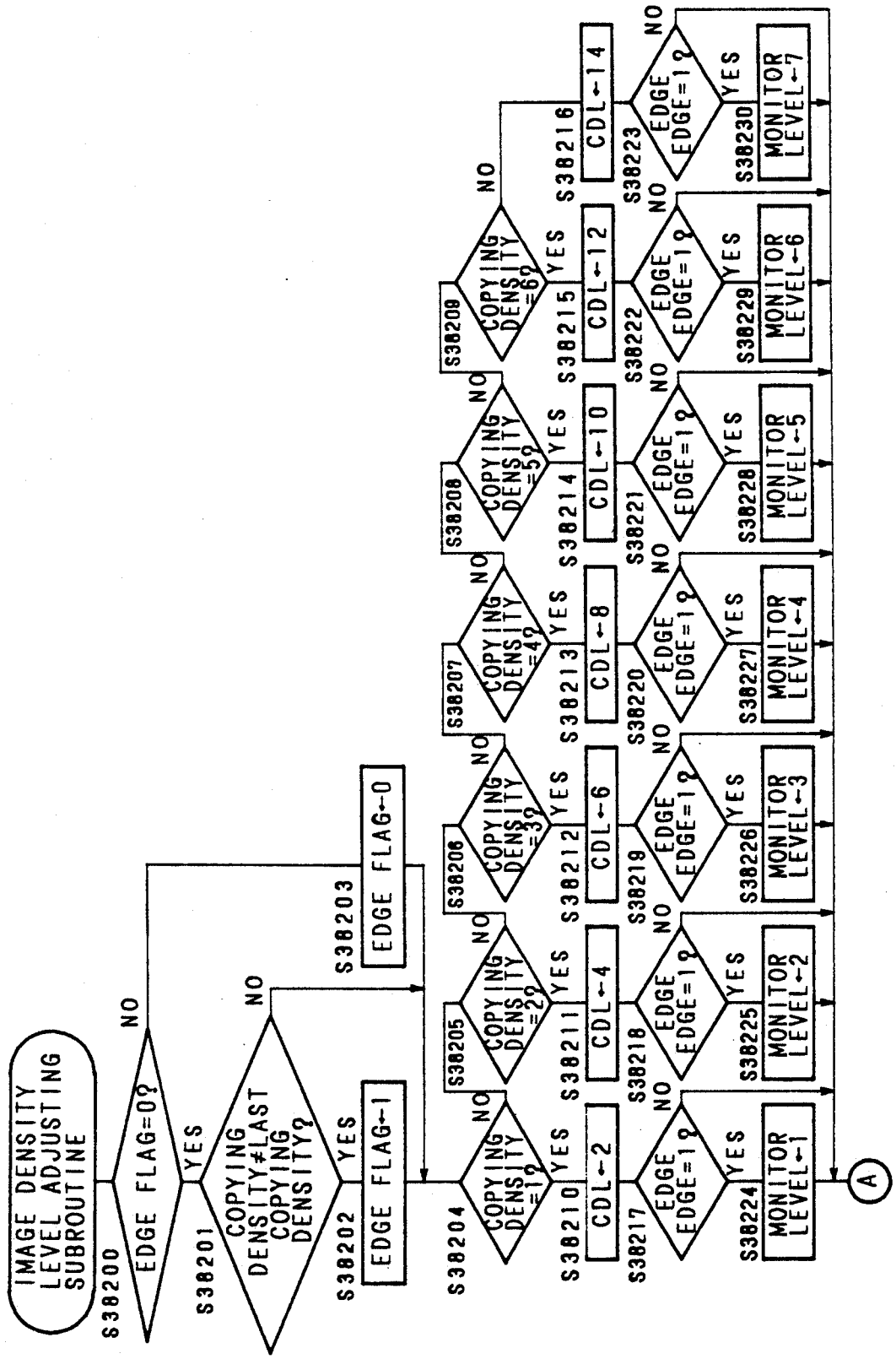

FIG. 34 is a flow chart showing the contents of a density level adjusting routine in Step S382 shown in FIG. 32. In interlocking of an actual copy density level and a monitor image density level (monitor level), when appointment of the copy density level is changed, in agreement with the change, both the actual copy density level and the monitor level are changed, while when appointment of the monitor level is changed, in agreement with the change, only the monitor level is changed.

In Steps S38200~S38203, a change-time of the copy density level display 407 (refer to FIG. 6) on the liquid-crystal display panel 222 is detected. When an edge flag is 0 (Step S38200 YES) (the flag is set to 0 at initialization) and the previous copy density is different from the new copy density (Step S38201 YES), the edge flag is set to 1 (Step S38202). If the subroutine is called (Step S38200 NO) after the edge flag has once been set to 1, it is returned to 0 (Step S38203). Thereafter, responsive to the appointment of the copy density (Steps S38204~S38209), a counter CDL deciding the actual copy density level is set (Steps S38210~S38216). This value becomes the aforesaid threshold level (4 bits data (e) in FIG. 18) when the original image data read are converted into display data for indicating ON and OFF of the liquid crystal. When the edge flag is 1 (Step S38217~S38223 YES) in respective copy densities, in agreement with appointment of the copy density, the monitor level is set (Steps S38224~S38230). When the edge flag is 0 (Steps S38217~S38223 NO), the procedure is returned to the main routine and the monitor level is retained in the previous state.

Responsive to appointment of the monitor level (displayed contents of the monitor level display 423 (refer to FIG. 8)) (Steps S38231~S38236), comparison data (FIG. 18(e)) SL is set (Steps S38237~S38243).

As described above, by actual appointment change of the copy density or direct setting change of the monitor level, the density change of the monitor level is accepted.

Figure 35:
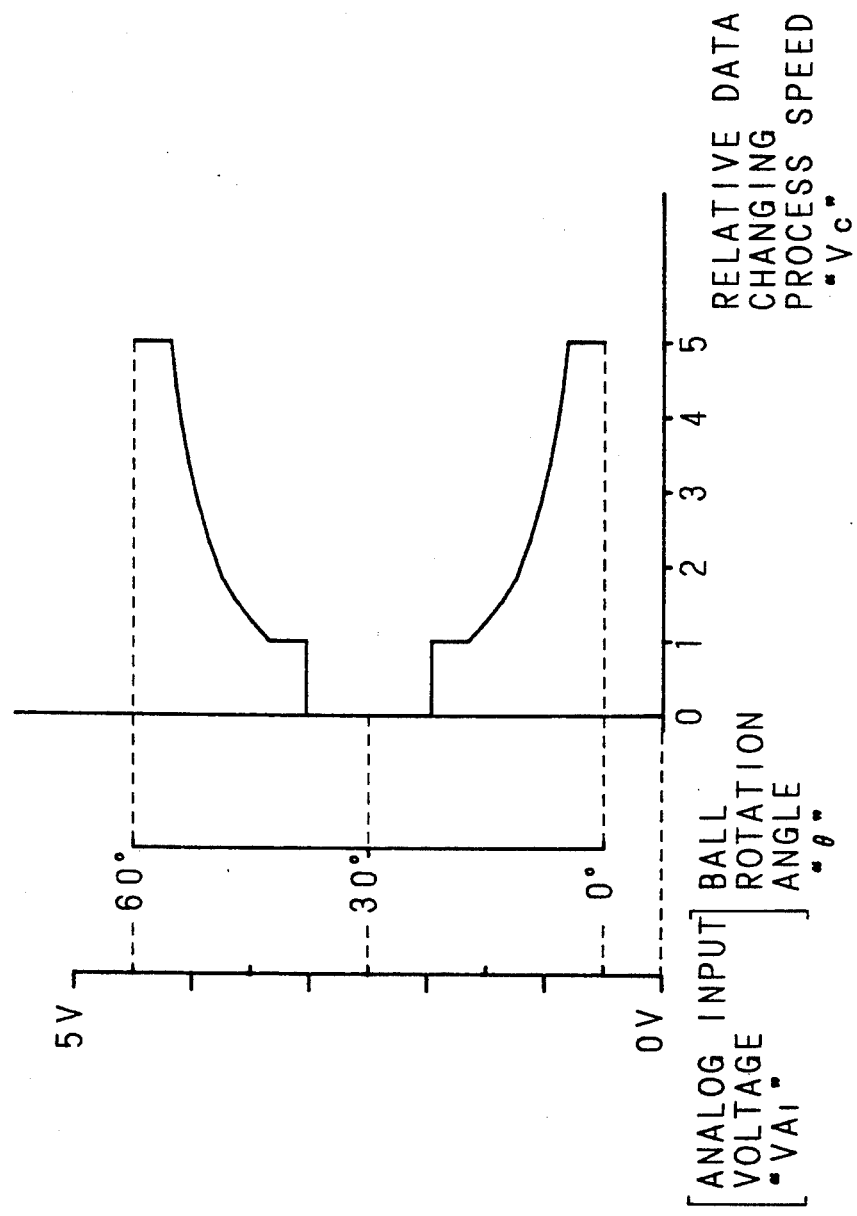
FIG. 35 is a graph showing the relationship between a rotation angle of the joy ball and a processing speed.

Next, control procedures with respect to the operation of the joy ball 313 will be described. FIG. 35 is a graph showing the relationship between a rotation angle $\theta$ of the stick 313a of the joy ball 313 and a processing speed Vc, FIG. 36 is a table showing the relationship between $\theta$ and Vc and reference timer value TM for deciding the moving speed Vc in each cursor, and FIG. 37 is a schematic view showing a movable range of the stick 313a.

Figure 37:
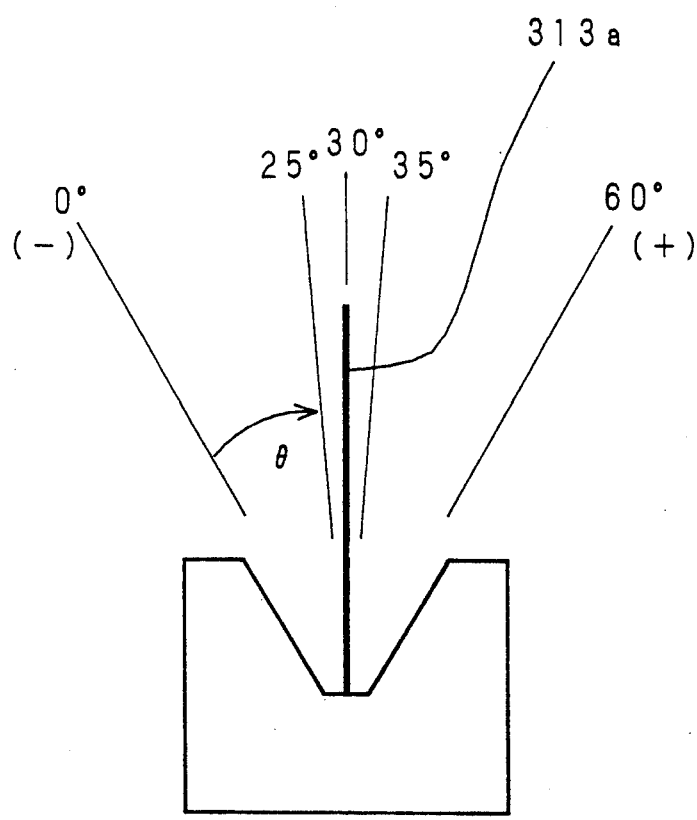
FIG. 37 is a schematic view showing a movable range of a stick portion of the joy ball.

As shown in FIG. 37, when a center position in which the stick 313a returns automatically is shown by $\theta = 30°$, the stick 313a is movable within the range of $\theta = 0° \sim 60°$, and responsive to the angle $\theta$, the moving speed Vc of the menu cursor and the position appoint cursor varies as shown in FIG. 35. In FIG. 35, though the speed variation is represented in one dimension, in practice, it is in two dimensions as shown in FIG. 4, and controlled independently in the directions X and Y respectively. When $25° < \theta < 35°$, the cursor (menu cursor or position appoint cursor 431) is stationary (Vc=0). When $20° \leq \theta \leq 25°$ or $35° \leq \theta \leq 40°$, the cursor is moved at a certain reference speed (Vc=1). When $0° \leq \theta \leq 5°$ or $55° \leq \theta \leq 60°$, the cursor moves at a speed of 5 times the reference speed (VC=5). When $5° < \theta < 20°$ or $40° < \theta < 55°$, the cursor moves at a speed Vc=1~5 by a quadratic functional composition of $\theta$ shown in FIG. 36.

Figure 38A:
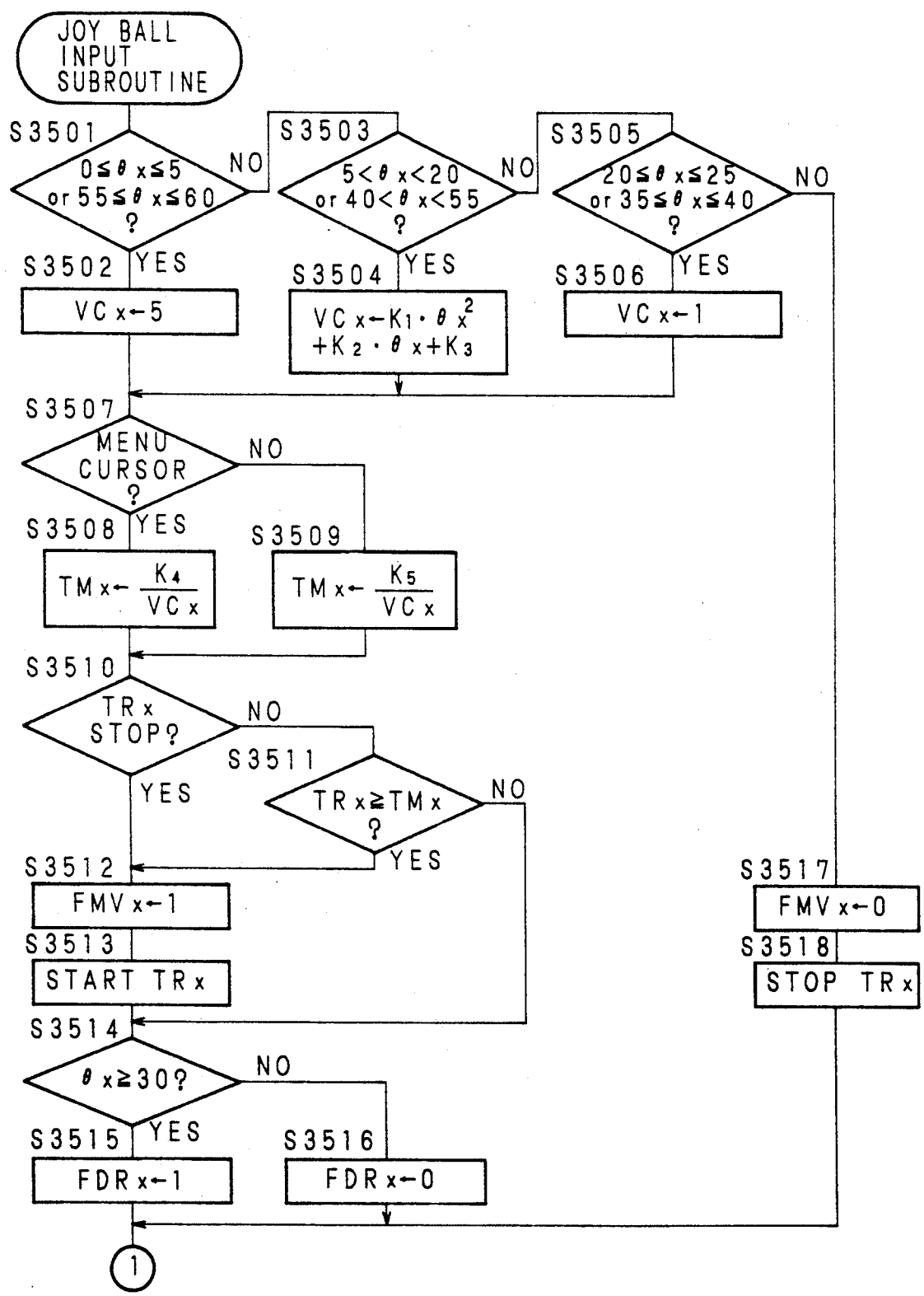

FIG. 38 is a flow chart showing the controlled contents of a moving speed of the cursor, showing the contents in Step S35 shown in FIG. 14.

Depending upon the rotation angle $\theta$x in the direction X (Steps S3501, S3503, S3505), a value between 1 and 5 is set for the x-component moving speed VCx (Steps S3502, S3504, S3506). Here, constant values $K_1$, $K_2$ and $K_3$ in Step S3504 are respectively 0.007619, −0.4571 and 7.091 as shown in FIG. 36. When $25 < \theta x < 35$ (Step S3505 NO), a flag FMVx requesting the cursor to move in the direction X is reset (Step S3517), and a comparison timer TRx for deciding a moving timing in the direction X is stopped (Step S3518). When the flag FMVx is set to 1, in either of Steps S37, S38, S39 (FIG. 14), the cursor is processed to move and the flag is returned to 0.

When a screen shows the moving state of the menu cursor as shown in FIGS. 6, 7, 8 after VCx is set (Steps S3507 YES), $K_4/VCx$ is set in a reference timer value TMx deciding the x-component moving speed (Step S3508). When a screen shows the moving state of the position appoint cursor 431 as shown in FIGS. 9, 10 after VCx is set (Step S3507 NO), $K_5/VCx$ is set in the reference timer value TMx (Step S3509). Since $K_4 = 1000$ (msec) and $K_5 = 50$ (msec), the reference timer value TMx shows the result shown in FIG. 36.

When the comparison timer TRx is stopped and not in adding operation (Step S3510 YES), and the comparison timer value TRx reaches the reference timer value TMx (Steps S3511 YES), the flag FMVx is set to 1 (Step S3512) and the comparison timer TRx is started to count from 0 (Step S3513).

The moment the joy ball 313 is rotated other than $25 < \theta < 35$, the flag FMVx becomes 1 and the cursor starts moving, and thereafter the cursor moves at a reference timer time corresponding to the rotating quantity. Here, the time is a value corresponding to the rotating quantity of the joy ball 313 at that moment, and the value is compared with the continuously operating reference timer value to move the cursor, so that a high moving responsiveness can be obtained. If the rotation angle of the joy ball 313 is returned to $25 < \theta < 35$ after completing the desired movement, the cursor is not moved thereafter.

Next, it is judged whether $\theta$x is 30 or more (Step S3514), if it is (Step S3514 YES), the x-component moving direction flag FDRx is set to 1 (Step S3515) and if not (Step S3514 NO), the flag FDRx is set to 0 (Step S3516). When FDRx=1, the cursor moves in the direction X(+) (rightward in FIG. 2), and when FDRx=0, it moves in the direction X(−) (leftward in FIG. 2).

Figure 38B:
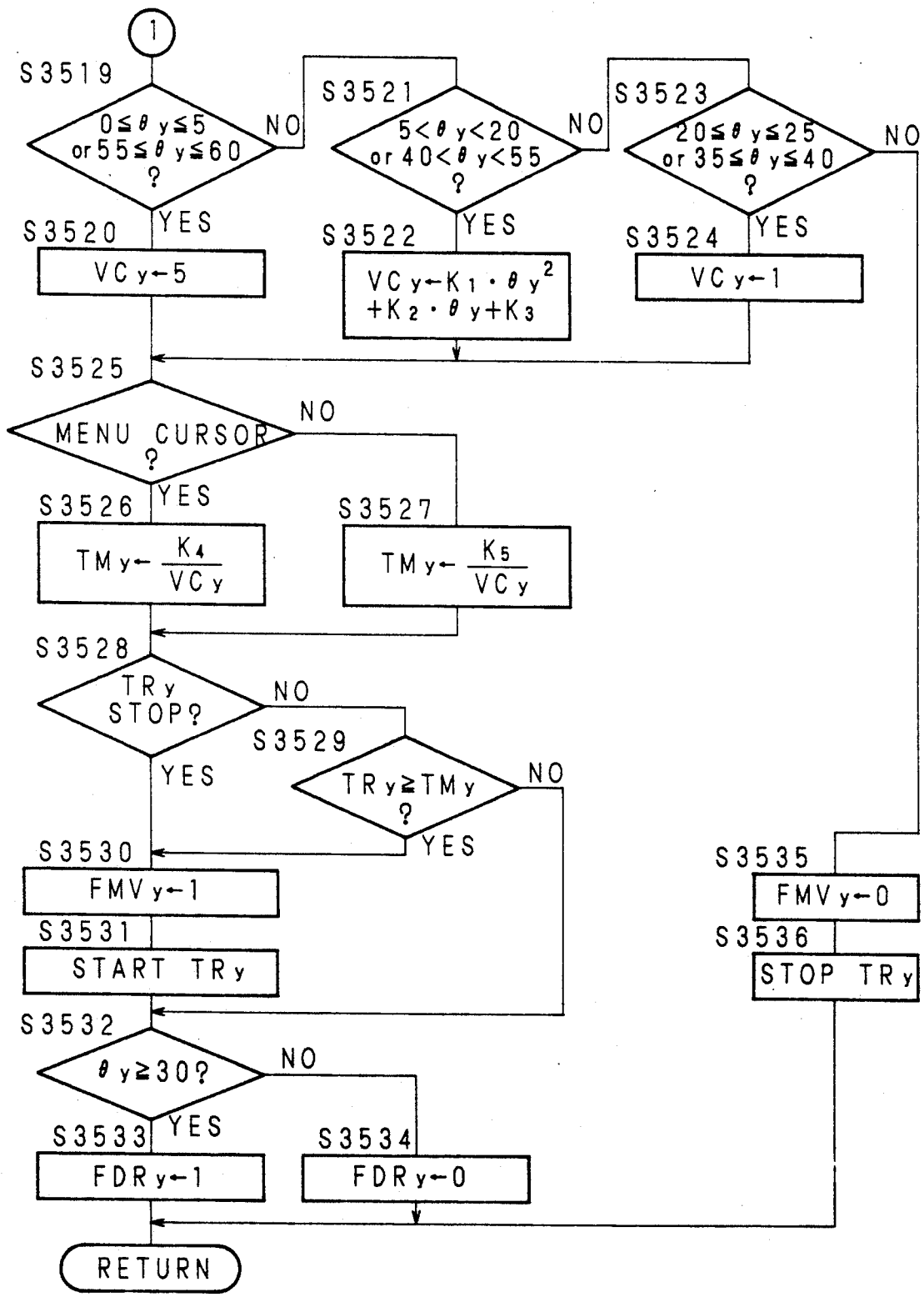

Processings described above are conducted exactly similarly for the y-direction component (refer to Steps S3519~S3536 as shown in FIG. 38(b)) to appoint a moving request flag FMVy and a moving direction flag FDRy in the direction y.

The moving request flags FMVx, FMVy and the moving direction flags FDRx, FDRy decided as above are used on judgment in Steps S37, S38, S39 (FIG. 14), wherein various processings are conducted responsive to the states of respective flags aforementioned. Meanwhile, when at least one of FMVx and FMVy is 1, in Steps S331, S332 (FIG. 25), actual moving processings of 1-unit of the menu cursor or the position appoint cursor 431 are conducted responsive to the states of respective flags aforementioned. In the step wherein the processings are completed, the moving request flags FMVx, FMVy are returned to "0", and the position of the position appoint cursor 431 in Step S3327 (FIG. 26) and that of the menu cursor in Step S331 (FIG. 25) are unchanged till FMVx becomes "1" in Step S3512 (FIG. 38(a)) and FMVy becomes "1" in Step S3530 (FIG. 38(a)).

The 1-unit movement of the cursor described above designates 1-dot movement in the directions x, y on the liquid-crystal display panel 222 in the case of position appoint cursor 431, and in the case of menu cursor, movement from one cursor position to the immediately adjoining cursor position in the directions x, y.

Figure 39:
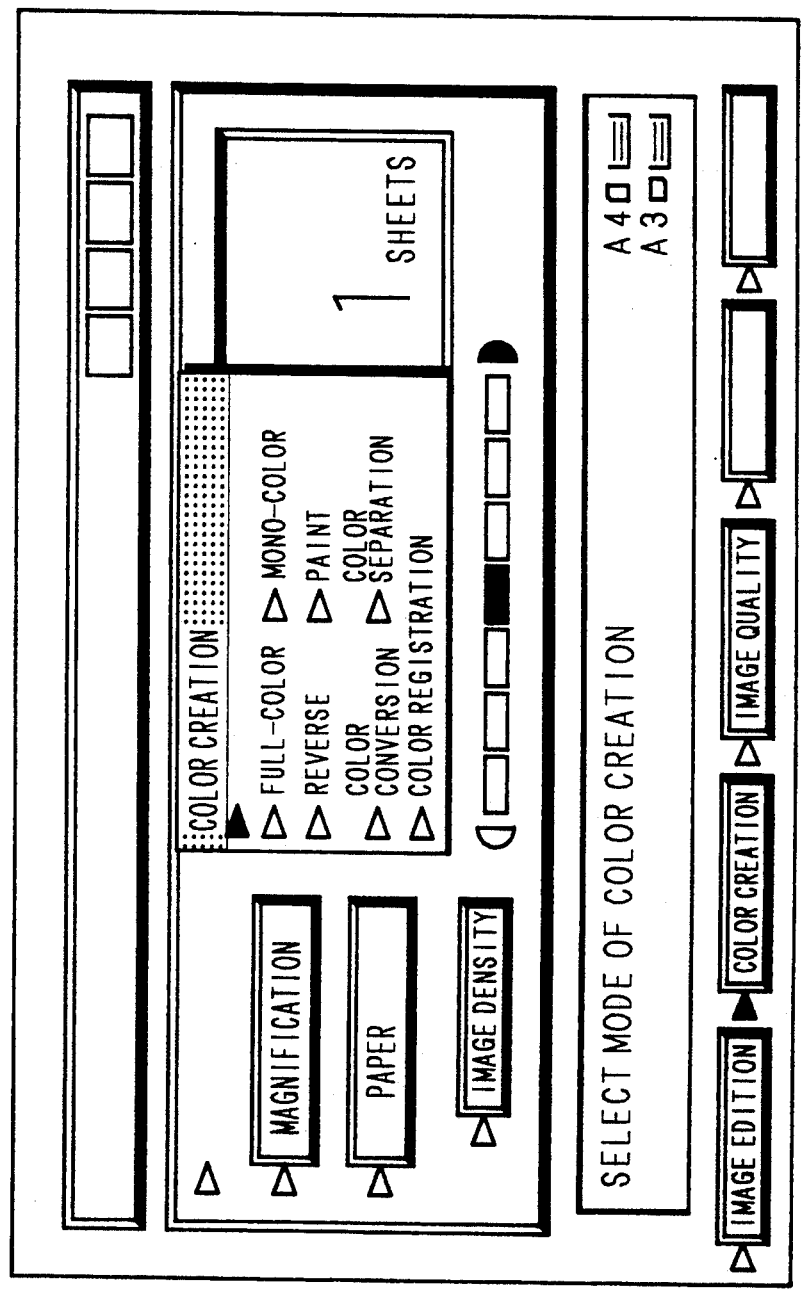
FIGS. 39~42, 44 are schematic views showing the contents displayed of a liquid-crystal display panel related to color edition.

Now, FIG. 39 is a schematic view showing the displayed contents (hereinafter referred to as display D7), when a color creation (color editing mode) is selected from FIG. 6 (display D1) when a power is switched on for processing the color edition according to the present invention.

In FIG. 6 (display D1), by moving the menu cursor to 401e by the joy ball 313 and turning on the set key 314, on a portion of FIG. 6 (display $D_1$), menus in the "color creation", namely, fullcolor (=tricolor), monocolor, reverse, paint, color conversion, color separation and color registration are displayed, and on the information display 406, it is requested to select one of these modes.

Figure 40:
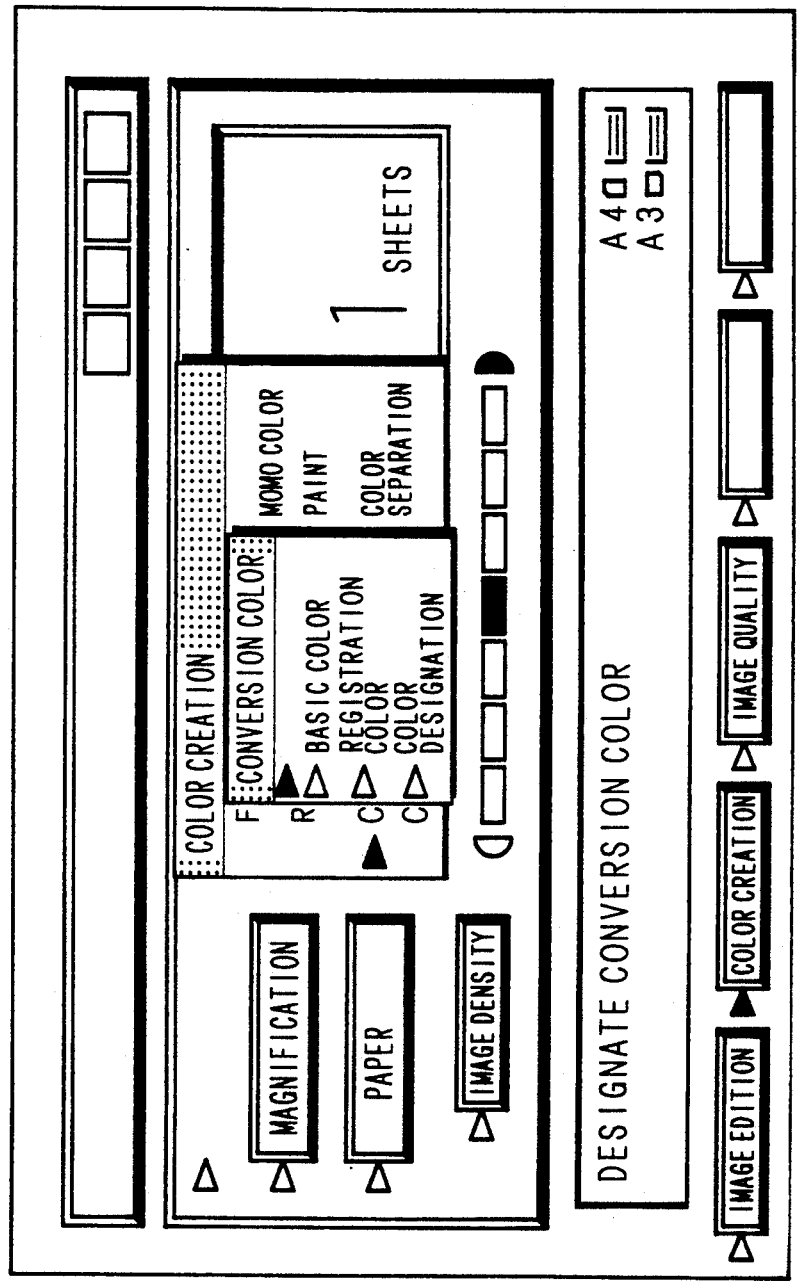
Figure 41:
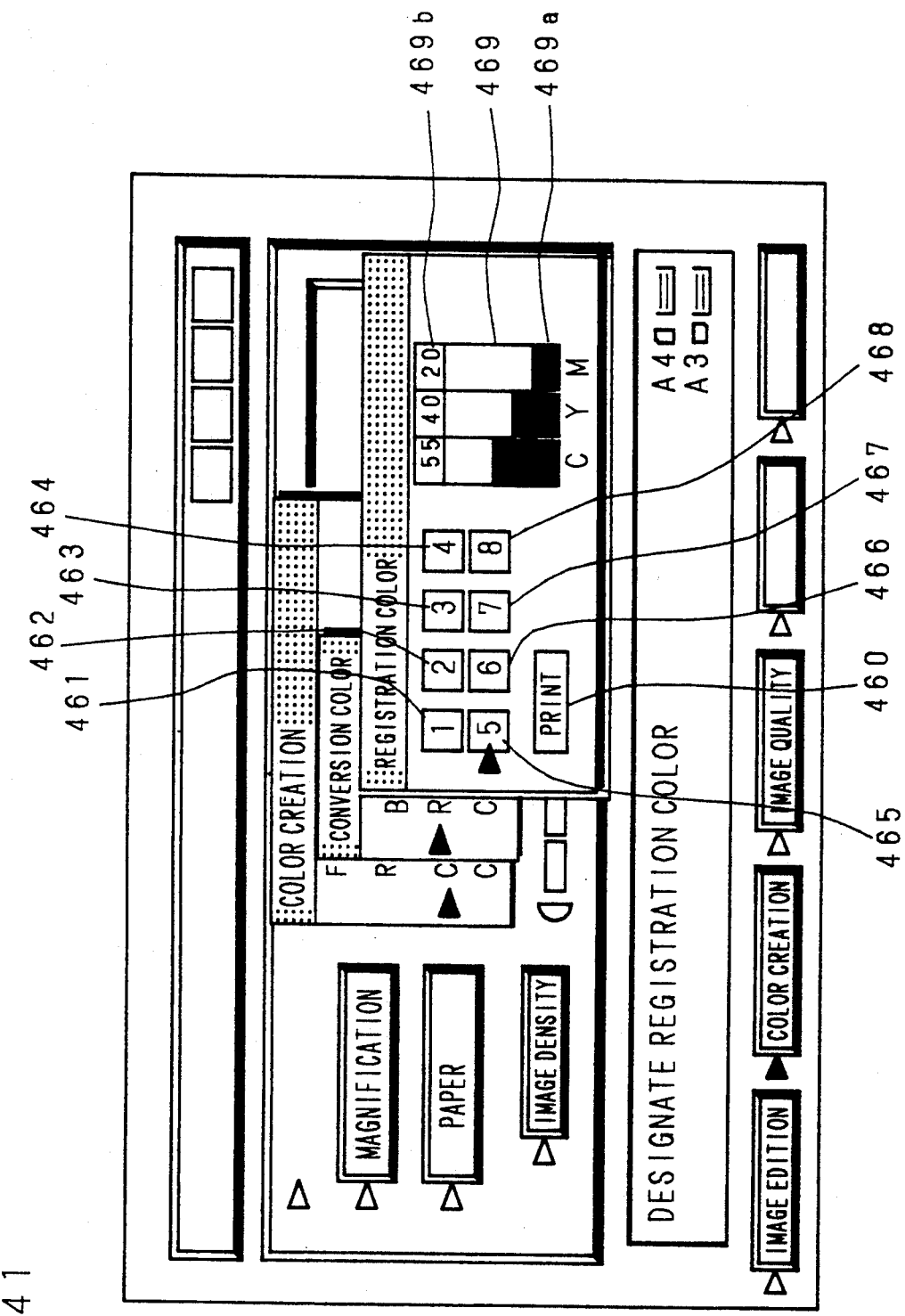

FIG. 40 is a schematic view showing the displayed contents (hereinafter referred to as display $D_8$) when a color conversion mode is designated among the aforesaid menus by using the joy ball 313 and the set key 314 similarly. Here, the color conversion mode is a copying mode wherein a certain color (conversion color) on the document is converted into the other color (output color), and on the information display 406, it is requested to designate the conversion color. In the conversion color, there are three menus, a "basic color" menu which is set in advance as a specification of a copying machine, a "registration color" menu wherein a color of some portion of the document is registered by the operator by the color registration mode in the aforesaid "color creation" and a "color designation" menu wherein a color is decided by designating a position on the document subject to the color conversion. The displayed contents when the "registration color" is designated among these menus are shown in FIGS. 41 and 42 (herein referred to as display $D_9$ and $D_{10}$).

First, FIG. 41 (display $D_9$) shows the displayed contents when No. 5 is selected among the registration colors from No. 1 to No. 8 which are registered in advance by the color registration mode to be described later. When a certain number of registration color is selected, a registration color monitor 469 which is the display portion aforementioned is displayed, and density levels of respective toners of cyan, yellow and magenta in a copying output are shown in bar graphs 469a and in percent 469b. Thereby, the content of the registration color can be confirmed and discriminated, thus by selectively moving the menu cursor to respective registration colors No. 1~No. 8 by the joy ball 313, the displayed contents of the registration color monitor 469 vary responsive thereto.

If the set key 314 is turned on when a certain number of the registration color is selected as described above, though the conversion color is designated and the procedure is moved to the next menu, as the information display hitherto, designation of the conversion color, or in this case, the registration color is requested.

Figure 42:
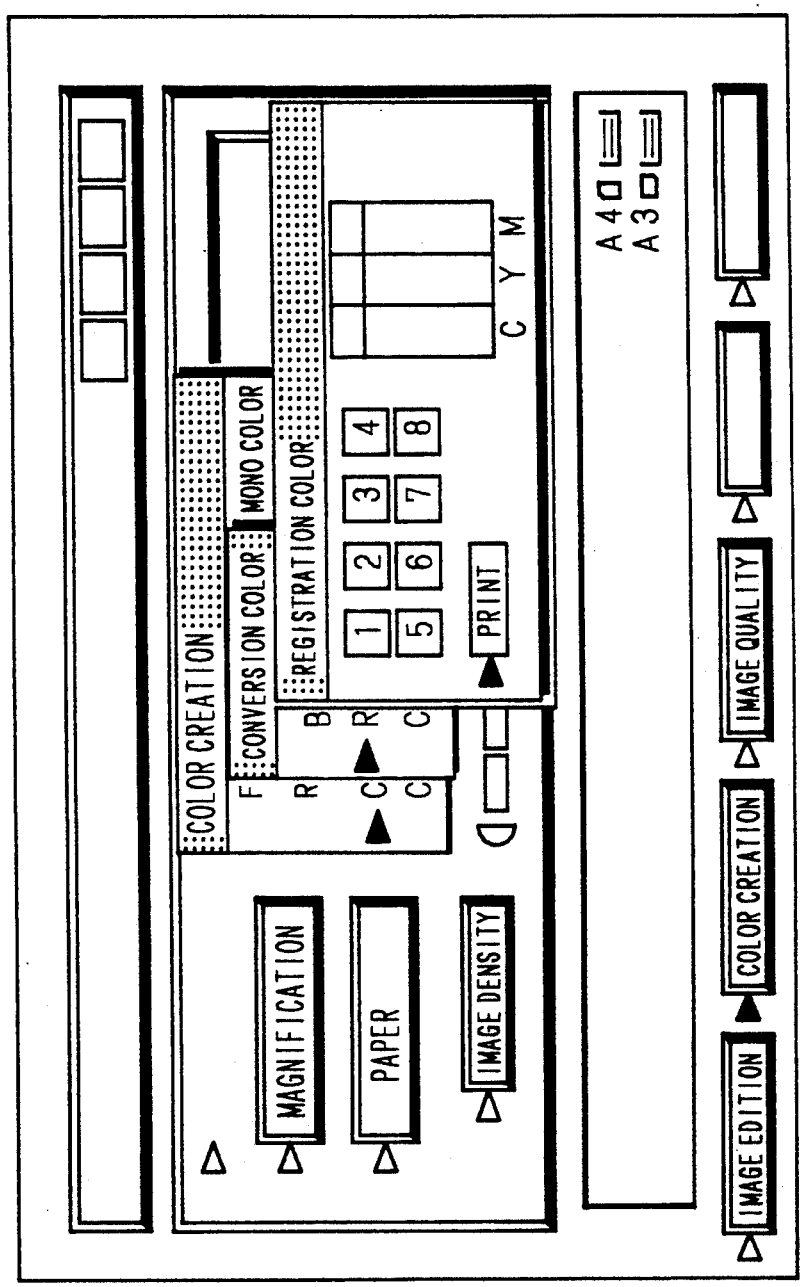
Figure 43:
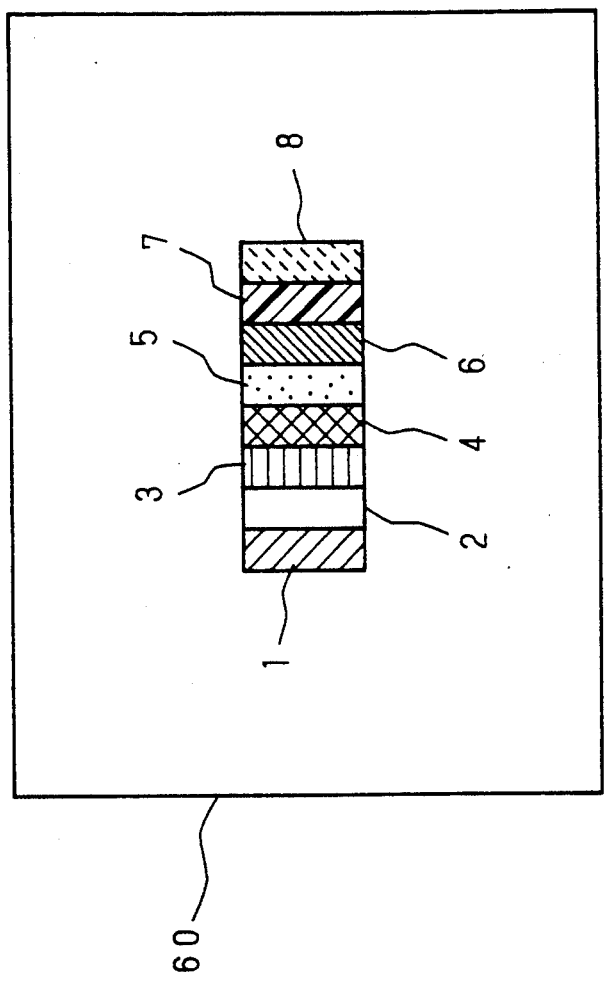
FIG. 43 is a schematic view showing the result of printing registered colors.

FIG. 42 (display $D_{10}$) shows the displayed contents when another menu "print" 460 in the registration color menus is selected by the joy ball 313 before designating the registration color. When the set key 314 is turned on in this state of display, registration color printing is started, whereby colors retained in the registration colors No. 1~No. 8 are printed on a sheet of paper. FIG. 43 is a view showing the printed result, in which respective registration colors from No. 1 to No. 8 are printed on the paper 60 in order in aligned rectangulars. The printed result is inserted into the registration color setting portion 317 on the control panel 300. Since the registered colors can be confirmed as an actual copy in such a way, by printing the registration color at a time point of color registration and setting the result on the control panel 300, the operator is prevented from creating the color (color edition copying) using undersirable registration colors.

Figure 44:
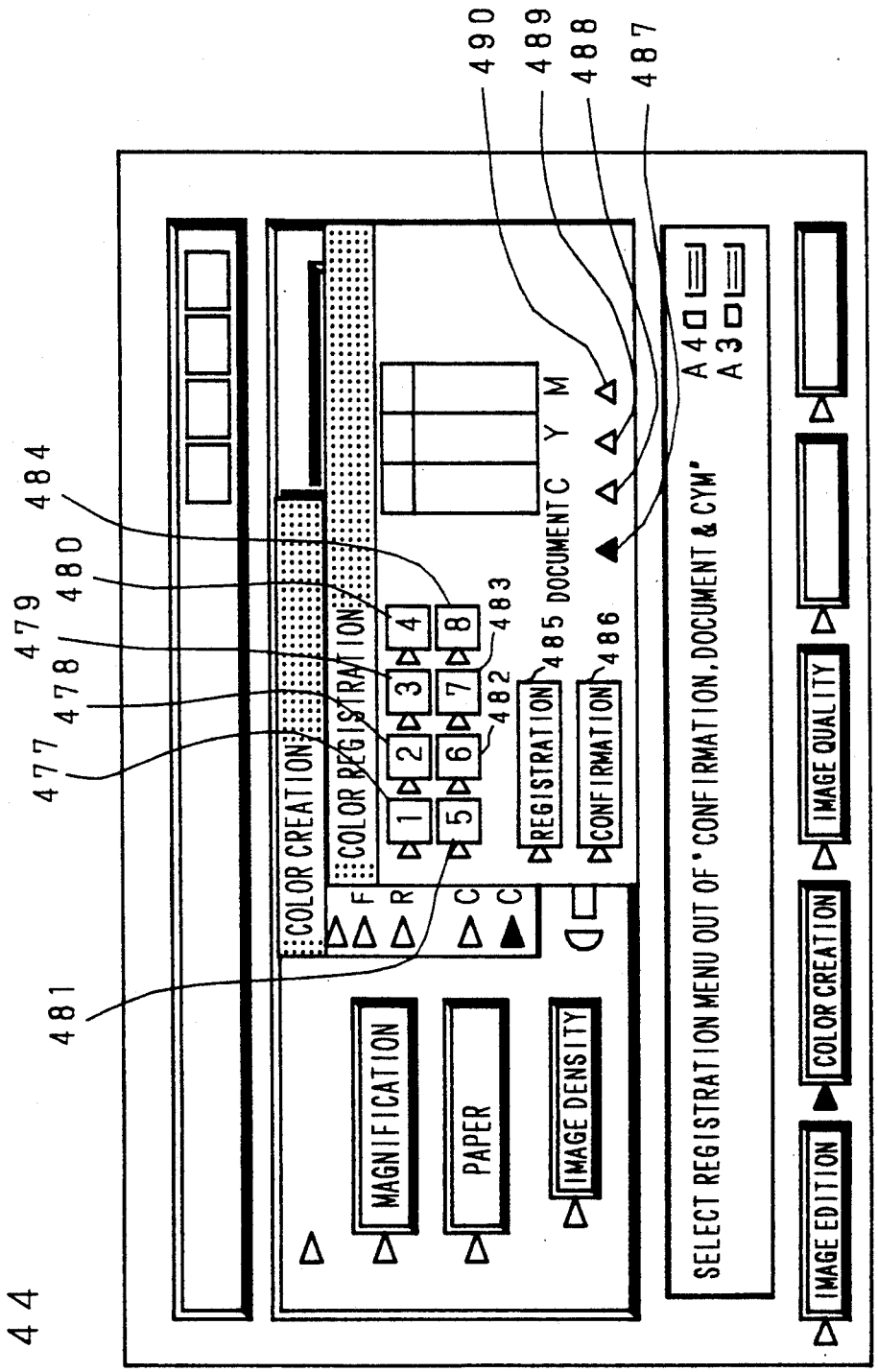

Next, procedures for registering respective colors from No. 1 to No. 8 aforementioned will be described. FIG. 44 is the displayed contents (hereinafter referred to as $D_{11}$) when the color registration mode is designated from FIG. 39 (display $D_7$). The color registration mode includes menus 477~484 corresponding to the registration colors No. 1~No. 8 (461~468) in the "registration color" menu shown in FIG. 41 (display $D_9$) aforementioned, a "confirmation" menu 486 confirming the colors already registered, a "document" menu 487 appointing a position on the document and reading its color for registration and menus 488~490 registering the colors wherein any density level of respective toners of cyan, yellow and magneta is set by using the same monitor as the registration color monitor 469 shown in FIG. 41 (display $D_g$).

In the information display 406, it is requested to select the registration menu, for example, when the "document" menu 487 is selected, as shown in FIG. 44 (display $D_{11}$), an image monitor is requested, and if a position is appointed on the image monitor, the color of that position on the document is read. For registering the color, by designating the registration 485, selection of the registration No. is requested, and color data read out are stored in the registration No. selected from the menus 477~484. As described above, in the present embodiment, when the colors are registered, it is possible to register up to eight colors by a mode of reading colors from the document position, or a mode of producing arbitrary colors.

FIGS. 45~49 are controlling flow charts related to registration colors.

Figure 45:
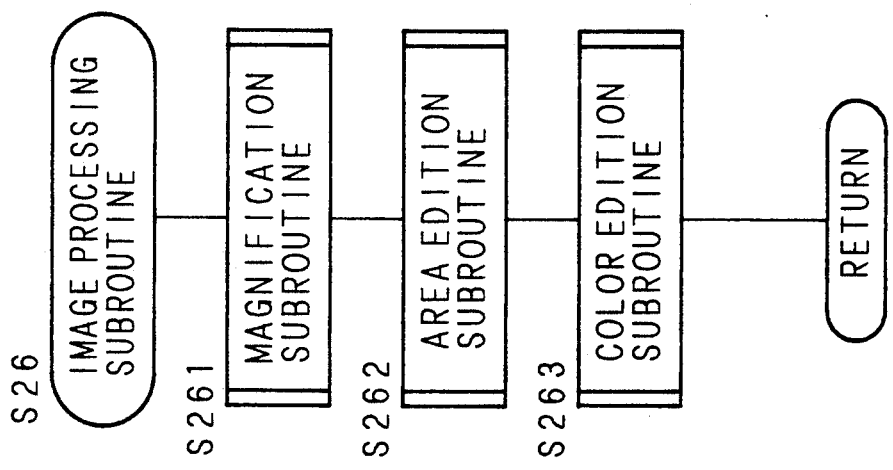
FIGS. 45~49 are flow charts showing the controlling contents related to the registered colors.
Figure 46:
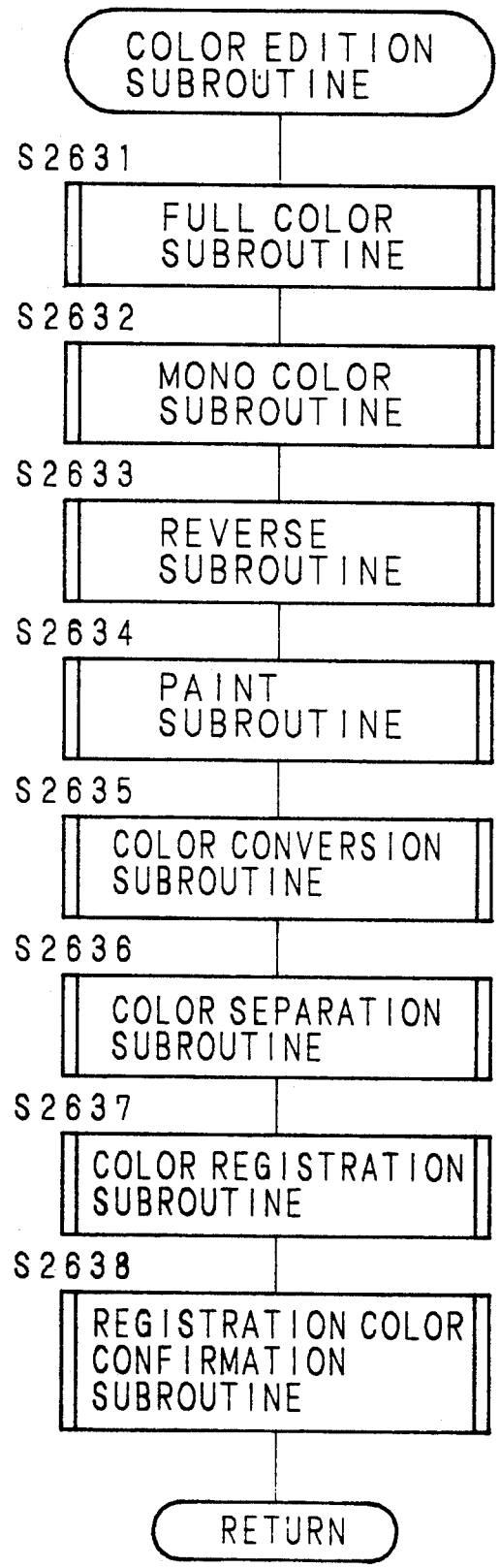

FIG. 45 is a flow chart showing the content of image processing in Step S62 shown in FIG. 13, which comprises processing related to the change-magnification (Step S261), processing related to the area edition (Step S262) and processing related to the color edition (Step S263). FIG. 46 shows the processing content related to the color edition (Step S263). Here, in addition to respective menu is the "color creation" described above, or processings for the full color (=tricolor) (Step S2631)~color registration (Step S2637), processing for confirming the registration color contents is conducted (Step S2638).

Figure 47:
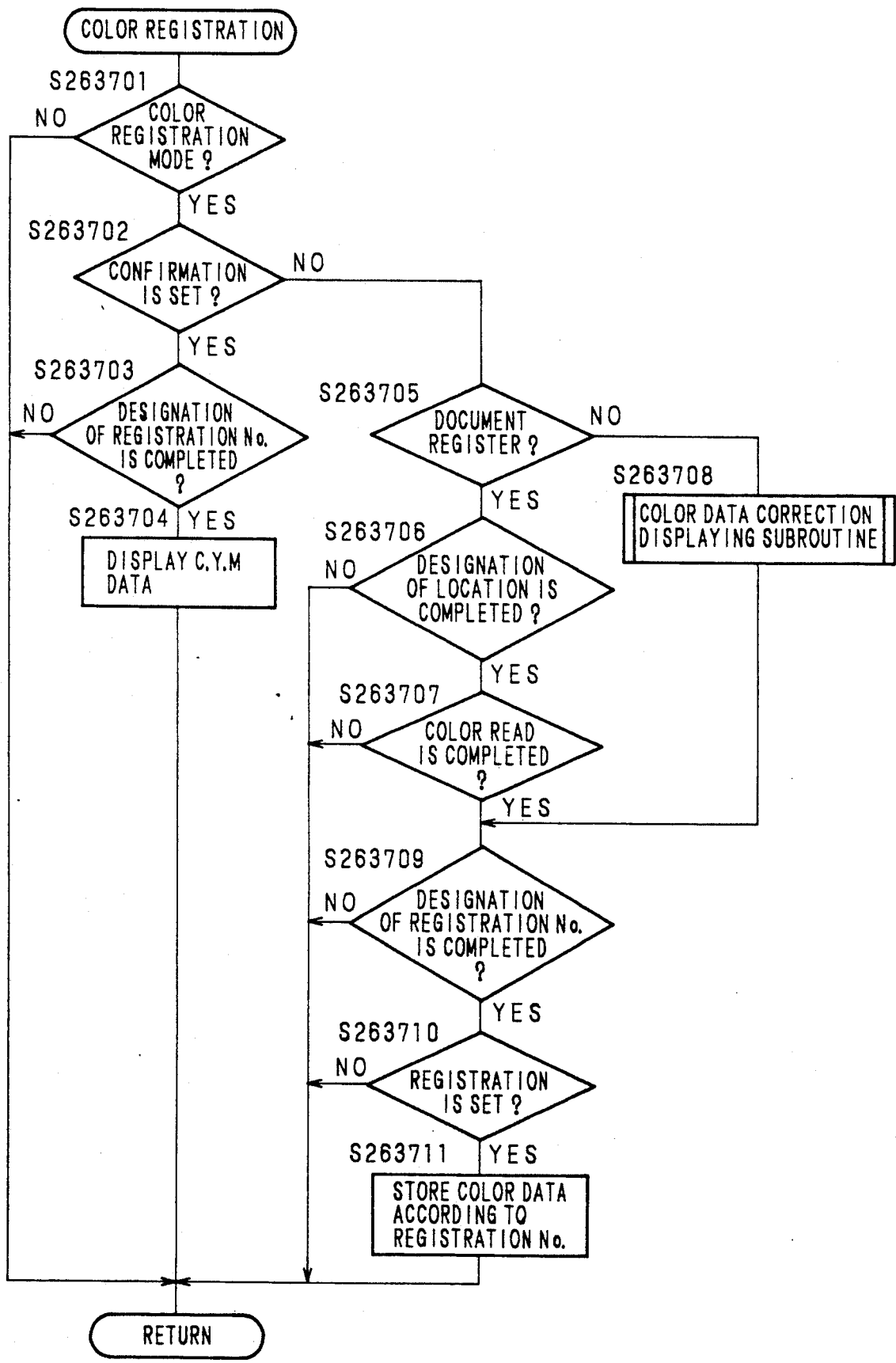

FIG. 47 shows the processing contents of the color registration mode in Step S2637, in which first, the "confirmation" 486 is set in the state shown in FIG. 44 (display $D_{11}$) (Step S263702 YES), and when the registration No. is designated (Step S263703 YES), a tricolor component of cyan, yellow and magenta is displayed by the data corresponding to the No. (Step S263704).

Meanwhile, in the case that the "document" 487 is set (Step S263705 YES), after a color read position on the document is appointed (Step S263706 YES) and the color is read (Step S263707 YES), or in the case that an arbitrary color is designated by the manual operation (Step S263705 NO), after accepting each color component setting (Step S263708), and, in both cases, after completing the registration No. designation (Step S263709 YES), color by document reading or by arbitrary color setting is stored in a RAM area corresponding to the registration No. (Step S263711) after the "registration" 485 is set (Step S263710).

Figure 48:
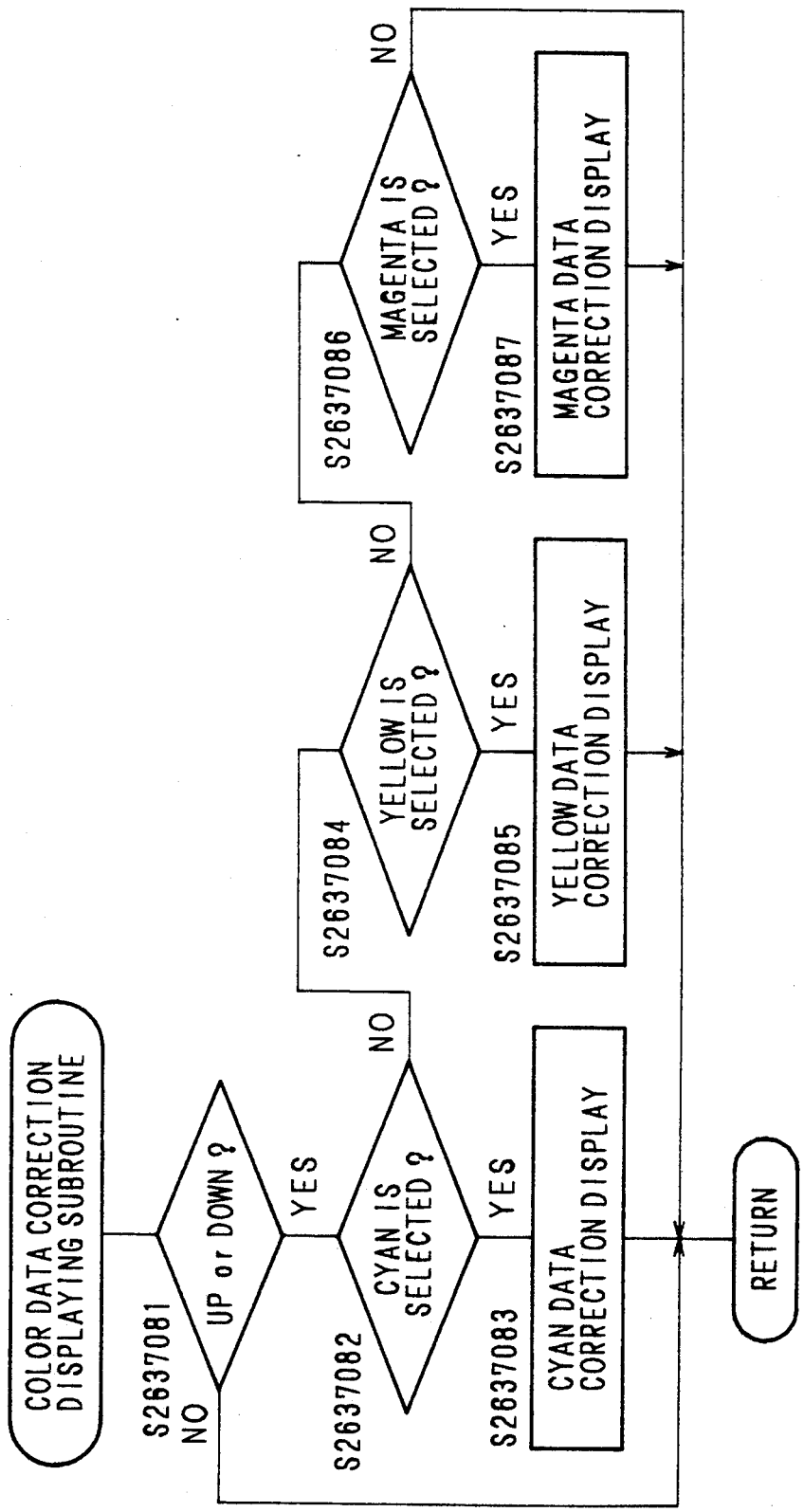

FIG. 48 is a flow chart showing the contents of a color data correction display routine in arbitrary color designation shown in FIG. 47 (Step S263708). When the joy ball 313 is operated in the direction Y (+:up, −:down) (Step S2637081 YES), if a "cyan" component is selected (Step S2637082 YES), data for the cyan component is incremented or decremented and the cyan data is displayed (Step S2637083). Similarly, when a "yellow" component is selected (Step S2637084 YES), yellow data and display are corrected (Step S2637085), and when a "magenta" component is selected (Step S2637086 YES), magenta data and display are corrected (Step S2637087).

Figure 49:
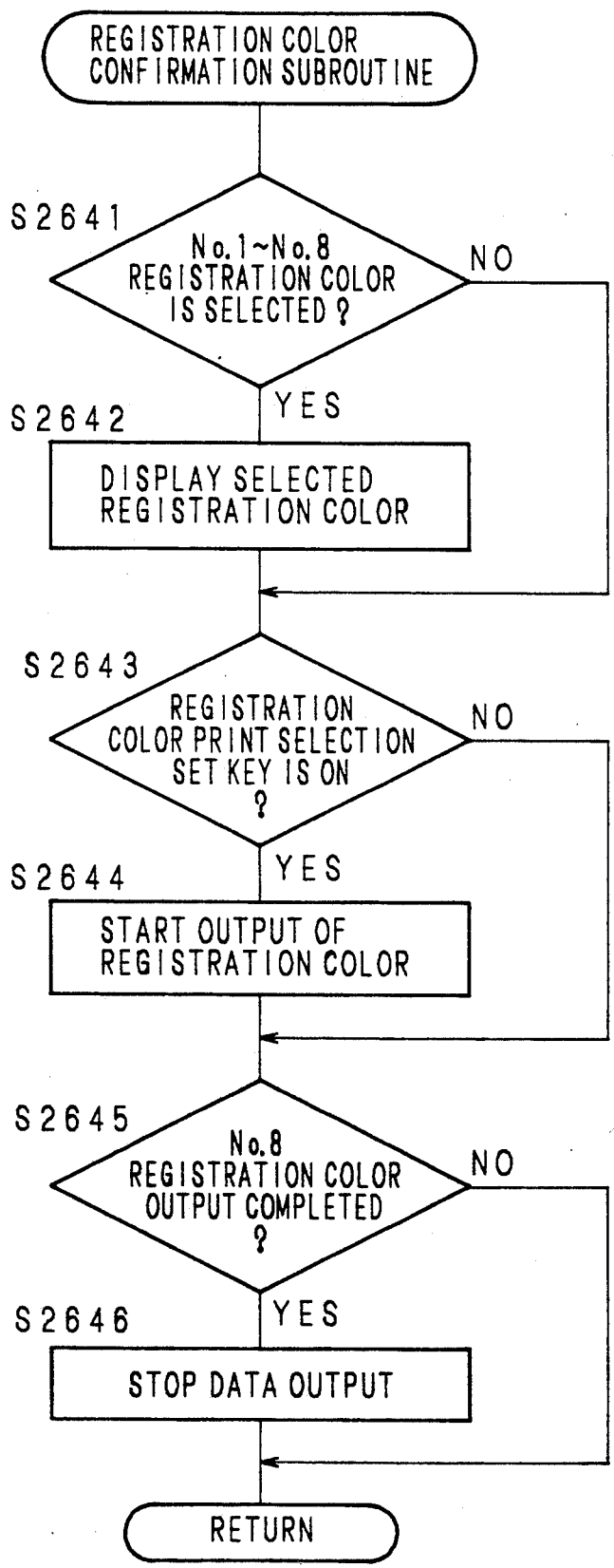

FIG. 49 shows the processing contents of registration color confirmation in Step S2638, in which while the registration colors between No. 1 and No. 8 are selected by the menu cursor in the state shown in FIG. 41 (display D9) (Step S2641 YES), data of the selected registration color No. is displayed on the registration color monitor 469 (Step S2642). If the set key 314 is turned on in the state shown in FIG. 42 (display D10) or in the state where the "print" 460 is selected (Step S2643 YES), and when the operating condition of printing is ready, the registration color data are outputted successively from No. 1 (Step S2644). Specifically, in lieu of scanning actually by the CCD linear image sensor 14, a false signal corresponding to the signal from the CCD linear image sensor 14 is generated and outputted.

When the data are outputted till No. 8 (Step S2645 YES), the data output is stopped (Step S2646). While, at this time, the usual copying operation is conducted in the engine portion 23, so that the registration colors are printed as shown in FIG. 43.

Now, a method of generating the false signal in the image signal processing circuit will be described with reference to a block diagram shown in FIG. 50. Analog image signals 21311~21313 from the CCD linear image sensor 14 are converted respectively into 8-bit digital image signals 21331~21333 in the A/D converters 21321~21323 for each signal of R, G and B signals, and the 8-bit digital image signals 21311~21333 are outputted toward the processing circuit in the next step via 8-bit selectors 21341~21343. This is the case of usual image reading.

When the registration colors are printed out, the selectors 21341~21343 are switched to the side of a false signal generating circuit 2136 by a control bus 21351, calling the color data stored in Step S26371 (refer to FIG. 47) in order of registration No., and generate the false signal in response to the color data. For example, when the color data is consisting of C=55%, Y=40% and M=20% as shown in FIG. 41, it is once calculated to be substituted by RGB, $$\begin{bmatrix} R \\ G \\ B \end{bmatrix} = \frac{1}{2} \begin{bmatrix} 1 & 1 & -1 \\ -1 & 1 & 1 \\ 1 & -1 & 1 \end{bmatrix} \begin{bmatrix} C \\ Y \\ M \end{bmatrix}$$

which gives R=3%, G=38% and B=20. Each of these R, G & B has a 8-bit code, R=00000011, G=00110100 and B=00100000, which are outputted respectively to the following processing circuit via the selectors 21341~21343.

A timing generating circuit 2137 is connected to the false signal generating circuit 2136. The timing generating circuit 2137 is designed to control the timing for generating the false signal from the false signal generating circuit 2136, and a shown in FIG. 51, for the registration color data No. 1, it outputs the aforesaid false signal by the timing corresponding to No. N~No. N+L dot in the main scanning direction. This is repeatedly outputted by the timing corresponding to the No. n line~No. n+1−1 line of the subscanning. The registration color data No. 2~No. 8 are also outputted similarly.

In the present embodiment, though bar graphs and numerals are used to display respective component rates of cyan, yellow and magenta for displaying the content of registration colors, the present invention is not limited thereto, it may be displayed in the other manner, for example, by using a display apparatus such as a color display.

In the present embodiment, though the registration colors are printed for all of the colors registered, it is not limited thereto, and, for example, a registration color No. may be designated such that only the color registered is printed or the registration No. may be printed by the registration color at the same time.

As described heretofore, in the copying apparatus according to the present invention, since registration colors can be confirmed by the colors printed on paper as same as at actual printing, and the content thereof can be also confirmed at once by displaying on display means, the operator can prevent such miscopying that the color edition processing using the registration colors resulted in undersirable colors.

Also, in registering a color, since the difference from the color already registered can be discriminated clearly by the content of the color, it is easy to judge whether the new registration is necessary.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A color image forming apparatus comprising:
   input for inputting an arbitrary color;
   registering means for registering a plurality of colors inputted by said input means;
   designating means for designating one color among the plurality of colors registered in said registering means;
   image processing means being operable in first and second operation modes, for forming an image on paper, wherein, in said first operation mode, the image is formed on paper in the color designated by said designating means, and in said second operation mode, the plurality of colors registered in said registering means are read out and their predetermined pattern images are formed on paper; and
   selecting means for selecting the operation mode of said image processing means;
   wherein, when said second operation mode is selected by said selecting means, said image forming means reads out the plurality of colors registered in said registering means and forms predetermined pattern images on paper without operation of said designating means.

2. A color image forming apparatus as set forth in claim 1, wherein said input means includes display means for displaying a document, position appointing means for appointing a position of the displayed document and color detecting means for detecting a color of the appointed position, and said registering means registers the color detected by said color detecting means.

3. A color image forming apparatus as set forth in claim 1, wherein said input means includes level setting means for setting density levels of primary color components corresponding to the color to be registered.

4. A color image forming apparatus as set forth in claim 1, wherein said pattern comprises aligned rectangulars painted out in respective registered colors.

5. A color image forming apparatus comprising:
input means for inputting and arbitrary color;
registering means for registering the color inputted by said input means;
image processing means for forming an image on paper in the color registered in said registering means; and
display means for displaying the color registered in said registering means in order to allow an operator to confirm the color registered in said registering means.

6. A color image forming apparatus as set forth in claim 5, wherein said display means displays density levels of primary color components corresponding to the color registered in said registering means.

7. A color image forming apparatus comprising:
input means for inputting an arbitrary color;
registering means for registering a plurality of colors inputted by said input means;
designating means for designating one color among the plurality of colors registered in said registering means;
image processing means for forming an image on paper in the color designated by said designating means; and
display means for displaying the color designated by said designating means in order to allow an operator to confirm the color registered in said registering means.

8. A color image forming apparatus as set forth in claim 7, wherein said display means displays density levels of primary color components corresponding to the color designated by said designating means.

9. A color image forming apparatus comprising:
input means for inputting an arbitrary color;
registering means for registering a color inputted by said input means;
operation means for inputting an instruction;
means responsive to the instruction from said operation means for forming a predetermined pattern image of the color registered by said registering means; and
an operation panel of the color image forming apparatus having an area on which said predetermined pattern image is located.

10. A color image forming apparatus comprising:
input means for inputting an arbitrary color;
registering means for registering a plurality of colors inputted by said input means;
designating means for designating one color among the plurality of colors registered in said registering means;
image processing means being operated in first and second operation modes, for forming an image on paper, wherein, in said first operation mode, the image is formed on paper in the color designated by said designating means, and in said second operation mode, the plurality of colors registered in said registering means are read out and their predetermined pattern images are formed on paper;
selecting means for selecting the operation mode of said image processing means; and
an operation panel on which said designating means is provided, said operation panel having an area on which said predetermined pattern images are located.

* * * * *